United States Patent
Vranjes et al.

(10) Patent No.: US 10,254,942 B2
(45) Date of Patent: Apr. 9, 2019

(54) ADAPTIVE SIZING AND POSITIONING OF APPLICATION WINDOWS

(71) Applicant: Microsoft Technology Licensing, LLC, Redmond, WA (US)

(72) Inventors: Miron Vranjes, Seattle, WA (US); Oliver R. Jones, Seattle, WA (US); Nils Anders Sundelin, Duvall, WA (US); Chaitanya Dev Sareen, Seattle, WA (US); Steven J. Frederickson, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 459 days.

(21) Appl. No.: 14/448,871

(22) Filed: Jul. 31, 2014

(65) Prior Publication Data

US 2016/0034155 A1 Feb. 4, 2016

(51) Int. Cl.
*G06F 3/0484* (2013.01)
*G06F 3/0481* (2013.01)

(52) U.S. Cl.
CPC ........ *G06F 3/04847* (2013.01); *G06F 3/0481* (2013.01); *G06F 3/04842* (2013.01); *G06F 2203/04803* (2013.01)

(58) Field of Classification Search
CPC ............... G06F 3/04847; G06F 3/0481; G06F 3/04842; G06F 2203/04803
USPC .................................................. 715/803, 807
See application file for complete search history.

(56) References Cited

U.S. PATENT DOCUMENTS

| | | | |
|---|---|---|---|
| 3,227,888 A | 1/1966 | Shepherd et al. |
| 3,410,774 A | 11/1968 | Barson et al. |
| 3,542,453 A | 11/1970 | Kantor |
| 3,836,258 A | 9/1974 | Courten et al. |
| 3,906,528 A | 9/1975 | Johnson |
| 3,971,065 A | 7/1976 | Bayer |
| 4,200,395 A | 4/1980 | Smith et al. |
| 4,294,507 A | 10/1981 | Johnson |
| 4,343,890 A | 8/1982 | Phillips et al. |
| 4,402,610 A | 9/1983 | Lacombat |
| 4,560,249 A | 12/1985 | Nishiwaki et al. |
| 4,664,524 A | 5/1987 | Hattori et al. |
| 4,711,512 A | 12/1987 | Upatnieks |
| 4,758,087 A | 7/1988 | Hicks, Jr. |
| 4,799,752 A | 1/1989 | Carome |
| 4,822,145 A | 4/1989 | Staelin |
| 4,823,283 A | 4/1989 | Diehm et al. |
| 4,860,361 A | 8/1989 | Sato et al. |

(Continued)

FOREIGN PATENT DOCUMENTS

| | | |
|---|---|---|
| CN | 1440513 A | 9/2003 |
| CN | 1904823 | 1/2007 |

(Continued)

OTHER PUBLICATIONS

US 9,632,316 B2, 04/2017, Levola (withdrawn)

(Continued)

*Primary Examiner* — John T Repsher, III

(57) ABSTRACT

This document describes techniques and apparatuses enabling adaptive sizing and positioning of application windows. In some embodiments, these techniques and apparatuses enable sizing and positioning of application windows to provide an optimized layout of application windows.

19 Claims, 28 Drawing Sheets

(56) References Cited

U.S. PATENT DOCUMENTS

| | | |
|---|---|---|
| 4,900,129 A | 2/1990 | Vanderwerf |
| 4,957,351 A | 9/1990 | Shioji |
| 5,004,673 A | 4/1991 | Vlannes |
| 5,019,808 A | 5/1991 | Prince et al. |
| 5,019,898 A | 5/1991 | Chao et al. |
| 5,045,997 A | 9/1991 | Watanabe |
| 5,046,001 A | 9/1991 | Barker et al. |
| 5,106,181 A | 4/1992 | Rockwell, III |
| 5,114,236 A | 5/1992 | Matsugu et al. |
| 5,146,355 A | 9/1992 | Prince et al. |
| 5,162,656 A | 11/1992 | Matsugu et al. |
| 5,189,732 A | 2/1993 | Kondo |
| 5,216,257 A | 6/1993 | Brueck et al. |
| 5,258,748 A | 11/1993 | Jones |
| 5,297,032 A | 3/1994 | Trojan et al. |
| 5,305,389 A | 4/1994 | Palmer |
| 5,309,169 A | 5/1994 | Lippert |
| 5,313,535 A | 5/1994 | Williams |
| 5,321,750 A | 6/1994 | Nadan |
| 5,339,392 A | 8/1994 | Risberg et al. |
| 5,359,444 A | 10/1994 | Piosenka et al. |
| 5,413,884 A | 5/1995 | Koch et al. |
| 5,432,932 A | 7/1995 | Chen et al. |
| 5,453,877 A | 9/1995 | Gerbe et al. |
| 5,455,458 A | 10/1995 | Quon et al. |
| 5,459,611 A | 10/1995 | Bohn et al. |
| 5,463,725 A | 10/1995 | Henckel et al. |
| 5,483,307 A | 1/1996 | Anderson |
| 5,485,197 A | 1/1996 | Hoarty |
| 5,487,143 A | 1/1996 | Southgate |
| 5,491,580 A | 2/1996 | O'Meara |
| 5,495,566 A | 2/1996 | Kwatinetz |
| 5,515,495 A | 5/1996 | Ikemoto |
| 5,543,588 A | 8/1996 | Bisset et al. |
| 5,549,212 A | 8/1996 | Kanoh et al. |
| 5,574,473 A | 11/1996 | Sekiguchi |
| 5,574,836 A | 11/1996 | Broemmelsiek |
| 5,579,830 A | 12/1996 | Giammaruti |
| 5,583,609 A | 12/1996 | Mizutani et al. |
| 5,598,523 A | 1/1997 | Fujita |
| 5,606,455 A | 2/1997 | Eichenlaub |
| 5,611,060 A | 3/1997 | Belfiore et al. |
| 5,614,941 A | 3/1997 | Hines |
| 5,623,613 A | 4/1997 | Rowe et al. |
| 5,623,666 A | 4/1997 | Pike et al. |
| 5,630,902 A | 5/1997 | Galarneau et al. |
| 5,640,176 A | 6/1997 | Mundt et al. |
| 5,648,643 A | 7/1997 | Knowles et al. |
| 5,650,827 A | 7/1997 | Tsumori et al. |
| 5,651,414 A | 7/1997 | Suzuki et al. |
| 5,657,049 A | 8/1997 | Ludolph et al. |
| 5,673,146 A | 9/1997 | Kelly |
| 5,675,329 A | 10/1997 | Barker |
| 5,687,331 A | 11/1997 | Volk et al. |
| 5,705,321 A | 1/1998 | Brueck et al. |
| 5,708,449 A | 1/1998 | Heacock et al. |
| 5,708,736 A | 1/1998 | Steinblatt |
| 5,712,995 A | 1/1998 | Cohn |
| 5,714,967 A | 2/1998 | Okamura et al. |
| 5,737,171 A | 4/1998 | Buller et al. |
| 5,751,476 A | 5/1998 | Matsui et al. |
| 5,771,042 A | 6/1998 | Santos-Gomez |
| 5,771,320 A | 6/1998 | Stone |
| 5,772,903 A | 6/1998 | Hirsch |
| 5,793,415 A | 8/1998 | Gregory et al. |
| 5,819,284 A | 10/1998 | Farber et al. |
| 5,844,547 A | 12/1998 | Minakuchi et al. |
| 5,856,842 A | 1/1999 | Tedesco |
| 5,860,073 A | 1/1999 | Ferrel et al. |
| 5,861,931 A | 1/1999 | Gillian et al. |
| 5,880,725 A | 3/1999 | Southgate |
| 5,886,822 A | 3/1999 | Spitzer |
| 5,889,517 A | 3/1999 | Ueda et al. |
| 5,905,492 A | 5/1999 | Straub et al. |
| 5,914,720 A | 6/1999 | Maples et al. |
| 5,920,315 A | 7/1999 | Santos-Gomez |
| 5,940,076 A | 8/1999 | Sommers et al. |
| 5,940,149 A | 8/1999 | Vanderwerf |
| 5,959,621 A | 9/1999 | Nawaz et al. |
| 5,959,664 A | 9/1999 | Woodgate |
| 5,963,204 A | 10/1999 | Ikeda et al. |
| 5,982,553 A | 11/1999 | Bloom et al. |
| 5,991,087 A | 11/1999 | Rallison |
| 6,008,809 A * | 12/1999 | Brooks ................. G06F 3/0481 715/792 |
| 6,008,816 A | 12/1999 | Eisler |
| 6,009,519 A | 12/1999 | Jones et al. |
| 6,011,542 A | 1/2000 | Durrani et al. |
| 6,028,600 A | 2/2000 | Rosin et al. |
| 6,057,839 A | 5/2000 | Advani et al. |
| 6,064,383 A | 5/2000 | Skelly |
| 6,086,727 A | 7/2000 | Pinarbasi |
| 6,101,008 A | 8/2000 | Popovich |
| 6,104,418 A | 8/2000 | Tanaka et al. |
| 6,108,003 A | 8/2000 | Hall, Jr. et al. |
| 6,111,585 A | 8/2000 | Choi |
| 6,115,040 A | 9/2000 | Bladow et al. |
| 6,144,439 A | 11/2000 | Carollo |
| 6,160,667 A | 12/2000 | Smoot |
| 6,166,736 A | 12/2000 | Hugh |
| 6,169,829 B1 | 1/2001 | Laming et al. |
| 6,181,852 B1 | 1/2001 | Adams et al. |
| 6,188,405 B1 | 2/2001 | Czerwinski et al. |
| 6,200,711 B1 | 3/2001 | Kurihara et al. |
| 6,211,921 B1 | 4/2001 | Cherian et al. |
| 6,212,564 B1 | 4/2001 | Harter et al. |
| 6,216,141 B1 | 4/2001 | Straub et al. |
| 6,226,178 B1 | 5/2001 | Broder et al. |
| 6,239,502 B1 | 5/2001 | Grewe et al. |
| 6,264,787 B1 | 7/2001 | Burbank |
| 6,266,098 B1 | 7/2001 | Cove et al. |
| 6,271,808 B1 | 8/2001 | Corbin |
| 6,278,448 B1 | 8/2001 | Brown et al. |
| 6,281,940 B1 | 8/2001 | Sciammarella |
| 6,307,142 B1 | 10/2001 | Allen et al. |
| 6,311,058 B1 | 10/2001 | Wecker et al. |
| 6,323,949 B1 | 11/2001 | Lading et al. |
| 6,323,970 B1 | 11/2001 | Popovich |
| 6,369,837 B1 | 4/2002 | Schirmer |
| 6,377,401 B1 | 4/2002 | Bartlett |
| 6,385,630 B1 | 5/2002 | Ejerhed |
| 6,385,641 B1 | 5/2002 | Jiang |
| 6,396,963 B2 | 5/2002 | Shaffer |
| 6,411,307 B1 | 6/2002 | Rosin et al. |
| 6,411,512 B1 | 6/2002 | Mankaruse et al. |
| 6,417,892 B1 | 7/2002 | Sharp et al. |
| 6,424,338 B1 | 7/2002 | Andersone |
| 6,426,753 B1 | 7/2002 | Migdal |
| 6,433,789 B1 | 8/2002 | Rosman |
| 6,446,442 B1 | 9/2002 | Batchelor et al. |
| 6,448,987 B1 | 9/2002 | Easty et al. |
| 6,449,638 B1 | 9/2002 | Wecker et al. |
| 6,456,334 B1 | 9/2002 | Duhault |
| 6,466,198 B1 | 10/2002 | Feinstein |
| 6,470,289 B1 | 10/2002 | Peters et al. |
| 6,481,851 B1 | 11/2002 | McNelley et al. |
| 6,483,580 B1 | 11/2002 | Xu et al. |
| 6,489,977 B2 | 12/2002 | Sone |
| 6,496,218 B2 | 12/2002 | Takigawa et al. |
| 6,505,243 B1 | 1/2003 | Lortz |
| 6,507,643 B1 | 1/2003 | Groner |
| 6,510,144 B1 | 1/2003 | Dommety et al. |
| 6,510,466 B1 | 1/2003 | Cox et al. |
| 6,510,553 B1 | 1/2003 | Hazra |
| 6,529,331 B2 | 3/2003 | Massof et al. |
| 6,538,635 B1 | 3/2003 | Ringot |
| 6,542,307 B2 | 4/2003 | Gleckman et al. |
| 6,545,650 B1 | 4/2003 | Yamada et al. |
| 6,553,165 B1 | 4/2003 | Temkin et al. |
| 6,554,428 B2 | 4/2003 | Fergason et al. |
| 6,570,597 B1 | 5/2003 | Seki et al. |
| 6,577,323 B1 | 6/2003 | Jamieson et al. |
| 6,577,350 B1 | 6/2003 | Proehl et al. |
| 6,577,411 B1 | 6/2003 | David |

(56) References Cited

U.S. PATENT DOCUMENTS

| | | |
|---|---|---|
| 6,580,529 B1 | 6/2003 | Amitai et al. |
| 6,591,244 B2 | 7/2003 | Jim et al. |
| 6,597,374 B1 | 7/2003 | Baker et al. |
| 6,606,152 B2 | 8/2003 | Littau et al. |
| 6,621,702 B2 | 9/2003 | Elias et al. |
| 6,628,309 B1 | 9/2003 | Dodson et al. |
| 6,631,755 B1 | 10/2003 | Kung et al. |
| 6,635,999 B2 | 10/2003 | Belliveau |
| 6,636,246 B1 | 10/2003 | Gallo et al. |
| 6,639,201 B2 | 10/2003 | Almogy et al. |
| 6,661,436 B2 | 12/2003 | Barksdale et al. |
| 6,662,023 B1 | 12/2003 | Helle |
| 6,664,983 B2 | 12/2003 | Ludolph |
| 6,675,387 B1 | 1/2004 | Boucher et al. |
| 6,690,387 B2 | 2/2004 | Zimmerman et al. |
| 6,697,825 B1 | 2/2004 | Underwood et al. |
| 6,707,449 B2 | 3/2004 | Hinckley et al. |
| 6,710,771 B1 | 3/2004 | Yamaguchi et al. |
| 6,721,958 B1 | 4/2004 | Dureau |
| 6,724,403 B1 | 4/2004 | Santoro et al. |
| 6,735,499 B2 | 5/2004 | Ohki et al. |
| 6,753,828 B2 | 6/2004 | Tuceryan et al. |
| 6,775,460 B2 | 8/2004 | Steiner et al. |
| 6,784,925 B1 | 8/2004 | Tomat et al. |
| 6,792,328 B2 | 9/2004 | Laughery et al. |
| 6,798,421 B2 | 9/2004 | Baldwin |
| 6,801,203 B1 | 10/2004 | Hussain |
| 6,804,115 B2 | 10/2004 | Lai |
| 6,807,558 B1 | 10/2004 | Hassett et al. |
| 6,809,925 B2 | 10/2004 | Belady et al. |
| 6,819,426 B2 | 11/2004 | Sezginer et al. |
| 6,825,987 B2 | 11/2004 | Repetto et al. |
| 6,829,093 B1 | 12/2004 | Nakai |
| 6,829,095 B2 | 12/2004 | Amitai |
| 6,832,355 B1 | 12/2004 | Duperrouzel et al. |
| 6,857,104 B1 | 2/2005 | Cahn |
| 6,865,297 B2 | 3/2005 | Loui |
| 6,867,753 B2 | 3/2005 | Chinthammit et al. |
| 6,873,329 B2 | 3/2005 | Cohen et al. |
| 6,876,312 B2 | 4/2005 | Yu |
| 6,877,134 B1 | 4/2005 | Fuller et al. |
| 6,880,132 B2 | 4/2005 | Uemura |
| 6,885,974 B2 | 4/2005 | Holle |
| 6,888,613 B2 | 5/2005 | Robins et al. |
| 6,889,755 B2 | 5/2005 | Zuo et al. |
| 6,898,596 B2 | 5/2005 | Aikens et al. |
| 6,901,403 B1 | 5/2005 | Bata et al. |
| 6,904,597 B2 | 6/2005 | Jin |
| 6,906,901 B1 | 6/2005 | Liu |
| 6,916,584 B2 | 7/2005 | Sreenivasan et al. |
| 6,919,867 B2 | 7/2005 | Sauer |
| 6,920,445 B2 | 7/2005 | Bae |
| 6,938,101 B2 | 8/2005 | Hayes et al. |
| 6,947,020 B2 | 9/2005 | Kiser et al. |
| 6,950,535 B2 | 9/2005 | Sibayama et al. |
| 6,957,071 B1 | 10/2005 | Holur et al. |
| 6,961,731 B2 | 11/2005 | Holbrook |
| 6,964,731 B1 | 11/2005 | Krisko et al. |
| 6,971,067 B1 | 11/2005 | Karson et al. |
| 6,971,443 B2 | 12/2005 | Kung et al. |
| 6,972,776 B2 | 12/2005 | Davis et al. |
| 6,974,714 B2 | 12/2005 | Uno |
| 6,975,306 B2 | 12/2005 | Hinckley |
| 6,976,210 B1 | 12/2005 | Silva et al. |
| 6,978,303 B1 | 12/2005 | McCreesh et al. |
| 6,983,310 B2 | 1/2006 | Rouse |
| 6,987,991 B2 | 1/2006 | Nelson |
| 6,992,738 B2 | 1/2006 | Ishihara et al. |
| 6,997,241 B2 | 2/2006 | Chou et al. |
| 7,006,215 B2 | 2/2006 | Hoff et al. |
| 7,013,041 B2 | 3/2006 | Miyamoto |
| 7,015,876 B1 | 3/2006 | Miller |
| 7,017,119 B1 | 3/2006 | Johnston et al. |
| 7,019,757 B2 | 3/2006 | Brown et al. |
| 7,020,848 B2 | 3/2006 | Rosenzweig et al. |
| 7,028,253 B1 | 4/2006 | Lieberman et al. |
| 7,028,264 B2 | 4/2006 | Santoro et al. |
| 7,031,894 B2 | 4/2006 | Niu et al. |
| 7,032,187 B2 | 4/2006 | Keely, Jr. et al. |
| 7,036,090 B1 | 4/2006 | Nguyen |
| 7,036,091 B1 | 4/2006 | Nguyen |
| 7,042,460 B2 | 5/2006 | Hussain et al. |
| 7,048,385 B2 | 5/2006 | Beeson et al. |
| 7,051,291 B2 | 5/2006 | Sciammarella et al. |
| 7,058,955 B2 | 6/2006 | Porkka |
| 7,061,624 B2 | 6/2006 | Ishizuka |
| 7,065,385 B2 | 6/2006 | Jarrad et al. |
| 7,065,386 B1 | 6/2006 | Smethers |
| 7,069,975 B1 | 7/2006 | Haws et al. |
| 7,072,049 B2 | 7/2006 | Niu et al. |
| 7,075,535 B2 | 7/2006 | Aguera y Arcas |
| 7,089,507 B2 | 8/2006 | Lection et al. |
| 7,091,998 B2 | 8/2006 | Miller-Smith |
| 7,093,201 B2 | 8/2006 | Duarte |
| 7,099,005 B1 | 8/2006 | Fabrikant et al. |
| 7,106,349 B2 | 9/2006 | Baar et al. |
| 7,111,044 B2 | 9/2006 | Lee |
| 7,113,605 B2 | 9/2006 | Rui et al. |
| 7,116,555 B2 | 10/2006 | Kamath et al. |
| 7,133,707 B1 | 11/2006 | Rak |
| 7,133,859 B1 | 11/2006 | Wong |
| 7,139,800 B2 | 11/2006 | Bellotti et al. |
| 7,146,573 B2 | 12/2006 | Brown et al. |
| 7,151,635 B2 | 12/2006 | Bidnyk et al. |
| 7,155,729 B1 | 12/2006 | Andrew et al. |
| 7,158,123 B2 | 1/2007 | Myers et al. |
| 7,158,135 B2 | 1/2007 | Santodomingo et al. |
| 7,159,174 B2 | 1/2007 | Johnson et al. |
| 7,178,111 B2 | 2/2007 | Glein et al. |
| 7,181,699 B2 | 2/2007 | Morrow et al. |
| 7,184,615 B2 | 2/2007 | Levola |
| 7,189,362 B2 | 3/2007 | Nordin et al. |
| 7,191,820 B2 | 3/2007 | Chou et al. |
| 7,193,564 B2 | 3/2007 | Lee |
| 7,194,506 B1 | 3/2007 | White et al. |
| 7,196,758 B2 | 3/2007 | Crawford et al. |
| 7,206,107 B2 | 4/2007 | Levola |
| 7,210,099 B2 | 4/2007 | Rohrabaugh et al. |
| 7,212,709 B2 | 5/2007 | Hosoi |
| 7,212,723 B2 | 5/2007 | McLeod et al. |
| 7,216,588 B2 | 5/2007 | Suess |
| 7,227,880 B2 | 6/2007 | Blauvelt et al. |
| 7,277,880 B1 | 6/2007 | Blauvelt et al. |
| 7,249,326 B2 | 7/2007 | Stoakley et al. |
| 7,250,930 B2 | 7/2007 | Hoffman et al. |
| 7,253,445 B2 | 8/2007 | Heremans et al. |
| 7,261,453 B2 | 8/2007 | Morejon et al. |
| 7,261,827 B2 | 8/2007 | Ootsu et al. |
| 7,262,775 B2 | 8/2007 | Calkins et al. |
| 7,263,668 B1 | 8/2007 | Lentz |
| 7,271,795 B2 | 9/2007 | Bradski |
| 7,277,282 B2 | 10/2007 | Tate |
| 7,280,097 B2 | 10/2007 | Chen |
| 7,283,620 B2 | 10/2007 | Adamczyk |
| 7,289,806 B2 | 10/2007 | Morris et al. |
| 7,296,184 B2 | 11/2007 | Derks et al. |
| 7,296,242 B2 | 11/2007 | Agata et al. |
| 7,301,587 B2 | 11/2007 | Uehara et al. |
| 7,310,100 B2 | 12/2007 | Hussain |
| 7,324,754 B2 | 1/2008 | Kobayashi et al. |
| 7,333,092 B2 | 2/2008 | Zadesky et al. |
| 7,333,120 B2 | 2/2008 | Venolia |
| 7,333,690 B1 | 2/2008 | Peale et al. |
| 7,336,263 B2 | 2/2008 | Valikangas |
| 7,336,887 B2 | 2/2008 | Satoh et al. |
| 7,337,018 B2 | 2/2008 | Espinoza-Ibarra et al. |
| 7,359,420 B2 | 4/2008 | Shchegrov et al. |
| 7,365,734 B2 | 4/2008 | Fateh et al. |
| 7,366,742 B1 | 4/2008 | Umbehocker et al. |
| 7,369,101 B2 | 5/2008 | Sauer et al. |
| 7,369,647 B2 | 5/2008 | Gao et al. |
| 7,372,565 B1 | 5/2008 | Holden et al. |
| 7,376,852 B2 | 5/2008 | Edwards |
| 7,376,907 B2 | 5/2008 | Santoro et al. |

(56) References Cited

U.S. PATENT DOCUMENTS

| | | |
|---|---|---|
| 7,386,807 B2 | 6/2008 | Cummins et al. |
| 7,388,578 B2 | 6/2008 | Tao |
| 7,396,133 B2 | 7/2008 | Burnett et al. |
| 7,399,420 B2 | 7/2008 | Paek et al. |
| 7,403,191 B2 | 7/2008 | Sinclair |
| 7,408,538 B2 | 8/2008 | Hinckley et al. |
| 7,412,306 B2 | 8/2008 | Katoh et al. |
| 7,412,663 B2 | 8/2008 | Lindsay et al. |
| 7,416,017 B2 | 8/2008 | Haws et al. |
| 7,417,617 B2 | 8/2008 | Eichenlaub |
| 7,418,170 B2 | 8/2008 | Mukawa et al. |
| 7,428,001 B2 | 9/2008 | Schowengerdt et al. |
| 7,430,349 B2 | 9/2008 | Jones |
| 7,430,355 B2 | 9/2008 | Heikenfeld et al. |
| 7,433,920 B2 | 10/2008 | Blagsvedt et al. |
| 7,437,678 B2 | 10/2008 | Awada et al. |
| 7,447,520 B2 | 11/2008 | Scott |
| 7,455,102 B2 | 11/2008 | Cheng |
| 7,461,151 B2 | 12/2008 | Colson et al. |
| 7,469,380 B2 | 12/2008 | Wessling et al. |
| 7,469,381 B2 | 12/2008 | Ording |
| 7,478,326 B2 | 1/2009 | Holecek et al. |
| 7,479,949 B2 | 1/2009 | Jobs |
| 7,480,870 B2 | 1/2009 | Anzures |
| 7,483,418 B2 | 1/2009 | Maurer |
| 7,484,182 B1 | 1/2009 | Smith |
| 7,487,467 B1 | 2/2009 | Kawahara et al. |
| 7,496,642 B2 | 2/2009 | Gill et al. |
| 7,496,830 B2 | 2/2009 | Rubin |
| 7,500,175 B2 | 3/2009 | Colle et al. |
| 7,505,269 B1 | 3/2009 | Cosley et al. |
| 7,512,966 B2 | 3/2009 | Lyons, Jr. et al. |
| 7,513,627 B2 | 4/2009 | Larson et al. |
| 7,515,143 B2 | 4/2009 | Keam et al. |
| 7,515,279 B2 | 4/2009 | Raymond |
| 7,518,740 B2 | 4/2009 | Chard et al. |
| 7,532,227 B2 | 5/2009 | Nakajima et al. |
| 7,539,371 B2 | 5/2009 | Martinelli et al. |
| 7,542,665 B2 | 6/2009 | Lei |
| 7,551,814 B1 | 6/2009 | Smits |
| 7,576,916 B2 | 8/2009 | Amitai |
| 7,577,918 B2 | 8/2009 | Lindsay |
| 7,581,034 B2 | 8/2009 | Polivy et al. |
| 7,583,327 B2 | 9/2009 | Takatani |
| 7,587,419 B2 | 9/2009 | Thorpe et al. |
| 7,593,995 B1 | 9/2009 | He et al. |
| 7,595,810 B2 | 9/2009 | Louch |
| 7,599,790 B2 | 10/2009 | Rasmussen et al. |
| 7,600,189 B2 | 10/2009 | Fujisawa |
| 7,600,234 B2 | 10/2009 | Dobrowski et al. |
| 7,606,714 B2 | 10/2009 | Williams et al. |
| 7,607,106 B2 | 10/2009 | Ernst et al. |
| 7,607,111 B2 | 10/2009 | Vaananen et al. |
| 7,610,563 B2 | 10/2009 | Nelson et al. |
| 7,612,882 B2 | 11/2009 | Wu et al. |
| 7,613,689 B2 | 11/2009 | Arrouye et al. |
| 7,619,615 B1 | 11/2009 | Donoghue |
| 7,619,895 B1 | 11/2009 | Wertz et al. |
| 7,631,687 B2 | 12/2009 | Yang |
| 7,634,478 B2 | 12/2009 | Yang et al. |
| 7,640,518 B2 | 12/2009 | Forlines et al. |
| 7,646,606 B2 | 1/2010 | Rytka et al. |
| 7,646,950 B2 | 1/2010 | Park et al. |
| 7,649,594 B2 | 1/2010 | Kim et al. |
| 7,653,883 B2 | 1/2010 | Hotelling et al. |
| 7,656,912 B2 | 2/2010 | Brueck et al. |
| 7,657,849 B2 | 2/2010 | Chaudhri et al. |
| 7,660,500 B2 | 2/2010 | Konttinen et al. |
| 7,663,607 B2 | 2/2010 | Hotelling et al. |
| 7,664,067 B2 | 2/2010 | Pointer |
| 7,668,842 B2 | 2/2010 | LaChapelle et al. |
| 7,671,756 B2 | 3/2010 | Herz et al. |
| 7,679,641 B2 | 3/2010 | Lipton et al. |
| 7,693,292 B1 | 4/2010 | Gross et al. |
| 7,693,911 B2 | 4/2010 | Wories et al. |
| 7,701,716 B2 | 4/2010 | Blanco et al. |
| 7,702,683 B1 | 4/2010 | Kirshenbaum |
| 7,706,785 B2 | 4/2010 | Lei et al. |
| 7,716,003 B1 | 5/2010 | Wack et al. |
| 7,716,317 B2 | 5/2010 | Kumar et al. |
| 7,719,769 B2 | 5/2010 | Sugihara et al. |
| 7,728,933 B2 | 6/2010 | Kim et al. |
| 7,730,113 B1 | 6/2010 | Payette et al. |
| 7,752,265 B2 | 7/2010 | Svendsen et al. |
| 7,755,674 B2 | 7/2010 | Kaminaga |
| 7,764,413 B2 | 7/2010 | Levola |
| 7,768,534 B2 | 8/2010 | Pentenrieder et al. |
| 7,777,944 B2 | 8/2010 | Ho et al. |
| 7,783,669 B2 | 8/2010 | Qiu et al. |
| 7,788,474 B2 | 8/2010 | Switzer et al. |
| 7,817,104 B2 | 10/2010 | Ryu et al. |
| 7,818,336 B1 | 10/2010 | Amidon et al. |
| 7,826,508 B2 | 11/2010 | Reid et al. |
| 7,832,865 B2 | 11/2010 | Hsiao et al. |
| 7,834,861 B2 | 11/2010 | Lee |
| 7,843,691 B2 | 11/2010 | Reichert et al. |
| 7,856,380 B1 | 12/2010 | Latin-Stoermer et al. |
| 7,871,811 B2 | 1/2011 | Fang et al. |
| 7,877,707 B2 | 1/2011 | Westerman et al. |
| 7,880,728 B2 | 2/2011 | De Los Reyes et al. |
| 7,882,115 B2 | 2/2011 | Hirsch |
| 7,889,180 B2 | 2/2011 | Byun et al. |
| 7,890,882 B1 | 2/2011 | Nelson |
| 7,894,613 B1 | 2/2011 | Ong et al. |
| 7,895,309 B2 | 2/2011 | Belali et al. |
| 7,903,409 B2 | 3/2011 | Patel et al. |
| 7,904,832 B2 | 3/2011 | Ubillos |
| 7,908,273 B2 | 3/2011 | DiMaria et al. |
| 7,909,958 B2 | 3/2011 | Washburn et al. |
| 7,924,271 B2 | 4/2011 | Christie et al. |
| 7,933,632 B2 | 4/2011 | Flynt et al. |
| 7,941,231 B1 | 5/2011 | Dunn |
| 7,949,214 B2 | 5/2011 | DeJong |
| 7,962,281 B2 | 6/2011 | Rasmussen et al. |
| 7,966,184 B2 | 6/2011 | O'Conor et al. |
| 7,983,718 B1 | 7/2011 | Roka |
| 7,986,462 B2 | 7/2011 | Kobayashi et al. |
| 7,987,431 B2 | 7/2011 | Santoro et al. |
| 7,987,490 B2 | 7/2011 | Ansari et al. |
| 7,992,103 B2 | 8/2011 | Gusmorino et al. |
| 8,004,621 B2 | 8/2011 | Woodgate et al. |
| 8,006,276 B2 | 8/2011 | Nakagawa et al. |
| 8,014,644 B2 | 9/2011 | Morimoto et al. |
| 8,033,709 B2 | 10/2011 | Kao et al. |
| 8,035,896 B2 | 10/2011 | Taira et al. |
| 8,046,616 B2 | 10/2011 | Edwards |
| 8,060,514 B2 | 11/2011 | Arrouye et al. |
| 8,061,411 B2 | 11/2011 | Xu |
| 8,085,948 B2 | 12/2011 | Thomas et al. |
| 8,086,275 B2 | 12/2011 | Wykes |
| 8,092,064 B2 | 1/2012 | Erchak et al. |
| 8,094,948 B2 | 1/2012 | Jain et al. |
| 8,108,430 B2 | 1/2012 | Wong et al. |
| 8,108,781 B2 | 1/2012 | Laansoo et al. |
| 8,125,579 B2 | 2/2012 | Khan et al. |
| 8,128,800 B2 | 3/2012 | Seo et al. |
| 8,131,118 B1 | 3/2012 | Jing et al. |
| 8,131,808 B2 | 3/2012 | Aoki et al. |
| 8,139,504 B2 | 3/2012 | Mankins et al. |
| 8,150,893 B2 | 4/2012 | Bohannon et al. |
| 8,150,924 B2 | 4/2012 | Buchheit et al. |
| 8,160,411 B2 | 4/2012 | Levola et al. |
| 8,162,524 B2 | 4/2012 | Van Ostrand et al. |
| 8,165,988 B2 | 4/2012 | Shau et al. |
| 8,175,653 B2 | 5/2012 | Smuga |
| 8,176,436 B2 | 5/2012 | Arend et al. |
| 8,176,438 B2 | 5/2012 | Zeman et al. |
| 8,189,263 B1 | 5/2012 | Wang et al. |
| 8,195,220 B2 | 6/2012 | Kim et al. |
| 8,200,704 B2 | 6/2012 | Petakov et al. |
| 8,209,623 B2 | 6/2012 | Barletta et al. |
| 8,225,193 B1 | 7/2012 | Kleinschnitz et al. |
| 8,233,204 B1 | 7/2012 | Robbins et al. |
| 8,233,273 B2 | 7/2012 | Chen et al. |

(56) References Cited

U.S. PATENT DOCUMENTS

| | | |
|---|---|---|
| 8,238,876 B2 | 8/2012 | Teng |
| 8,244,667 B1 | 8/2012 | Weinberger et al. |
| 8,245,152 B2 | 8/2012 | Brunner et al. |
| 8,246,170 B2 | 8/2012 | Yamamoto et al. |
| 8,250,494 B2 | 8/2012 | Butcher |
| 8,255,473 B2 | 8/2012 | Eren et al. |
| 8,255,812 B1 | 8/2012 | Parparita et al. |
| 8,266,115 B1 | 9/2012 | Park et al. |
| 8,269,736 B2 | 9/2012 | Wilairat |
| 8,274,614 B2 | 9/2012 | Yokote et al. |
| 8,280,861 B1 | 10/2012 | Park et al. |
| 8,285,810 B2 | 10/2012 | Svendsen et al. |
| 8,291,349 B1 | 10/2012 | Park et al. |
| 8,296,380 B1 | 10/2012 | Kelly et al. |
| 8,300,614 B2 | 10/2012 | Ankaiah et al. |
| 8,307,279 B1 | 11/2012 | Fioravanti et al. |
| 8,320,032 B1 | 11/2012 | Levola |
| 8,332,402 B2 | 12/2012 | Forstall et al. |
| 8,341,037 B2 | 12/2012 | Bachman et al. |
| 8,358,400 B2 | 1/2013 | Escuti |
| 8,384,726 B1 | 2/2013 | Grabowski et al. |
| 8,384,999 B1 | 2/2013 | Crosby et al. |
| 8,392,035 B2 | 3/2013 | Patel et al. |
| 8,395,898 B1 | 3/2013 | Chamseddine et al. |
| 8,402,071 B2 | 3/2013 | Skillcorn |
| 8,418,083 B1 | 4/2013 | Lundy et al. |
| 8,429,565 B2 | 4/2013 | Agarawala et al. |
| 8,434,019 B2 | 4/2013 | Nelson |
| 8,446,340 B2 | 5/2013 | Aharoni |
| 8,448,083 B1 | 5/2013 | Migos et al. |
| 8,464,133 B2 | 6/2013 | Grube et al. |
| 8,466,953 B2 | 6/2013 | Levola |
| 8,472,119 B1 | 6/2013 | Kelly |
| 8,473,870 B2 | 6/2013 | Hinckley et al. |
| 8,482,920 B2 | 7/2013 | Tissot et al. |
| 8,525,808 B1 | 9/2013 | Buening |
| 8,526,993 B2 | 9/2013 | Bria et al. |
| 8,538,351 B2 | 9/2013 | Wilson et al. |
| 8,539,384 B2 | 9/2013 | Hinckley et al. |
| 8,548,431 B2 | 10/2013 | Teng et al. |
| 8,554,784 B2 | 10/2013 | Nurminen et al. |
| 8,560,959 B2 | 10/2013 | Zaman et al. |
| 8,571,539 B1 | 10/2013 | Ranganathan et al. |
| 8,576,143 B1 | 11/2013 | Kelly |
| 8,589,341 B2 | 11/2013 | Golde et al. |
| 8,589,815 B2 | 11/2013 | Fong et al. |
| 8,593,734 B2 | 11/2013 | Laakkonen |
| 8,594,702 B2 | 11/2013 | Naaman et al. |
| 8,605,700 B2 | 12/2013 | Gurin |
| 8,611,014 B2 | 12/2013 | Valera et al. |
| 8,612,874 B2 | 12/2013 | Zaman et al. |
| 8,612,888 B2 | 12/2013 | Pennington et al. |
| 8,627,227 B2 | 1/2014 | Matthews et al. |
| 8,627,228 B2 | 1/2014 | Yosef et al. |
| 8,629,815 B2 | 1/2014 | Brin et al. |
| 8,634,139 B1 | 1/2014 | Brown et al. |
| 8,634,674 B2 | 1/2014 | Hanechak |
| 8,638,498 B2 | 1/2014 | Bohn et al. |
| 8,645,871 B2 | 2/2014 | Fong et al. |
| 8,666,212 B1 | 3/2014 | Amirparviz |
| 8,687,023 B2 | 4/2014 | Markiewicz et al. |
| 8,689,123 B2 | 4/2014 | Zaman et al. |
| 8,693,500 B2 | 4/2014 | Ludwig et al. |
| 8,698,845 B2 | 4/2014 | Lemay |
| 8,700,931 B2 | 4/2014 | Gudlavenkatasiva et al. |
| 8,712,598 B2 | 4/2014 | Dighde et al. |
| 8,717,676 B2 | 5/2014 | Rinko |
| 8,745,513 B2 | 6/2014 | Crystal |
| 8,754,831 B2 | 6/2014 | Kollin et al. |
| 8,756,510 B2 | 6/2014 | Bhumkar et al. |
| 8,769,431 B1 | 7/2014 | Prasad |
| 8,793,282 B2 | 7/2014 | Hedinsson et al. |
| 8,796,012 B2 | 8/2014 | Sinclair et al. |
| 8,810,600 B2 | 8/2014 | Bohn et al. |
| 8,817,350 B1 | 8/2014 | Robbins et al. |
| 8,819,079 B2 | 8/2014 | Bush et al. |
| 8,823,531 B1 | 9/2014 | McCleary et al. |
| 8,843,744 B2 | 9/2014 | Sentinelli et al. |
| 8,885,997 B2 | 11/2014 | Nguyen et al. |
| 8,909,384 B1 | 12/2014 | Beitelmal et al. |
| 8,917,453 B2 | 12/2014 | Bohn |
| 8,934,235 B2 | 1/2015 | Rubenstein et al. |
| 8,941,683 B2 | 1/2015 | Son et al. |
| 8,989,535 B2 | 3/2015 | Robbins |
| 8,990,255 B2 | 3/2015 | Metsatahti et al. |
| 9,003,162 B2 | 4/2015 | Lomet et al. |
| 9,104,307 B2 | 8/2015 | Jarrett et al. |
| 9,269,150 B1 | 2/2016 | Seitz |
| 9,304,235 B2 | 4/2016 | Sainiema et al. |
| 9,372,347 B1 | 6/2016 | Levola et al. |
| 9,414,417 B2 | 8/2016 | Hassan et al. |
| 9,423,360 B1 | 8/2016 | Kostamo et al. |
| 9,429,692 B1 | 8/2016 | Saarikko et al. |
| 9,513,480 B2 | 12/2016 | Saarikko et al. |
| 9,514,211 B2 | 12/2016 | Sengupta et al. |
| 9,535,253 B2 | 1/2017 | Levola et al. |
| 9,558,590 B2 | 1/2017 | Westerinen et al. |
| 9,717,981 B2 | 8/2017 | Robbins et al. |
| 9,787,576 B2 | 10/2017 | Leeb et al. |
| 9,827,209 B2 | 11/2017 | Kostamo |
| 9,836,464 B2 | 12/2017 | Larsen et al. |
| 2001/0022621 A1 | 9/2001 | Squibbs |
| 2001/0043208 A1 | 11/2001 | Furness et al. |
| 2002/0000963 A1 | 1/2002 | Yoshida et al. |
| 2002/0018051 A1 | 2/2002 | Singh |
| 2002/0035455 A1 | 3/2002 | Niu et al. |
| 2002/0035607 A1 | 3/2002 | Checkoway |
| 2002/0038196 A1 | 3/2002 | Johnson et al. |
| 2002/0041735 A1 | 4/2002 | Cai et al. |
| 2002/0044152 A1 | 4/2002 | Abbott et al. |
| 2002/0044162 A1 | 4/2002 | Sawatari |
| 2002/0054117 A1 | 5/2002 | van Dantzich et al. |
| 2002/0060701 A1 | 5/2002 | Naughton et al. |
| 2002/0063820 A1 | 5/2002 | Broer et al. |
| 2002/0070961 A1 | 6/2002 | Xu et al. |
| 2002/0077156 A1 | 6/2002 | Smethers |
| 2002/0091755 A1 | 7/2002 | Narin |
| 2002/0097264 A1 | 7/2002 | Dutta et al. |
| 2002/0097558 A1 | 7/2002 | Stone et al. |
| 2002/0105531 A1 | 8/2002 | Niemi |
| 2002/0115476 A1 | 8/2002 | Padawer et al. |
| 2002/0128036 A1 | 9/2002 | Yach et al. |
| 2002/0129061 A1 | 9/2002 | Swart et al. |
| 2002/0138248 A1 | 9/2002 | Corston-Oliver et al. |
| 2002/0138772 A1 | 9/2002 | Crawford et al. |
| 2002/0142762 A1 | 10/2002 | Chmaytelli et al. |
| 2002/0145631 A1 | 10/2002 | Arbab et al. |
| 2002/0152305 A1 | 10/2002 | Jackson et al. |
| 2002/0154176 A1 | 10/2002 | Barksdale et al. |
| 2002/0161634 A1 | 10/2002 | Kaars |
| 2002/0171939 A1 | 11/2002 | Song |
| 2002/0180659 A1 | 12/2002 | Takahashi |
| 2002/0186251 A1 | 12/2002 | Himmel et al. |
| 2002/0191028 A1 | 12/2002 | Senechalle et al. |
| 2002/0194385 A1 | 12/2002 | Linder et al. |
| 2003/0003899 A1 | 1/2003 | Tashiro et al. |
| 2003/0006364 A1 | 1/2003 | Katzir et al. |
| 2003/0008686 A1 | 1/2003 | Park et al. |
| 2003/0011643 A1 | 1/2003 | Nishihihata |
| 2003/0020671 A1 | 1/2003 | Santoro et al. |
| 2003/0021404 A1 | 1/2003 | Wengrovitz |
| 2003/0023889 A1 | 1/2003 | Hofstee et al. |
| 2003/0033402 A1 | 2/2003 | Battat et al. |
| 2003/0040300 A1 | 2/2003 | Bodic |
| 2003/0046396 A1 | 3/2003 | Richter et al. |
| 2003/0073414 A1 | 4/2003 | Capps |
| 2003/0096604 A1 | 5/2003 | Vollandt |
| 2003/0105827 A1 | 6/2003 | Tan et al. |
| 2003/0135582 A1 | 7/2003 | Allen et al. |
| 2003/0137706 A1 | 7/2003 | Rmanujam et al. |
| 2003/0179453 A1 | 9/2003 | Mori et al. |
| 2003/0187996 A1 | 10/2003 | Cardina et al. |
| 2003/0204698 A1 | 10/2003 | Sachedina et al. |
| 2003/0214728 A1 | 11/2003 | Olczak |

(56) References Cited

U.S. PATENT DOCUMENTS

| | | |
|---|---|---|
| 2003/0222907 A1 | 12/2003 | Heikes et al. |
| 2003/0225846 A1 | 12/2003 | Heikes et al. |
| 2004/0011503 A1 | 1/2004 | Kung et al. |
| 2004/0024580 A1 | 2/2004 | Salmonsen et al. |
| 2004/0042724 A1 | 3/2004 | Gombert et al. |
| 2004/0066414 A1 | 4/2004 | Czerwinski et al. |
| 2004/0068543 A1 | 4/2004 | Seifert |
| 2004/0078299 A1 | 4/2004 | Down-Logan |
| 2004/0085649 A1 | 5/2004 | Repetto et al. |
| 2004/0108971 A1 | 6/2004 | Waldern et al. |
| 2004/0109234 A1 | 6/2004 | Levola |
| 2004/0111673 A1 | 6/2004 | Bowman et al. |
| 2004/0135209 A1 | 7/2004 | Hsieh et al. |
| 2004/0139169 A1 | 7/2004 | O'Brien et al. |
| 2004/0141637 A1 | 7/2004 | Bacus et al. |
| 2004/0151466 A1 | 8/2004 | Crossman-Bosworth et al. |
| 2004/0162830 A1 | 8/2004 | Shirwadkar et al. |
| 2004/0176928 A1 | 9/2004 | Johnson |
| 2004/0185883 A1 | 9/2004 | Rukman |
| 2004/0212586 A1 | 10/2004 | Denny |
| 2004/0217954 A1 | 11/2004 | O'Gorman et al. |
| 2004/0217980 A1 | 11/2004 | Radburn et al. |
| 2004/0237048 A1 | 11/2004 | Tojo et al. |
| 2004/0250217 A1 | 12/2004 | Tojo et al. |
| 2004/0267990 A1 | 12/2004 | Lin |
| 2005/0005241 A1 | 1/2005 | Hunleth et al. |
| 2005/0022135 A1* | 1/2005 | de Waal .............. G09G 5/14 715/788 |
| 2005/0028208 A1 | 2/2005 | Ellis |
| 2005/0044058 A1 | 2/2005 | Matthews et al. |
| 2005/0054384 A1 | 3/2005 | Pasquale et al. |
| 2005/0060647 A1 | 3/2005 | Doan et al. |
| 2005/0060658 A1 | 3/2005 | Tsukiori |
| 2005/0060665 A1 | 3/2005 | Rekimoto |
| 2005/0079896 A1 | 4/2005 | Kokko et al. |
| 2005/0085215 A1 | 4/2005 | Kokko |
| 2005/0085272 A1 | 4/2005 | Anderson et al. |
| 2005/0089328 A1 | 4/2005 | Nishiki et al. |
| 2005/0100272 A1 | 5/2005 | Gilman |
| 2005/0105884 A1 | 5/2005 | Satoh |
| 2005/0108655 A1 | 5/2005 | Andrea et al. |
| 2005/0114788 A1 | 5/2005 | Fabritius |
| 2005/0120306 A1 | 6/2005 | Klassen et al. |
| 2005/0128951 A1 | 6/2005 | Chawla et al. |
| 2005/0143138 A1 | 6/2005 | Lee et al. |
| 2005/0149879 A1 | 7/2005 | Jobs et al. |
| 2005/0174737 A1 | 8/2005 | Meir |
| 2005/0182798 A1 | 8/2005 | Todd et al. |
| 2005/0183021 A1 | 8/2005 | Allen et al. |
| 2005/0184999 A1 | 8/2005 | Daioku |
| 2005/0198159 A1 | 9/2005 | Kirsch |
| 2005/0198584 A1 | 9/2005 | Matthews et al. |
| 2005/0200762 A1 | 9/2005 | Barletta et al. |
| 2005/0207120 A1 | 9/2005 | Tseng et al. |
| 2005/0216300 A1 | 9/2005 | Appelman et al. |
| 2005/0223057 A1 | 10/2005 | Buchheit et al. |
| 2005/0223069 A1 | 10/2005 | Cooperman et al. |
| 2005/0232166 A1 | 10/2005 | Nierhaus |
| 2005/0243107 A1 | 11/2005 | Haim et al. |
| 2005/0246352 A1 | 11/2005 | Moore et al. |
| 2005/0248705 A1 | 11/2005 | Smith et al. |
| 2005/0250547 A1 | 11/2005 | Salman et al. |
| 2005/0251566 A1 | 11/2005 | Weel |
| 2005/0268237 A1 | 12/2005 | Crane et al. |
| 2005/0273614 A1 | 12/2005 | Ahuja |
| 2005/0280719 A1 | 12/2005 | Kim |
| 2005/0285878 A1 | 12/2005 | Singh et al. |
| 2006/0004685 A1 | 1/2006 | Pyhalammi et al. |
| 2006/0010394 A1 | 1/2006 | Chaudhri et al. |
| 2006/0015736 A1 | 1/2006 | Callas et al. |
| 2006/0015812 A1 | 1/2006 | Cunningham |
| 2006/0015820 A1 | 1/2006 | Wood |
| 2006/0018025 A1 | 1/2006 | Sharon et al. |
| 2006/0020903 A1 | 1/2006 | Wang et al. |
| 2006/0026013 A1 | 2/2006 | Kraft |
| 2006/0026521 A1 | 2/2006 | Hotelling et al. |
| 2006/0032616 A1 | 2/2006 | Yang |
| 2006/0036425 A1 | 2/2006 | Le Cocq et al. |
| 2006/0038881 A1 | 2/2006 | Starkweather et al. |
| 2006/0048073 A1 | 3/2006 | Jarrett et al. |
| 2006/0048101 A1 | 3/2006 | Krassovsky et al. |
| 2006/0053417 A1 | 3/2006 | Henderson et al. |
| 2006/0054787 A1 | 3/2006 | Olsen et al. |
| 2006/0059430 A1 | 3/2006 | Bells |
| 2006/0061597 A1 | 3/2006 | Hui |
| 2006/0070005 A1 | 3/2006 | Gilbert et al. |
| 2006/0072206 A1 | 4/2006 | Tsuyuki et al. |
| 2006/0074735 A1 | 4/2006 | Shukla et al. |
| 2006/0074771 A1 | 4/2006 | Kim |
| 2006/0075360 A1 | 4/2006 | Bixler |
| 2006/0080401 A1 | 4/2006 | Gill et al. |
| 2006/0103623 A1 | 5/2006 | Davis |
| 2006/0107056 A1 | 5/2006 | Bhatt et al. |
| 2006/0107231 A1 | 5/2006 | Matthews et al. |
| 2006/0112354 A1 | 5/2006 | Park et al. |
| 2006/0118280 A1 | 6/2006 | Liu |
| 2006/0126181 A1 | 6/2006 | Levola |
| 2006/0129543 A1 | 6/2006 | Bates et al. |
| 2006/0129951 A1 | 6/2006 | Vaananen et al. |
| 2006/0132806 A1 | 6/2006 | Shchegrov et al. |
| 2006/0132914 A1 | 6/2006 | Weiss et al. |
| 2006/0135220 A1 | 6/2006 | Kim et al. |
| 2006/0136773 A1 | 6/2006 | Kespohl et al. |
| 2006/0139447 A1 | 6/2006 | Unkrich |
| 2006/0146765 A1 | 7/2006 | Van de sluis et al. |
| 2006/0152646 A1 | 7/2006 | Schrader |
| 2006/0152803 A1 | 7/2006 | Provitola |
| 2006/0155723 A1 | 7/2006 | Kumar et al. |
| 2006/0164382 A1 | 7/2006 | Kulas et al. |
| 2006/0172724 A1 | 8/2006 | Linkert et al. |
| 2006/0173911 A1 | 8/2006 | Levin et al. |
| 2006/0183331 A1 | 8/2006 | Hofmann |
| 2006/0184901 A1 | 8/2006 | Dietz |
| 2006/0190833 A1 | 8/2006 | SanGiovanni et al. |
| 2006/0195481 A1 | 8/2006 | Arrouye et al. |
| 2006/0196643 A1 | 9/2006 | Hata et al. |
| 2006/0199598 A1 | 9/2006 | Lee et al. |
| 2006/0212806 A1 | 9/2006 | Griffin et al. |
| 2006/0218234 A1 | 9/2006 | Deng et al. |
| 2006/0218501 A1 | 9/2006 | Wilson et al. |
| 2006/0221448 A1 | 10/2006 | Nivon et al. |
| 2006/0224993 A1 | 10/2006 | Wong et al. |
| 2006/0228073 A1 | 10/2006 | Mukawa et al. |
| 2006/0235548 A1 | 10/2006 | Gaudette |
| 2006/0246955 A1 | 11/2006 | Nirhamo |
| 2006/0248471 A1 | 11/2006 | Lindsay et al. |
| 2006/0249765 A1 | 11/2006 | Hsieh |
| 2006/0250541 A1 | 11/2006 | Huck |
| 2006/0253801 A1 | 11/2006 | Okaro et al. |
| 2006/0256738 A1 | 11/2006 | Kenoyer et al. |
| 2006/0259870 A1 | 11/2006 | Hewitt et al. |
| 2006/0259873 A1 | 11/2006 | Mister |
| 2006/0262134 A1 | 11/2006 | Hamiter et al. |
| 2006/0262772 A1 | 11/2006 | Guichard et al. |
| 2006/0268100 A1 | 11/2006 | Karukka et al. |
| 2006/0271520 A1 | 11/2006 | Ragan |
| 2006/0271691 A1 | 11/2006 | Jacobs et al. |
| 2006/0281448 A1 | 12/2006 | Plestid et al. |
| 2006/0293088 A1 | 12/2006 | Kokubo |
| 2006/0294063 A1 | 12/2006 | Ali et al. |
| 2006/0294396 A1 | 12/2006 | Witman |
| 2007/0002412 A1 | 1/2007 | Aihara |
| 2007/0005334 A1 | 1/2007 | Salmonsen |
| 2007/0005716 A1 | 1/2007 | LeVasseur et al. |
| 2007/0006094 A1 | 1/2007 | Canfield et al. |
| 2007/0008456 A1 | 1/2007 | Lesage et al. |
| 2007/0011610 A1 | 1/2007 | Sethi et al. |
| 2007/0015532 A1 | 1/2007 | Deelman |
| 2007/0023703 A1 | 2/2007 | Sunaoshi et al. |
| 2007/0024646 A1 | 2/2007 | Saarinen |
| 2007/0027591 A1 | 2/2007 | Goldenberg et al. |
| 2007/0033225 A1 | 2/2007 | Davis |
| 2007/0033279 A1 | 2/2007 | Battat et al. |
| 2007/0035513 A1 | 2/2007 | Sherrard et al. |

(56) References Cited

U.S. PATENT DOCUMENTS

| | | |
|---|---|---|
| 2007/0038567 A1 | 2/2007 | Allaire et al. |
| 2007/0041684 A1 | 2/2007 | Popovich et al. |
| 2007/0050467 A1 | 3/2007 | Borrett et al. |
| 2007/0050724 A1 | 3/2007 | Lee et al. |
| 2007/0054679 A1 | 3/2007 | Cho et al. |
| 2007/0061488 A1 | 3/2007 | Alagappan et al. |
| 2007/0061714 A1 | 3/2007 | Stuple et al. |
| 2007/0063995 A1 | 3/2007 | Bailey et al. |
| 2007/0067272 A1 | 3/2007 | Flynt |
| 2007/0067737 A1 | 3/2007 | Zielinski et al. |
| 2007/0073718 A1 | 3/2007 | Ramer |
| 2007/0076013 A1 | 4/2007 | Campbell |
| 2007/0080954 A1 | 4/2007 | Griffin |
| 2007/0082707 A1 | 4/2007 | Flynt et al. |
| 2007/0082708 A1 | 4/2007 | Griffin |
| 2007/0083746 A1 | 4/2007 | Fallon et al. |
| 2007/0083821 A1 | 4/2007 | Garbow et al. |
| 2007/0097019 A1 | 5/2007 | Wynne-powell et al. |
| 2007/0106635 A1 | 5/2007 | Frieden et al. |
| 2007/0120835 A1 | 5/2007 | Sato |
| 2007/0127638 A1 | 6/2007 | Doulton |
| 2007/0147673 A1 | 6/2007 | Crandall |
| 2007/0153395 A1 | 7/2007 | Repetto et al. |
| 2007/0157089 A1 | 7/2007 | Van Os et al. |
| 2007/0169165 A1 | 7/2007 | Crull et al. |
| 2007/0171192 A1 | 7/2007 | Seo et al. |
| 2007/0171328 A1 | 7/2007 | Freeman et al. |
| 2007/0177260 A1 | 8/2007 | Kuppenheimer et al. |
| 2007/0180401 A1 | 8/2007 | Singh et al. |
| 2007/0182595 A1 | 8/2007 | Ghasabian |
| 2007/0182999 A1 | 8/2007 | Anthony et al. |
| 2007/0185847 A1 | 8/2007 | Budzik et al. |
| 2007/0192707 A1 | 8/2007 | Maeda et al. |
| 2007/0192730 A1 | 8/2007 | Simila et al. |
| 2007/0192733 A1 | 8/2007 | Horiuchi |
| 2007/0192739 A1 | 8/2007 | Hunleth et al. |
| 2007/0197196 A1 | 8/2007 | Shenfield et al. |
| 2007/0198420 A1 | 8/2007 | Goldstein |
| 2007/0208687 A1 | 9/2007 | O'Conor et al. |
| 2007/0208840 A1 | 9/2007 | Mcconville et al. |
| 2007/0211034 A1 | 9/2007 | Griffin et al. |
| 2007/0214180 A1 | 9/2007 | Crawford |
| 2007/0214228 A1 | 9/2007 | Horvitz et al. |
| 2007/0214429 A1 | 9/2007 | Lyudovyk et al. |
| 2007/0216651 A1 | 9/2007 | Patel |
| 2007/0216661 A1 | 9/2007 | Chen et al. |
| 2007/0225022 A1 | 9/2007 | Satake |
| 2007/0233654 A1 | 10/2007 | Karlson |
| 2007/0233803 A1 | 10/2007 | Stienhans |
| 2007/0236468 A1 | 10/2007 | Tuli |
| 2007/0236959 A1 | 10/2007 | Tolbert et al. |
| 2007/0238488 A1 | 10/2007 | Scott |
| 2007/0247435 A1 | 10/2007 | Benko et al. |
| 2007/0250583 A1 | 10/2007 | Hardy |
| 2007/0250787 A1 | 10/2007 | Kawahara et al. |
| 2007/0250788 A1* | 10/2007 | Rigolet .............. G06F 3/0481 715/788 |
| 2007/0253545 A1 | 11/2007 | Chatterjee et al. |
| 2007/0253758 A1 | 11/2007 | Suess |
| 2007/0256029 A1 | 11/2007 | Maxwell |
| 2007/0257891 A1 | 11/2007 | Esenther et al. |
| 2007/0257933 A1 | 11/2007 | Klassen |
| 2007/0260674 A1 | 11/2007 | Shenfield |
| 2007/0262964 A1 | 11/2007 | Zotov et al. |
| 2007/0263843 A1 | 11/2007 | Foxenland |
| 2007/0268200 A1 | 11/2007 | Fuller et al. |
| 2007/0273663 A1 | 11/2007 | Park et al. |
| 2007/0273668 A1 | 11/2007 | Park et al. |
| 2007/0280457 A1 | 12/2007 | Aberethy |
| 2007/0281747 A1 | 12/2007 | Pletikosa |
| 2007/0284093 A1 | 12/2007 | Bhatti et al. |
| 2007/0288478 A1 | 12/2007 | DiMaria et al. |
| 2007/0300158 A1 | 12/2007 | Kasperkiewicz et al. |
| 2008/0005348 A1 | 1/2008 | Kosiba et al. |
| 2008/0005668 A1 | 1/2008 | Mavinkurve |
| 2008/0008076 A1 | 1/2008 | Raguin et al. |
| 2008/0014534 A1 | 1/2008 | Barwicz et al. |
| 2008/0025350 A1 | 1/2008 | Arbore et al. |
| 2008/0028294 A1 | 1/2008 | Sell et al. |
| 2008/0032681 A1 | 2/2008 | West |
| 2008/0036743 A1 | 2/2008 | Westerman et al. |
| 2008/0040359 A1 | 2/2008 | Arrouye et al. |
| 2008/0040578 A1 | 2/2008 | Kang et al. |
| 2008/0040692 A1 | 2/2008 | Sunday et al. |
| 2008/0043100 A1 | 2/2008 | Sobel et al. |
| 2008/0043425 A1 | 2/2008 | Hebert et al. |
| 2008/0048986 A1 | 2/2008 | Khoo |
| 2008/0049704 A1 | 2/2008 | Witteman et al. |
| 2008/0052370 A1 | 2/2008 | Snyder |
| 2008/0057910 A1 | 3/2008 | Thoresson et al. |
| 2008/0057926 A1 | 3/2008 | Forstall et al. |
| 2008/0059535 A1 | 3/2008 | Lindsley et al. |
| 2008/0065607 A1 | 3/2008 | Weber |
| 2008/0072173 A1 | 3/2008 | Brunner et al. |
| 2008/0076472 A1 | 3/2008 | Hyatt |
| 2008/0082911 A1 | 4/2008 | Sorotokin et al. |
| 2008/0082934 A1 | 4/2008 | Kocienda et al. |
| 2008/0085700 A1 | 4/2008 | Arora |
| 2008/0088603 A1 | 4/2008 | Eliasson et al. |
| 2008/0088624 A1 | 4/2008 | Long et al. |
| 2008/0092054 A1 | 4/2008 | Bhumkar et al. |
| 2008/0094368 A1 | 4/2008 | Ording et al. |
| 2008/0095100 A1 | 4/2008 | Cleveland et al. |
| 2008/0102863 A1 | 5/2008 | Hardy |
| 2008/0104544 A1 | 5/2008 | Collins et al. |
| 2008/0106677 A1 | 5/2008 | Kuan et al. |
| 2008/0107057 A1 | 5/2008 | Kannan et al. |
| 2008/0113656 A1 | 5/2008 | Lee et al. |
| 2008/0114535 A1 | 5/2008 | Nesbitt |
| 2008/0117341 A1 | 5/2008 | Mcgrew |
| 2008/0120571 A1 | 5/2008 | Chang et al. |
| 2008/0122796 A1 | 5/2008 | Jobs |
| 2008/0126989 A1 | 5/2008 | Flores et al. |
| 2008/0132252 A1 | 6/2008 | Altman et al. |
| 2008/0141153 A1 | 6/2008 | Samson et al. |
| 2008/0141681 A1 | 6/2008 | Arnold |
| 2008/0150913 A1 | 6/2008 | Bell et al. |
| 2008/0153551 A1 | 6/2008 | Baek et al. |
| 2008/0155425 A1 | 6/2008 | Murthy et al. |
| 2008/0158189 A1 | 7/2008 | Kim |
| 2008/0162651 A1 | 7/2008 | Madnani |
| 2008/0163104 A1 | 7/2008 | Haug |
| 2008/0165132 A1 | 7/2008 | Weiss |
| 2008/0165136 A1 | 7/2008 | Christie et al. |
| 2008/0165141 A1 | 7/2008 | Christie |
| 2008/0165163 A1 | 7/2008 | Bathiche |
| 2008/0167058 A1 | 7/2008 | Lee et al. |
| 2008/0168349 A1 | 7/2008 | Lamiraux et al. |
| 2008/0168379 A1 | 7/2008 | Forstall et al. |
| 2008/0168382 A1 | 7/2008 | Louch et al. |
| 2008/0168402 A1 | 7/2008 | Blumenberg |
| 2008/0168403 A1 | 7/2008 | Westerman et al. |
| 2008/0172609 A1 | 7/2008 | Rytivaara |
| 2008/0174570 A1 | 7/2008 | Jobs et al. |
| 2008/0174735 A1 | 7/2008 | Quach et al. |
| 2008/0180399 A1 | 7/2008 | Cheng |
| 2008/0182628 A1 | 7/2008 | Lee et al. |
| 2008/0184112 A1 | 7/2008 | Chiang et al. |
| 2008/0189303 A1 | 8/2008 | Bush et al. |
| 2008/0189653 A1 | 8/2008 | Taylor et al. |
| 2008/0189658 A1 | 8/2008 | Jeong et al. |
| 2008/0192056 A1 | 8/2008 | Robertson et al. |
| 2008/0198141 A1 | 8/2008 | Lee et al. |
| 2008/0200142 A1 | 8/2008 | Abdel-Kader et al. |
| 2008/0208973 A1 | 8/2008 | Hayashi |
| 2008/0222273 A1 | 9/2008 | Lakshmanan |
| 2008/0222545 A1 | 9/2008 | Lemay et al. |
| 2008/0222547 A1 | 9/2008 | Wong et al. |
| 2008/0222560 A1 | 9/2008 | Harrison |
| 2008/0222569 A1 | 9/2008 | Champion |
| 2008/0232680 A1 | 9/2008 | Berestov et al. |
| 2008/0242362 A1 | 10/2008 | Duarte |
| 2008/0248852 A1 | 10/2008 | Rasmussen |
| 2008/0259042 A1 | 10/2008 | Thorn |

(56) References Cited

U.S. PATENT DOCUMENTS

| | | |
|---|---|---|
| 2008/0261513 A1 | 10/2008 | Shin et al. |
| 2008/0261660 A1 | 10/2008 | Huh et al. |
| 2008/0263457 A1 | 10/2008 | Kim et al. |
| 2008/0270558 A1 | 10/2008 | Ma |
| 2008/0285140 A1 | 11/2008 | Amitai |
| 2008/0297475 A1 | 12/2008 | Woolf et al. |
| 2008/0297535 A1 | 12/2008 | Reinig |
| 2008/0299999 A1 | 12/2008 | Lockhart et al. |
| 2008/0301046 A1 | 12/2008 | Martinez et al. |
| 2008/0301575 A1 | 12/2008 | Fermon |
| 2008/0303918 A1 | 12/2008 | Keithley |
| 2008/0307351 A1 | 12/2008 | Louch et al. |
| 2008/0309626 A1 | 12/2008 | Westerman et al. |
| 2008/0311386 A1 | 12/2008 | Wendt |
| 2008/0316177 A1 | 12/2008 | Tseng |
| 2008/0317240 A1 | 12/2008 | Chang et al. |
| 2008/0320413 A1 | 12/2008 | Oshiro |
| 2009/0002939 A1 | 1/2009 | Baugh et al. |
| 2009/0007009 A1 | 1/2009 | Luneau et al. |
| 2009/0007017 A1 | 1/2009 | Anzures et al. |
| 2009/0012952 A1 | 1/2009 | Fredriksson |
| 2009/0015742 A1 | 1/2009 | Liao et al. |
| 2009/0021908 A1 | 1/2009 | Patel et al. |
| 2009/0029736 A1 | 1/2009 | Kim et al. |
| 2009/0031247 A1 | 1/2009 | Walter et al. |
| 2009/0037469 A1 | 2/2009 | Kirsch |
| 2009/0037846 A1 | 2/2009 | Spalink et al. |
| 2009/0049194 A1 | 2/2009 | Csaszar et al. |
| 2009/0051283 A1 | 2/2009 | Cok et al. |
| 2009/0051671 A1 | 2/2009 | Konstas |
| 2009/0059376 A1 | 3/2009 | Hayakawa |
| 2009/0061837 A1 | 3/2009 | Chaudhri et al. |
| 2009/0061948 A1 | 3/2009 | Lee et al. |
| 2009/0064055 A1 | 3/2009 | Chaudhri |
| 2009/0070673 A1 | 3/2009 | Barkan et al. |
| 2009/0077649 A1 | 3/2009 | Lockhart |
| 2009/0083656 A1 | 3/2009 | Dokhon |
| 2009/0084525 A1 | 4/2009 | Satou et al. |
| 2009/0084757 A1 | 4/2009 | Erokhin et al. |
| 2009/0085851 A1 | 4/2009 | Lim |
| 2009/0085878 A1 | 4/2009 | Heubel |
| 2009/0089215 A1 | 4/2009 | Newton |
| 2009/0089459 A1 | 4/2009 | Jeyaseelan et al. |
| 2009/0089704 A1 | 4/2009 | Makela |
| 2009/0092261 A1 | 4/2009 | Bard |
| 2009/0094562 A1 | 4/2009 | Jeong et al. |
| 2009/0097127 A1 | 4/2009 | Amitai |
| 2009/0103515 A1 | 4/2009 | Pointer |
| 2009/0106696 A1 | 4/2009 | Duarte |
| 2009/0109243 A1 | 4/2009 | Kraft |
| 2009/0113301 A1 | 4/2009 | Fisher et al. |
| 2009/0117942 A1 | 5/2009 | Boningue et al. |
| 2009/0125844 A1 | 5/2009 | Weir et al. |
| 2009/0128449 A1 | 5/2009 | Brown et al. |
| 2009/0128901 A1 | 5/2009 | Tilleman et al. |
| 2009/0140061 A1 | 6/2009 | Schultz et al. |
| 2009/0140986 A1 | 6/2009 | Karkkainen et al. |
| 2009/0144642 A1 | 6/2009 | Crystal |
| 2009/0144653 A1 | 6/2009 | Ubillos |
| 2009/0146962 A1 | 6/2009 | Ahonen et al. |
| 2009/0153492 A1 | 6/2009 | Popp |
| 2009/0160809 A1 | 6/2009 | Yang |
| 2009/0163182 A1 | 6/2009 | Gatti et al. |
| 2009/0164888 A1 | 6/2009 | Phan |
| 2009/0164928 A1 | 6/2009 | Brown et al. |
| 2009/0164936 A1 | 6/2009 | Kawaguchi |
| 2009/0178007 A1 | 7/2009 | Matas et al. |
| 2009/0180250 A1 | 7/2009 | Holling et al. |
| 2009/0182788 A1 | 7/2009 | Chung et al. |
| 2009/0183077 A1 | 7/2009 | Hakim et al. |
| 2009/0184939 A1 | 7/2009 | Wohlstadter et al. |
| 2009/0188610 A1 | 7/2009 | Yamamoto |
| 2009/0189974 A1 | 7/2009 | Deering |
| 2009/0190003 A1 | 7/2009 | Park et al. |
| 2009/0193024 A1 | 7/2009 | Dhananjaya |
| 2009/0195756 A1 | 8/2009 | Li et al. |
| 2009/0196510 A1 | 8/2009 | Gokturk et al. |
| 2009/0198581 A1 | 8/2009 | Lidestri |
| 2009/0199122 A1 | 8/2009 | Deutsch et al. |
| 2009/0199128 A1 | 8/2009 | Matthews et al. |
| 2009/0199130 A1 | 8/2009 | Tsern et al. |
| 2009/0205041 A1 | 8/2009 | Michalske |
| 2009/0215504 A1 | 8/2009 | Lando |
| 2009/0222147 A1 | 9/2009 | Nakashima et al. |
| 2009/0224416 A1 | 9/2009 | Laakkonen et al. |
| 2009/0225038 A1 | 9/2009 | Bolsinga et al. |
| 2009/0228825 A1 | 9/2009 | Van Os et al. |
| 2009/0228841 A1 | 9/2009 | Hildreth |
| 2009/0235200 A1 | 9/2009 | Deutsch et al. |
| 2009/0235203 A1 | 9/2009 | Iizuka |
| 2009/0244413 A1 | 10/2009 | Ishikawa et al. |
| 2009/0246707 A1 | 10/2009 | Li et al. |
| 2009/0248421 A1 | 10/2009 | Michaelis et al. |
| 2009/0249257 A1 | 10/2009 | Bove et al. |
| 2009/0256837 A1 | 10/2009 | Deb et al. |
| 2009/0262419 A1 | 10/2009 | Robinson et al. |
| 2009/0265416 A1 | 10/2009 | Svendsen et al. |
| 2009/0265662 A1 | 10/2009 | Bamford |
| 2009/0271778 A1 | 10/2009 | Mandyam et al. |
| 2009/0284482 A1 | 11/2009 | Chin |
| 2009/0288044 A1 | 11/2009 | Matthews et al. |
| 2009/0292989 A1 | 11/2009 | Matthews et al. |
| 2009/0293007 A1 | 11/2009 | Duarte et al. |
| 2009/0298547 A1 | 12/2009 | Kim et al. |
| 2009/0303231 A1 | 12/2009 | Robinet et al. |
| 2009/0303599 A1 | 12/2009 | Levola |
| 2009/0305732 A1 | 12/2009 | Marcellino et al. |
| 2009/0307105 A1 | 12/2009 | Lemay et al. |
| 2009/0307589 A1 | 12/2009 | Inose et al. |
| 2009/0307623 A1 | 12/2009 | Agarawala et al. |
| 2009/0313584 A1 | 12/2009 | Kerr et al. |
| 2009/0315839 A1 | 12/2009 | Wilson et al. |
| 2009/0315847 A1 | 12/2009 | Fujii |
| 2009/0322760 A1 | 12/2009 | Kwiatkowski |
| 2009/0327969 A1 | 12/2009 | Estrada |
| 2010/0002989 A1 | 1/2010 | Tokushima |
| 2010/0005168 A1 | 1/2010 | Williams et al. |
| 2010/0005397 A1 | 1/2010 | Lanahan et al. |
| 2010/0008490 A1 | 1/2010 | Gharachorloo et al. |
| 2010/0013782 A1 | 1/2010 | Liu et al. |
| 2010/0018858 A1 | 1/2010 | Seki |
| 2010/0020025 A1 | 1/2010 | Lemort et al. |
| 2010/0020091 A1 | 1/2010 | Rasmussen et al. |
| 2010/0021108 A1 | 1/2010 | Kang et al. |
| 2010/0023691 A1 | 1/2010 | Shin |
| 2010/0030578 A1 | 2/2010 | Siddique et al. |
| 2010/0031186 A1 | 2/2010 | Tseng |
| 2010/0042648 A1 | 2/2010 | Cannon et al. |
| 2010/0042911 A1 | 2/2010 | Wormald et al. |
| 2010/0050076 A1 | 2/2010 | Roth |
| 2010/0053151 A1 | 3/2010 | Marti et al. |
| 2010/0058248 A1 | 3/2010 | Park |
| 2010/0060551 A1 | 3/2010 | Sugiyama et al. |
| 2010/0061078 A1 | 3/2010 | Kim |
| 2010/0066698 A1 | 3/2010 | Seo |
| 2010/0070931 A1 | 3/2010 | Nichols |
| 2010/0073380 A1 | 3/2010 | Kaplan et al. |
| 2010/0074291 A1 | 3/2010 | Nakamura |
| 2010/0075628 A1 | 3/2010 | Ye |
| 2010/0077058 A1 | 3/2010 | Messer |
| 2010/0077310 A1 | 3/2010 | Karachale et al. |
| 2010/0077330 A1 | 3/2010 | Kaplan et al. |
| 2010/0079392 A1 | 4/2010 | Chiang et al. |
| 2010/0079413 A1 | 4/2010 | Kawashima et al. |
| 2010/0079865 A1 | 4/2010 | Saarikko et al. |
| 2010/0081475 A1 | 4/2010 | Chiang et al. |
| 2010/0084674 A1 | 4/2010 | Paetzold et al. |
| 2010/0086022 A1 | 4/2010 | Hunleth et al. |
| 2010/0087169 A1 | 4/2010 | Lin |
| 2010/0087173 A1 | 4/2010 | Lin |
| 2010/0088635 A1 | 4/2010 | Louch |
| 2010/0094934 A1 | 4/2010 | Svendsen et al. |
| 2010/0095240 A1 | 4/2010 | Shiplacoff et al. |
| 2010/0096617 A1 | 4/2010 | Shanks |

(56) References Cited

U.S. PATENT DOCUMENTS

| | | |
|---|---|---|
| 2010/0100839 A1 | 4/2010 | Tseng et al. |
| 2010/0102998 A1 | 4/2010 | Fux |
| 2010/0103078 A1 | 4/2010 | Mukawa et al. |
| 2010/0103118 A1 | 4/2010 | Townsend et al. |
| 2010/0103124 A1 | 4/2010 | Kruzeniski |
| 2010/0105370 A1 | 4/2010 | Kruzeniski |
| 2010/0105424 A1 | 4/2010 | Smuga |
| 2010/0105438 A1 | 4/2010 | Wykes |
| 2010/0105439 A1 | 4/2010 | Friedman |
| 2010/0105440 A1 | 4/2010 | Kruzeniski |
| 2010/0105441 A1 | 4/2010 | Voss |
| 2010/0106915 A1 | 4/2010 | Krishnaprasad et al. |
| 2010/0107067 A1 | 4/2010 | Vaisanen |
| 2010/0107068 A1 | 4/2010 | Butcher |
| 2010/0107100 A1 | 4/2010 | Schneekloth |
| 2010/0122110 A1 | 5/2010 | Ordogh |
| 2010/0134534 A1 | 6/2010 | Seesselberg et al. |
| 2010/0138767 A1 | 6/2010 | Wang et al. |
| 2010/0138809 A1 | 6/2010 | Shenfield et al. |
| 2010/0141905 A1 | 6/2010 | Burke |
| 2010/0145675 A1 | 6/2010 | Lloyd et al. |
| 2010/0146130 A1 | 6/2010 | Montemurro et al. |
| 2010/0146437 A1 | 6/2010 | Woodcock et al. |
| 2010/0149073 A1 | 6/2010 | Chaum et al. |
| 2010/0159966 A1 | 6/2010 | Friedman |
| 2010/0159994 A1 | 6/2010 | Stallings et al. |
| 2010/0159995 A1 | 6/2010 | Stallings et al. |
| 2010/0162180 A1 | 6/2010 | Dunnam et al. |
| 2010/0167699 A1 | 7/2010 | Sigmund et al. |
| 2010/0169766 A1 | 7/2010 | Duarte et al. |
| 2010/0169772 A1 | 7/2010 | Stallings et al. |
| 2010/0169819 A1 | 7/2010 | Bestle et al. |
| 2010/0175018 A1 | 7/2010 | Petschnigg et al. |
| 2010/0175029 A1 | 7/2010 | Williams |
| 2010/0180233 A1 | 7/2010 | Kruzeniski |
| 2010/0185932 A1 | 7/2010 | Coffman et al. |
| 2010/0188353 A1 | 7/2010 | Yoon et al. |
| 2010/0191783 A1 | 7/2010 | Mason |
| 2010/0191827 A1 | 7/2010 | Martin |
| 2010/0200736 A1 | 8/2010 | Laycock et al. |
| 2010/0201953 A1 | 8/2010 | Freeman et al. |
| 2010/0202725 A1 | 8/2010 | Popovich et al. |
| 2010/0205178 A1 | 8/2010 | Bush et al. |
| 2010/0211575 A1 | 8/2010 | Collins et al. |
| 2010/0213467 A1 | 8/2010 | Lee et al. |
| 2010/0216491 A1 | 8/2010 | Winkler et al. |
| 2010/0220439 A1 | 9/2010 | Qin |
| 2010/0223569 A1 | 9/2010 | Vuong et al. |
| 2010/0229853 A1 | 9/2010 | Vandal et al. |
| 2010/0238270 A1 | 9/2010 | Bjelkhagen et al. |
| 2010/0245387 A1 | 9/2010 | Bachelder et al. |
| 2010/0248688 A1 | 9/2010 | Teng |
| 2010/0248689 A1 | 9/2010 | Teng |
| 2010/0248741 A1 | 9/2010 | Setlur et al. |
| 2010/0248787 A1 | 9/2010 | Smuga |
| 2010/0248788 A1 | 9/2010 | Yook et al. |
| 2010/0251153 A1 | 9/2010 | SanGiovanni et al. |
| 2010/0259889 A1 | 10/2010 | Chen et al. |
| 2010/0262582 A1 | 10/2010 | Garcia-Ascanio |
| 2010/0265196 A1 | 10/2010 | Lee et al. |
| 2010/0271467 A1 | 10/2010 | Akeley |
| 2010/0277421 A1 | 11/2010 | Charlier et al. |
| 2010/0277439 A1 | 11/2010 | Charlier et al. |
| 2010/0277603 A1 | 11/2010 | Pockett et al. |
| 2010/0277779 A1 | 11/2010 | Futterer et al. |
| 2010/0278484 A1 | 11/2010 | Scheerlinck et al. |
| 2010/0281382 A1 | 11/2010 | Meaney et al. |
| 2010/0281402 A1 | 11/2010 | Staikos et al. |
| 2010/0281409 A1 | 11/2010 | Rainisto et al. |
| 2010/0283743 A1 | 11/2010 | Coddington et al. |
| 2010/0284085 A1 | 11/2010 | Laakkonen |
| 2010/0289806 A1 | 11/2010 | Lao et al. |
| 2010/0293056 A1 | 11/2010 | Flynt et al. |
| 2010/0295795 A1 | 11/2010 | Wilairat |
| 2010/0298034 A1 | 11/2010 | Shin et al. |
| 2010/0299417 A1 | 11/2010 | Austin et al. |
| 2010/0299697 A1 | 11/2010 | Austin et al. |
| 2010/0300654 A1 | 12/2010 | Edwards |
| 2010/0302148 A1 | 12/2010 | Fleizach et al. |
| 2010/0302172 A1 | 12/2010 | Wilairat |
| 2010/0302176 A1 | 12/2010 | Nikula et al. |
| 2010/0302278 A1 | 12/2010 | Shaffer et al. |
| 2010/0302712 A1 | 12/2010 | Wilairat |
| 2010/0309687 A1 | 12/2010 | Sampsell et al. |
| 2010/0311470 A1 | 12/2010 | Seo et al. |
| 2010/0313165 A1 | 12/2010 | Louch et al. |
| 2010/0315781 A1 | 12/2010 | Agostini |
| 2010/0317132 A1 | 12/2010 | Rogers et al. |
| 2010/0321403 A1 | 12/2010 | Inadome |
| 2010/0321609 A1 | 12/2010 | Qi et al. |
| 2010/0321781 A1 | 12/2010 | Levola et al. |
| 2010/0328351 A1 | 12/2010 | Tan |
| 2010/0328431 A1 | 12/2010 | Kim et al. |
| 2010/0329642 A1 | 12/2010 | Kam et al. |
| 2010/0332456 A1 | 12/2010 | Prahlad et al. |
| 2010/0333008 A1 | 12/2010 | Taylor |
| 2011/0004839 A1 | 1/2011 | Cha et al. |
| 2011/0004845 A1 | 1/2011 | Ciabarra |
| 2011/0012814 A1 | 1/2011 | Tanaka |
| 2011/0018806 A1 | 1/2011 | Yano |
| 2011/0021251 A1 | 1/2011 | Linden |
| 2011/0025605 A1 | 2/2011 | Kwitek |
| 2011/0026128 A1 | 2/2011 | Baker et al. |
| 2011/0028203 A1 | 2/2011 | Agarwal et al. |
| 2011/0029598 A1 | 2/2011 | Arnold et al. |
| 2011/0029635 A1 | 2/2011 | Shkurko et al. |
| 2011/0029904 A1 | 2/2011 | Smith et al. |
| 2011/0029927 A1 | 2/2011 | Lietzke et al. |
| 2011/0029934 A1 | 2/2011 | Locker et al. |
| 2011/0032482 A1 | 2/2011 | Agurok |
| 2011/0035702 A1 | 2/2011 | Williams et al. |
| 2011/0038049 A1 | 2/2011 | Vallius et al. |
| 2011/0043527 A1 | 2/2011 | Ording et al. |
| 2011/0050547 A1 | 3/2011 | Mukawa |
| 2011/0050655 A1 | 3/2011 | Mukawa |
| 2011/0055434 A1 | 3/2011 | Pyers et al. |
| 2011/0055765 A1 | 3/2011 | Neubrand et al. |
| 2011/0055773 A1 | 3/2011 | Agarawala et al. |
| 2011/0063795 A1 | 3/2011 | Yeh et al. |
| 2011/0072299 A1 | 3/2011 | Callaghan et al. |
| 2011/0074699 A1 | 3/2011 | Marr et al. |
| 2011/0074710 A1 | 3/2011 | Weeldreyer et al. |
| 2011/0074719 A1 | 3/2011 | Yeh et al. |
| 2011/0075442 A1 | 3/2011 | Chiang |
| 2011/0078624 A1 | 3/2011 | Missig et al. |
| 2011/0084893 A1 | 4/2011 | Lee et al. |
| 2011/0087531 A1 | 4/2011 | Winters et al. |
| 2011/0087674 A1 | 4/2011 | Schokking et al. |
| 2011/0087988 A1 | 4/2011 | Ray et al. |
| 2011/0090343 A1 | 4/2011 | Alt et al. |
| 2011/0091156 A1 | 4/2011 | Laughlin |
| 2011/0093778 A1 | 4/2011 | Kim et al. |
| 2011/0093816 A1 | 4/2011 | Chang et al. |
| 2011/0093821 A1 | 4/2011 | Wigdor et al. |
| 2011/0096401 A1 | 4/2011 | Levola |
| 2011/0099199 A1 | 4/2011 | Stalenhoef et al. |
| 2011/0099512 A1* | 4/2011 | Jeong .................. G06F 3/0481 715/790 |
| 2011/0106798 A1 | 5/2011 | Li et al. |
| 2011/0107272 A1 | 5/2011 | Aguilar |
| 2011/0113337 A1 | 5/2011 | Liu et al. |
| 2011/0113486 A1 | 5/2011 | Hunt et al. |
| 2011/0114823 A1 | 5/2011 | Katzir et al. |
| 2011/0115340 A1 | 5/2011 | Lee |
| 2011/0119586 A1 | 5/2011 | Blinnikka et al. |
| 2011/0119597 A1 | 5/2011 | Yellamraju et al. |
| 2011/0124376 A1 | 5/2011 | Kim et al. |
| 2011/0126156 A1 | 5/2011 | Krishnaraj et al. |
| 2011/0127024 A1 | 6/2011 | Patel et al. |
| 2011/0134017 A1 | 6/2011 | Burke |
| 2011/0134645 A1 | 6/2011 | Hitchcock et al. |
| 2011/0141388 A1 | 6/2011 | Park et al. |
| 2011/0148931 A1 | 6/2011 | Kim |
| 2011/0154198 A1 | 6/2011 | Bachman et al. |

(56) References Cited

U.S. PATENT DOCUMENTS

| | | |
|---|---|---|
| 2011/0154235 A1 | 6/2011 | Min et al. |
| 2011/0157027 A1 | 6/2011 | Rissa |
| 2011/0161174 A1 | 6/2011 | Simms et al. |
| 2011/0161409 A1 | 6/2011 | Nair et al. |
| 2011/0161845 A1 | 6/2011 | Stallings et al. |
| 2011/0163968 A1 | 7/2011 | Hogan |
| 2011/0163986 A1 | 7/2011 | Lee et al. |
| 2011/0167341 A1 | 7/2011 | Cranfill et al. |
| 2011/0173556 A1 | 7/2011 | Czerwinski et al. |
| 2011/0173568 A1 | 7/2011 | Royal, Jr. et al. |
| 2011/0173569 A1 | 7/2011 | Howes et al. |
| 2011/0175930 A1 | 7/2011 | Hwang et al. |
| 2011/0179386 A1 | 7/2011 | Shaffer et al. |
| 2011/0179387 A1 | 7/2011 | Shaffer et al. |
| 2011/0185318 A1 | 7/2011 | Hinckley et al. |
| 2011/0191675 A1 | 8/2011 | Kauranen |
| 2011/0194029 A1 | 8/2011 | Herrmann et al. |
| 2011/0202866 A1 | 8/2011 | Huang et al. |
| 2011/0205251 A1 | 8/2011 | Auld |
| 2011/0209039 A1 | 8/2011 | Hinckley et al. |
| 2011/0209089 A1 | 8/2011 | Hinckley et al. |
| 2011/0209099 A1 | 8/2011 | Hinckley |
| 2011/0209100 A1 | 8/2011 | Hinckley et al. |
| 2011/0209101 A1 | 8/2011 | Hinckley et al. |
| 2011/0209102 A1 | 8/2011 | Hinckley et al. |
| 2011/0209103 A1 | 8/2011 | Hinckley et al. |
| 2011/0209104 A1 | 8/2011 | Hinckley et al. |
| 2011/0210946 A1 | 9/2011 | Goertz et al. |
| 2011/0214082 A1 | 9/2011 | Osterhout et al. |
| 2011/0215349 A1 | 9/2011 | An et al. |
| 2011/0221658 A1 | 9/2011 | Haddick et al. |
| 2011/0221659 A1 | 9/2011 | King et al. |
| 2011/0222236 A1 | 9/2011 | Luo et al. |
| 2011/0225547 A1 | 9/2011 | Fong et al. |
| 2011/0227820 A1 | 9/2011 | Haddick et al. |
| 2011/0227913 A1 | 9/2011 | Hyndman |
| 2011/0231192 A1 | 9/2011 | O'Conor et al. |
| 2011/0231745 A1 | 9/2011 | Levesque et al. |
| 2011/0231796 A1 | 9/2011 | Vigil |
| 2011/0233431 A1 | 9/2011 | Wan et al. |
| 2011/0235179 A1 | 9/2011 | Simmonds |
| 2011/0242145 A1 | 10/2011 | Nishimura et al. |
| 2011/0242392 A1 | 10/2011 | Chiang |
| 2011/0242670 A1 | 10/2011 | Simmonds |
| 2011/0242757 A1 | 10/2011 | Tracy et al. |
| 2011/0248904 A1 | 10/2011 | Miyawaki et al. |
| 2011/0248958 A1 | 10/2011 | Gruhlke et al. |
| 2011/0252346 A1 | 10/2011 | Chaudhri |
| 2011/0252380 A1 | 10/2011 | Chaudhri |
| 2011/0252381 A1 | 10/2011 | Chaudhri |
| 2011/0267799 A1 | 11/2011 | Epstein et al. |
| 2011/0276864 A1 | 11/2011 | Oules |
| 2011/0283185 A1 | 11/2011 | Obasanjo et al. |
| 2011/0283223 A1 | 11/2011 | Vaittinen et al. |
| 2011/0289421 A1 | 11/2011 | Jordan et al. |
| 2011/0295913 A1 | 12/2011 | Enbutsu |
| 2011/0299044 A1 | 12/2011 | Yeh et al. |
| 2011/0304640 A1 | 12/2011 | Noge |
| 2011/0309378 A1 | 12/2011 | Lau et al. |
| 2011/0310232 A1 | 12/2011 | Wilson et al. |
| 2011/0310312 A1 | 12/2011 | Yokote et al. |
| 2011/0316884 A1 | 12/2011 | Giambalvo et al. |
| 2012/0003958 A1 | 1/2012 | Hossain et al. |
| 2012/0005584 A1 | 1/2012 | Seago et al. |
| 2012/0005602 A1 | 1/2012 | Anttila et al. |
| 2012/0009903 A1 | 1/2012 | Schultz et al. |
| 2012/0013651 A1 | 1/2012 | Trayner et al. |
| 2012/0019434 A1 | 1/2012 | Kuhlman et al. |
| 2012/0026161 A1 | 2/2012 | Chen et al. |
| 2012/0028687 A1 | 2/2012 | Wykes |
| 2012/0030213 A1 | 2/2012 | Arrouye et al. |
| 2012/0030616 A1 | 2/2012 | Howes et al. |
| 2012/0033306 A1 | 2/2012 | Valera et al. |
| 2012/0038629 A1 | 2/2012 | Brown et al. |
| 2012/0041721 A1 | 2/2012 | Chen |
| 2012/0044573 A1 | 2/2012 | Simmonds et al. |
| 2012/0050144 A1 | 3/2012 | Morlock |
| 2012/0050185 A1 | 3/2012 | Davydov et al. |
| 2012/0050332 A1 | 3/2012 | Nikara et al. |
| 2012/0052934 A1 | 3/2012 | Maharbiz |
| 2012/0054674 A1 | 3/2012 | Beykpour et al. |
| 2012/0062998 A1 | 3/2012 | Schultz et al. |
| 2012/0069413 A1 | 3/2012 | Schultz |
| 2012/0078953 A1 | 3/2012 | Araya |
| 2012/0084710 A1 | 4/2012 | Sirpal et al. |
| 2012/0089950 A1 | 4/2012 | Tseng |
| 2012/0102433 A1 | 4/2012 | Falkenburg |
| 2012/0105487 A1 | 5/2012 | Son et al. |
| 2012/0106170 A1 | 5/2012 | Matthews et al. |
| 2012/0111544 A1 | 5/2012 | Senatori |
| 2012/0113092 A1 | 5/2012 | Bar-zeev et al. |
| 2012/0113964 A1 | 5/2012 | Petersen et al. |
| 2012/0120493 A1 | 5/2012 | Simmonds et al. |
| 2012/0127577 A1 | 5/2012 | Desserouer |
| 2012/0130927 A1 | 5/2012 | Shimogori |
| 2012/0134623 A1 | 5/2012 | Boudreau et al. |
| 2012/0144331 A1 | 6/2012 | Tolonen et al. |
| 2012/0151397 A1 | 6/2012 | Oberstein et al. |
| 2012/0154419 A1 | 6/2012 | Nagata et al. |
| 2012/0157114 A1 | 6/2012 | Alameh et al. |
| 2012/0159395 A1 | 6/2012 | Deutsch et al. |
| 2012/0159402 A1 | 6/2012 | Nurmi et al. |
| 2012/0162764 A1 | 6/2012 | Shimizu |
| 2012/0166980 A1 | 6/2012 | Yosef et al. |
| 2012/0166997 A1 | 6/2012 | Cho et al. |
| 2012/0167008 A1 | 6/2012 | Zaman |
| 2012/0167011 A1 | 6/2012 | Zaman |
| 2012/0174005 A1 | 7/2012 | Deutsch et al. |
| 2012/0174029 A1 | 7/2012 | Bastide et al. |
| 2012/0176322 A1 | 7/2012 | Karmi et al. |
| 2012/0176401 A1 | 7/2012 | Hayward et al. |
| 2012/0176474 A1 | 7/2012 | Border |
| 2012/0179992 A1 | 7/2012 | Smuga |
| 2012/0180001 A1 | 7/2012 | Griffin et al. |
| 2012/0182687 A1 | 7/2012 | Dighde et al. |
| 2012/0185880 A1 | 7/2012 | Jalon et al. |
| 2012/0188205 A1 | 7/2012 | Jansson et al. |
| 2012/0195553 A1 | 8/2012 | Hasegawa et al. |
| 2012/0200495 A1 | 8/2012 | Johansson |
| 2012/0204191 A1 | 8/2012 | Shia et al. |
| 2012/0206589 A1 | 8/2012 | Crandall |
| 2012/0206680 A1 | 8/2012 | Andres et al. |
| 2012/0208168 A1 | 8/2012 | Atkinson et al. |
| 2012/0209573 A1 | 8/2012 | Karrat |
| 2012/0209922 A1 | 8/2012 | Bhatia et al. |
| 2012/0210265 A1 | 8/2012 | Delia et al. |
| 2012/0212495 A1 | 8/2012 | Butcher |
| 2012/0216139 A1 | 8/2012 | Ording et al. |
| 2012/0218301 A1 | 8/2012 | Miller |
| 2012/0227006 A1 | 9/2012 | Amm |
| 2012/0233571 A1 | 9/2012 | Wever et al. |
| 2012/0235885 A1 | 9/2012 | Miller et al. |
| 2012/0242561 A1 | 9/2012 | Sugihara |
| 2012/0244841 A1 | 9/2012 | Teng |
| 2012/0246596 A1 | 9/2012 | Ording et al. |
| 2012/0254780 A1 | 10/2012 | Mouton et al. |
| 2012/0256856 A1 | 10/2012 | Suzuki et al. |
| 2012/0256963 A1 | 10/2012 | Suzuki et al. |
| 2012/0262657 A1 | 10/2012 | Nakanishi et al. |
| 2012/0265644 A1 | 10/2012 | Roa et al. |
| 2012/0271823 A1 | 10/2012 | Asikainen et al. |
| 2012/0287381 A1 | 11/2012 | Li et al. |
| 2012/0290654 A1 | 11/2012 | Detwiller et al. |
| 2012/0290962 A1 | 11/2012 | Zielinski et al. |
| 2012/0292535 A1 | 11/2012 | Choi et al. |
| 2012/0296191 A1 | 11/2012 | Mcgrath et al. |
| 2012/0299968 A1 | 11/2012 | Wong et al. |
| 2012/0301039 A1 | 11/2012 | Maunder et al. |
| 2012/0304068 A1 | 11/2012 | Zaman et al. |
| 2012/0304092 A1 | 11/2012 | Jarrett et al. |
| 2012/0304107 A1 | 11/2012 | Nan et al. |
| 2012/0304108 A1 | 11/2012 | Jarrett et al. |
| 2012/0304113 A1 | 11/2012 | Patten et al. |
| 2012/0304114 A1 | 11/2012 | Wong et al. |

(56) References Cited

U.S. PATENT DOCUMENTS

| | | |
|---|---|---|
| 2012/0304116 A1 | 11/2012 | Donahue et al. |
| 2012/0304117 A1 | 11/2012 | Donahue et al. |
| 2012/0304118 A1 | 11/2012 | Donahue et al. |
| 2012/0304131 A1 | 11/2012 | Nan et al. |
| 2012/0304132 A1 | 11/2012 | Sareen et al. |
| 2012/0304133 A1 | 11/2012 | Nan et al. |
| 2012/0311481 A1 | 12/2012 | Reyna |
| 2012/0311485 A1 | 12/2012 | Caliendo, Jr. et al. |
| 2012/0323992 A1 | 12/2012 | Brobst et al. |
| 2012/0331141 A1 | 12/2012 | Carter et al. |
| 2013/0000871 A1 | 1/2013 | Olson et al. |
| 2013/0004073 A1 | 1/2013 | Yamaji et al. |
| 2013/0019273 A1 | 1/2013 | Ma et al. |
| 2013/0024424 A1 | 1/2013 | Prahlad et al. |
| 2013/0024805 A1 | 1/2013 | In et al. |
| 2013/0027613 A1 | 1/2013 | Kim et al. |
| 2013/0033485 A1 | 2/2013 | Kollin et al. |
| 2013/0033525 A1 | 2/2013 | Markiewicz |
| 2013/0042203 A1 | 2/2013 | Wong et al. |
| 2013/0042206 A1 | 2/2013 | Zaman et al. |
| 2013/0042275 A1 | 2/2013 | Payette et al. |
| 2013/0044136 A1 | 2/2013 | Matthews |
| 2013/0044141 A1 | 2/2013 | Markiewicz |
| 2013/0047079 A1 | 2/2013 | Kroeger et al. |
| 2013/0047105 A1 | 2/2013 | Jarrett |
| 2013/0047117 A1 | 2/2013 | Deutsch |
| 2013/0047118 A1 | 2/2013 | Hooper et al. |
| 2013/0047123 A1 | 2/2013 | May et al. |
| 2013/0047126 A1 | 2/2013 | Sareen |
| 2013/0057587 A1 | 3/2013 | Leonard et al. |
| 2013/0057588 A1 | 3/2013 | Leonard |
| 2013/0063442 A1 | 3/2013 | Zaman |
| 2013/0063443 A1 | 3/2013 | Garside |
| 2013/0063465 A1 | 3/2013 | Zaman |
| 2013/0063490 A1 | 3/2013 | Zaman et al. |
| 2013/0067346 A1 | 3/2013 | Rosenstein et al. |
| 2013/0067381 A1 | 3/2013 | Yalovsky |
| 2013/0067390 A1 | 3/2013 | Kwiatkowski |
| 2013/0067391 A1 | 3/2013 | Pittappilly |
| 2013/0067398 A1 | 3/2013 | Pittappilly |
| 2013/0067399 A1 | 3/2013 | Elliott |
| 2013/0067412 A1 | 3/2013 | Leonard |
| 2013/0067420 A1 | 3/2013 | Pittappilly |
| 2013/0081779 A1 | 4/2013 | Liao et al. |
| 2013/0090988 A1 | 4/2013 | Moore et al. |
| 2013/0090998 A1 | 4/2013 | Moore et al. |
| 2013/0091204 A1 | 4/2013 | Loh et al. |
| 2013/0093741 A1 | 4/2013 | Akimoto et al. |
| 2013/0093757 A1 | 4/2013 | Cornell |
| 2013/0097685 A1 | 4/2013 | Kennedy et al. |
| 2013/0104062 A1 | 4/2013 | Reeves et al. |
| 2013/0106592 A1 | 5/2013 | Morgan et al. |
| 2013/0106674 A1 | 5/2013 | Wheeler et al. |
| 2013/0120295 A1 | 5/2013 | Kim et al. |
| 2013/0148864 A1 | 6/2013 | Dolson et al. |
| 2013/0158957 A1 | 6/2013 | Lee et al. |
| 2013/0162673 A1 | 6/2013 | Bohn |
| 2013/0163089 A1 | 6/2013 | Bohn |
| 2013/0208482 A1 | 6/2013 | Fleck et al. |
| 2013/0170031 A1 | 7/2013 | Bohn et al. |
| 2013/0170802 A1 | 7/2013 | Pitwon |
| 2013/0186596 A1 | 7/2013 | Rubenstein et al. |
| 2013/0186598 A1 | 7/2013 | Rubenstein |
| 2013/0187866 A1 | 7/2013 | Kim et al. |
| 2013/0187943 A1 | 7/2013 | Bohn et al. |
| 2013/0191767 A1 | 7/2013 | Peters et al. |
| 2013/0198176 A1 | 8/2013 | Kim |
| 2013/0207964 A1 | 8/2013 | Fleck et al. |
| 2013/0208003 A1 | 8/2013 | Bohn et al. |
| 2013/0208362 A1 | 8/2013 | Bohn et al. |
| 2013/0215081 A1 | 8/2013 | Levin et al. |
| 2013/0226931 A1 | 8/2013 | Hazel et al. |
| 2013/0242056 A1 | 9/2013 | Fleck et al. |
| 2013/0242555 A1 | 9/2013 | Mukawa |
| 2013/0249895 A1 | 9/2013 | Westerinen et al. |
| 2013/0250431 A1 | 9/2013 | Robbins et al. |
| 2013/0252628 A1 | 9/2013 | Kuehnel |
| 2013/0254412 A1 | 9/2013 | Menezes et al. |
| 2013/0254708 A1 | 9/2013 | Dorcey |
| 2013/0257848 A1 | 10/2013 | Westerinen et al. |
| 2013/0258701 A1 | 10/2013 | Westerinen et al. |
| 2013/0267309 A1 | 10/2013 | Robbins et al. |
| 2013/0294030 A1 | 11/2013 | Wang et al. |
| 2013/0300684 A1 | 11/2013 | Kim et al. |
| 2013/0305184 A1 | 11/2013 | Kim et al. |
| 2013/0307875 A1 | 11/2013 | Anderson |
| 2013/0314789 A1 | 11/2013 | Saarikko |
| 2013/0314793 A1 | 11/2013 | Robbins et al. |
| 2013/0321340 A1 | 12/2013 | Seo et al. |
| 2013/0322610 A1 | 12/2013 | Robbins |
| 2013/0332159 A1 | 12/2013 | Federghi et al. |
| 2013/0335671 A1 | 12/2013 | Fleck et al. |
| 2013/0339446 A1 | 12/2013 | Balassanian et al. |
| 2013/0342674 A1 | 12/2013 | Dixon |
| 2013/0343291 A1 | 12/2013 | Gao et al. |
| 2013/0346408 A1 | 12/2013 | Duarte et al. |
| 2013/0346725 A1 | 12/2013 | Lomet et al. |
| 2014/0010265 A1 | 1/2014 | Peng |
| 2014/0022265 A1 | 1/2014 | Canan |
| 2014/0041827 A1 | 2/2014 | Giaimo et al. |
| 2014/0053097 A1 | 2/2014 | Shin et al. |
| 2014/0059139 A1 | 2/2014 | Filev et al. |
| 2014/0063367 A1 | 3/2014 | Yang et al. |
| 2014/0078130 A1 | 3/2014 | Uchino et al. |
| 2014/0082552 A1 | 3/2014 | Zaman |
| 2014/0086081 A1 | 3/2014 | Mack et al. |
| 2014/0089833 A1 | 3/2014 | Hwang et al. |
| 2014/0089856 A1 | 3/2014 | Matthews |
| 2014/0092765 A1 | 4/2014 | Agarwal et al. |
| 2014/0094973 A1 | 4/2014 | Giaimo et al. |
| 2014/0098671 A1 | 4/2014 | Raleigh et al. |
| 2014/0104665 A1 | 4/2014 | Popovich et al. |
| 2014/0104685 A1 | 4/2014 | Bohn et al. |
| 2014/0109008 A1 | 4/2014 | Zaman |
| 2014/0111865 A1 | 4/2014 | Kobayashi |
| 2014/0116982 A1 | 5/2014 | Schellenberg et al. |
| 2014/0133456 A1 | 5/2014 | Donepudi et al. |
| 2014/0140653 A1 | 5/2014 | Brown et al. |
| 2014/0140654 A1 | 5/2014 | Brown et al. |
| 2014/0143247 A1 | 5/2014 | Rathnavelu et al. |
| 2014/0143351 A1 | 5/2014 | Deng |
| 2014/0143439 A1 | 5/2014 | Ramamurthy |
| 2014/0143708 A1 | 5/2014 | Yang et al. |
| 2014/0148170 A1 | 5/2014 | Damji et al. |
| 2014/0153390 A1 | 6/2014 | Ishii et al. |
| 2014/0155123 A1 | 6/2014 | Lee et al. |
| 2014/0164957 A1 | 6/2014 | Shin et al. |
| 2014/0164990 A1* | 6/2014 | Kim .................. G06F 3/04817 715/790 |
| 2014/0176528 A1 | 6/2014 | Robbins |
| 2014/0184699 A1 | 7/2014 | Ito et al. |
| 2014/0189557 A1 | 7/2014 | O'Connell et al. |
| 2014/0195620 A1 | 7/2014 | Srinivasan et al. |
| 2014/0195976 A1 | 7/2014 | Ow et al. |
| 2014/0204455 A1 | 7/2014 | Popovich et al. |
| 2014/0240842 A1 | 8/2014 | Nguyen et al. |
| 2014/0300966 A1 | 10/2014 | Travers et al. |
| 2014/0310646 A1 | 10/2014 | Vranjes et al. |
| 2014/0314374 A1 | 10/2014 | Fattal et al. |
| 2014/0320399 A1 | 10/2014 | Kim et al. |
| 2014/0351722 A1 | 11/2014 | Frederickson et al. |
| 2014/0379991 A1 | 12/2014 | Lomet et al. |
| 2015/0002614 A1 | 1/2015 | Zino et al. |
| 2015/0046500 A1 | 2/2015 | Bush et al. |
| 2015/0074589 A1 | 3/2015 | Pan et al. |
| 2015/0086163 A1 | 3/2015 | Valera et al. |
| 2015/0168731 A1 | 6/2015 | Robbins |
| 2015/0199075 A1 | 7/2015 | Kuscher et al. |
| 2015/0199093 A1 | 7/2015 | Kuscher et al. |
| 2015/0212660 A1 | 7/2015 | Su |
| 2015/0220215 A1 | 8/2015 | Choi et al. |
| 2015/0243236 A1 | 8/2015 | Jain et al. |
| 2015/0317026 A1 | 11/2015 | Choi et al. |
| 2015/0317062 A1 | 11/2015 | Jarrett et al. |

(56) References Cited

U.S. PATENT DOCUMENTS

| | | |
|---|---|---|
| 2015/0325211 A1 | 11/2015 | Lee et al. |
| 2015/0356121 A1 | 12/2015 | Schmelzer |
| 2016/0019279 A1 | 1/2016 | Sengupta et al. |
| 2016/0033697 A1 | 2/2016 | Sainiemi et al. |
| 2016/0033784 A1 | 2/2016 | Levola et al. |
| 2016/0034155 A1 | 2/2016 | Vranjes et al. |
| 2016/0034156 A1 | 2/2016 | Vranjes et al. |
| 2016/0034157 A1 | 2/2016 | Vranjes et al. |
| 2016/0034159 A1 | 2/2016 | Vranjes et al. |
| 2016/0034284 A1 | 2/2016 | Won et al. |
| 2016/0034459 A1 | 2/2016 | Larsen et al. |
| 2016/0035539 A1 | 2/2016 | Sainiemi et al. |
| 2016/0036692 A1 | 2/2016 | Leeb et al. |
| 2016/0044716 A1 | 2/2016 | Hassan et al. |
| 2016/0110403 A1 | 4/2016 | Lomet et al. |
| 2016/0231257 A1 | 8/2016 | Kostamo et al. |
| 2016/0231477 A1 | 8/2016 | Saarikko et al. |
| 2016/0231478 A1 | 8/2016 | Kostamo |
| 2016/0231566 A1 | 8/2016 | Levola et al. |
| 2016/0231567 A1 | 8/2016 | Saarikko et al. |
| 2016/0231568 A1 | 8/2016 | Saarikko et al. |
| 2016/0231569 A1 | 8/2016 | Levola |
| 2016/0231570 A1 | 8/2016 | Levola et al. |
| 2016/0234485 A1 | 8/2016 | Robbins et al. |
| 2016/0283618 A1 | 9/2016 | Levola et al. |
| 2016/0316023 A1 | 10/2016 | Hassan et al. |
| 2017/0235219 A1 | 8/2017 | Kostamo |
| 2017/0326446 A1 | 11/2017 | Robbins et al. |

FOREIGN PATENT DOCUMENTS

| | | |
|---|---|---|
| CN | 101029968 A | 9/2007 |
| CN | 101036104 | 9/2007 |
| CN | 101105512 | 1/2008 |
| CN | 101114303 | 1/2008 |
| CN | 101809531 | 8/2010 |
| CN | 102004315 A | 4/2011 |
| CN | 102197702 | 9/2011 |
| CN | 103543904 | 1/2014 |
| EP | 0583060 | 2/1994 |
| EP | 0977022 | 2/2000 |
| EP | 1494109 A2 | 1/2005 |
| EP | 1752868 | 2/2007 |
| EP | 1847924 | 10/2007 |
| EP | 2065750 A2 | 6/2009 |
| EP | 2083310 | 7/2009 |
| EP | 2112547 A2 | 10/2009 |
| EP | 2144177 | 1/2010 |
| EP | 2196843 A1 | 6/2010 |
| EP | 2216678 A1 | 8/2010 |
| EP | 2241926 A1 | 10/2010 |
| EP | 2662761 | 11/2013 |
| EP | 2700987 A1 | 2/2014 |
| EP | 2752691 | 7/2014 |
| EP | 2887121 A1 | 6/2015 |
| EP | 3018524 A1 | 5/2016 |
| FR | 2942811 | 9/2010 |
| GB | 2500631 A | 10/2013 |
| JP | S5557807 A | 4/1980 |
| JP | S57109618 A | 7/1982 |
| JP | S599920 A | 1/1984 |
| JP | S5962888 A | 4/1984 |
| JP | S60188911 A | 9/1985 |
| JP | S6252506 A | 3/1987 |
| JP | S62278508 A | 12/1987 |
| JP | 03180801 A | 8/1991 |
| JP | H0422358 A | 1/1992 |
| JP | 06310806 A | 11/1994 |
| JP | H0744351 | 2/1995 |
| JP | 07311303 A | 11/1995 |
| JP | H08163602 A | 6/1996 |
| JP | 2000013818 A | 1/2000 |
| JP | 2000347037 | 12/2000 |
| JP | 2001078234 A | 3/2001 |
| JP | 2002365589 A | 12/2002 |
| JP | 2003005128 A | 1/2003 |
| JP | 2004219664 A | 8/2004 |
| JP | 2004227393 | 8/2004 |
| JP | 2004357257 | 12/2004 |
| JP | 2006267887 A | 10/2006 |
| JP | 2006017135 A | 1/2008 |
| JP | 2008015125 A | 1/2008 |
| JP | 2008234042 | 10/2008 |
| JP | 2012042654 A | 3/2012 |
| KR | 200303655 | 2/2003 |
| KR | 20060019198 | 3/2006 |
| KR | 20070001771 | 1/2007 |
| KR | 1020070036114 | 4/2007 |
| KR | 1020070098337 | 10/2007 |
| KR | 20070120368 | 12/2007 |
| KR | 1020080025951 | 3/2008 |
| KR | 1020080041809 | 5/2008 |
| KR | 1020080076390 | 8/2008 |
| KR | 100854333 | 9/2008 |
| KR | 1020080084156 | 9/2008 |
| KR | 1020080113913 | 12/2008 |
| KR | 1020090041635 | 4/2009 |
| KR | 1020090076539 A | 7/2009 |
| KR | 20090084316 | 8/2009 |
| KR | 20100010072 | 2/2010 |
| KR | 20100048375 | 5/2010 |
| KR | 20100056369 | 5/2010 |
| KR | 1020100056369 | 5/2010 |
| KR | 1020110070087 A | 6/2011 |
| KR | 1020120023458 A | 3/2012 |
| RU | 2363033 | 7/2009 |
| TW | 201023026 | 6/2010 |
| TW | 201407202 | 2/2014 |
| WO | 9418595 A1 | 8/1994 |
| WO | WO-9926127 | 5/1999 |
| WO | 9952002 A1 | 10/1999 |
| WO | WO-0051299 | 8/2000 |
| WO | WO-0129976 | 4/2001 |
| WO | WO-2001033282 | 5/2001 |
| WO | 0179915 A2 | 10/2001 |
| WO | 0195027 A2 | 12/2001 |
| WO | 03090611 A1 | 11/2003 |
| WO | WO-2005026931 | 3/2005 |
| WO | WO-2005027506 | 3/2005 |
| WO | WO-2006019639 | 2/2006 |
| WO | WO-2006054056 | 5/2006 |
| WO | 2006064334 A1 | 6/2006 |
| WO | 2007052265 A2 | 5/2007 |
| WO | WO-2007057500 | 5/2007 |
| WO | WO-2007121557 | 11/2007 |
| WO | WO-2007134623 | 11/2007 |
| WO | 2008021504 A1 | 2/2008 |
| WO | WO-2008030608 | 3/2008 |
| WO | WO-2008031871 | 3/2008 |
| WO | WO-2008035831 | 3/2008 |
| WO | 2008081070 A1 | 7/2008 |
| WO | WO-2009000043 | 12/2008 |
| WO | WO-2009012398 | 1/2009 |
| WO | 2009029826 A1 | 3/2009 |
| WO | WO-2009049331 | 4/2009 |
| WO | 2009077601 A1 | 6/2009 |
| WO | 2009127849 A1 | 10/2009 |
| WO | WO-2010024969 | 3/2010 |
| WO | WO-2010048229 | 4/2010 |
| WO | WO-2010048448 | 4/2010 |
| WO | WO-2010048519 | 4/2010 |
| WO | 2010049002 A1 | 5/2010 |
| WO | 2010092409 A1 | 8/2010 |
| WO | WO-2010110613 | 9/2010 |
| WO | WO-2010117643 | 10/2010 |
| WO | 2010125337 A2 | 11/2010 |
| WO | WO-2010125451 | 11/2010 |
| WO | WO-2010135155 | 11/2010 |
| WO | 2011003381 A1 | 1/2011 |
| WO | WO-2011041885 | 4/2011 |
| WO | 2011051660 A1 | 5/2011 |
| WO | 2011090455 A1 | 7/2011 |
| WO | 2011110728 A1 | 9/2011 |
| WO | WO-2011131978 | 10/2011 |

(56) References Cited

FOREIGN PATENT DOCUMENTS

| WO | WO-2012087847 | 6/2012 |
|---|---|---|
| WO | 2012172295 A1 | 12/2012 |
| WO | WO-2012177811 | 12/2012 |
| WO | 2013033274 A1 | 3/2013 |
| WO | 2013058769 A1 | 4/2013 |
| WO | WO-2014051920 | 4/2013 |
| WO | 2013117211 A1 | 8/2013 |
| WO | 2013164665 A1 | 11/2013 |
| WO | WO-2014071308 | 5/2014 |
| WO | WO-2014085502 | 6/2014 |
| WO | WO-2014088343 | 6/2014 |
| WO | 2014111163 A1 | 7/2014 |
| WO | WO-2014130383 | 8/2014 |
| WO | 2015091669 A1 | 6/2015 |
| WO | WO-2016014368 | 1/2016 |
| WO | WO-2016064575 | 4/2016 |

OTHER PUBLICATIONS

"Foreign Office Action", CN Application No. 201180071183.0, dated Jan. 28, 2016, 18 pages.
"Foreign Office Action", EP Application No. 11866699.9, dated Feb. 3, 2016, 4 pages.
"Foreign Office Action", EP Application No. 11866772.4, dated Feb. 2, 2016, 5 pages.
"Foreign Office Action", EP Application No. 1866699.9, dated Feb. 3, 2016, 4 pages.
"iOS Human Interface Guidelines", Apple Inc, Retrieved at<<https://itunes.apple.com/in/book/ios-human-interfaceguidelines/id877942287?mt=11>>, Mar. 23, 2011, 2 pages.
"Non-Final Office Action", U.S. Appl. No. 14/447,109, dated Feb. 11, 2016, 15 pages.
"Non-Final Office Action", U.S. Appl. No. 14/447,419, dated Feb. 2, 2016, 8 pages.
Budiu,"Usability of iPad Apps and Websites", Retrieved at<<https://tdougher.expressions.syr.edu/wrt307fall12/files/2012/08/ipad-usability_report_1st-edition-1.pdf>>, Dec. 31, 2010, 98 pages.
"Final Office Action", U.S. Appl. No. 13/863,369, dated Aug. 18, 2016, 19 pages.
"Final Office Action", U.S. Appl. No. 14/447,419, dated Aug. 29, 2016, 11 pages.
"Foreign Notice of Allowance", RU Application No. 2013152630, dated Jun. 21, 2016, 20 pages.
"International Search Report and Written Opinion", Application No. PCT/US2015/054350, dated Feb. 5, 2016, 9 pages.
"Non-Final Office Action", U.S. Appl. No. 13/228,945, dated Jul. 21, 2016, 20 pages.
"Non-Final Office Action", U.S. Appl. No. 14/448,913, dated Jul. 28, 2016, 29 pages.
"Second Written Opinion", Application No. PCT/US2015/042205, dated Jul. 8, 2016, 6 pages.
"Second Written Opinion", Application No. PCT/US2015/042218, dated Jul. 22, 2016, 6 pages.
"Second Written Opinion", Application No. PCT/US2015/042259, dated Jul. 7, 2016, 7 pages.
March,"A Read-Only Distributed Has Table", IN Journal of Grip Computing, vol. 9, Issue 4, Apr. 27, 2011, pp. 501-529.
"Final Office Action", U.S. Appl. No. 13/229,554, dated Feb. 27, 2015, 29 pages.
"Final Office Action", U.S. Appl. No. 13/229,554, dated Jun. 16, 2016, 35 pages.
"Foreign Notice of Allowance", CN Application No. 201180071183.0, dated Sep. 27, 2016, 6 pages.
"Foreign Notice of Allowance", JP Application No. 2014-512824, dated Oct. 18, 2016, 4 pages.
"Foreign Office Action", Application No. MX/a/2013/013923, dated Sep. 13, 2016, 10 pages.
"International Preliminary Report on Patentability", Application No. PCT/US2015/042226, dated Nov. 2, 2016, 7 pages.
"International Preliminary Report on Patentability", Application No. PCT/US2015/042218, dated Nov. 3, 2016, 7 pages.
"International Preliminary Report on Patentability", Application No. PCT/US2015/042205, dated Nov. 8, 2016, 7 pages.
"International Preliminary Report on Patentability", Application No. PCT/US2015/042259, dated Sep. 16, 2016, 8 pages.
"International Preliminary Report on Patentability", Application No. PCT/US2015/042371, dated Oct. 20, 2016, 8 pages.
"International Preliminary Report on Patentability", Application No. PCT/US2015/041930, dated Oct. 26, 2016, 9 pages.
"Non-Final Office Action", U.S. Appl. No. 13/229,554, dated Feb. 3, 2016, 33 pages.
"Non-Final Office Action", U.S. Appl. No. 14/448,911, dated Oct. 31, 2016, 22 pages.
"Non-Final Office Action", U.S. Appl. No. 14/448,946, dated Oct. 27, 2016, 17 pages.
"Non-Final Office Action", U.S. Appl. No. 14/746,298, dated Aug. 28, 2015, 6 pages.
"Final Office Action", U.S. Appl. No. 13/863,369, dated Jul. 21, 2015, 17 pages.
"Foreign Office Action", AU Application No. 2011369365, dated Oct. 7, 2016, 3 pages.
"Foreign Office Action", EP Application No. 11866699.9, dated Sep. 20, 2016, 4 pages.
"Non-Final Office Action", U.S. Appl. No. 14/460,985, dated Oct. 20, 2016, 19 pages.
"Notice of Allowance", U.S. Appl. No. 14/335,927, dated Sep. 12, 2016, 7 pages.
"Second Written Opinion", Application No. PCT/US2015/041900, dated Jun. 30, 2016, 6 pages.
"Second Written Opinion", Application No. PCT/US2015/041965, dated Jul. 4, 2016, 6 pages.
"Foreign Office Action", CO Application No. 13300265, dated Apr. 21, 2015, 11 Pages.
"Foreign Office Action", PH Application No. PH/1/2013/502367, dated Apr. 24, 2015, 3 pages.
"Non-Final Office Action", U.S. Appl. No. 13/863,369, dated Feb. 27, 2015, 16 pages.
"Notice of Allowance", U.S. Appl. No. 13/118,339, dated Mar. 31, 2015, 7 pages.
"Final Office Action", U.S. Appl. No. 14/447,262, dated Nov. 22, 2016, 20 pages.
"Final Office Action", U.S. Appl. No. 14/448,975, dated Dec. 16, 2016, 22 pages.
"Foreign Office Action", EP Application No. 11866772.4, dated Nov. 21, 2016, 6 pages.
"International Preliminary Report on Patentability", Application No. PCT/US2015/043892, dated Oct. 10, 2016, 8 pages.
"Non-Final Office Action", U.S. Appl. No. 14/447,109, dated Dec. 20, 2016, 9 pages.
"Non-Final Office Action", U.S. Appl. No. 14/447,190, dated Nov. 8, 2016, 10 pages.
"Foreign Office Action", AU Application No. 2011369362, dated Nov. 15, 2016, 3 pages.
"International Preliminary Report on Patentability", Application No. PCT/US2015/041900, dated Oct. 11, 2016, 6 pages.
"International Preliminary Report on Patentability", Application No. PCT/US2015/042187, dated Oct. 31, 2016, 7 pages.
Schrauwen,"Focused-Ion-Beam Fabrication of Slanted Grating Couplers in Silicon-on-Insulator Waveguides", IEEE Photonics Technology Letters, vol. 19, Issue 11, Jun. 1, 2007, 3 pages.
"Always Connected", Available at: http://www.samsung.com/global/microsite/galaxycamera/nx/, Jun. 24, 2013, 5 pages.
"Controlling Your Desktop's Power Management", Retrieved From: <http://www.vorkon.de/SU1210.001/drittanbieter/Dokumentation/openSUSE_11.2/manual/sec.gnomeuser.start.power_mgmt.html> Jul. 7, 2014, 6 Pages.
"Extended European Search Report", EP Application No. 11866699.9, dated Jan. 15, 2015, 6 pages.
"Extended European Search Report", EP Application No. 11866772.4, dated Jan. 15, 2015, 6 pages.
"Final Office Action", U.S. Appl. No. 13/774,875, dated Jun. 4, 2015, 10 pages.

(56) References Cited

OTHER PUBLICATIONS

"Foreign Office Action", CL Application No. 3370-2013, dated May 7, 2015, 6 pages.
"Foreign Office Action", CN Application No. 201180071196.8, dated Sep. 11, 2014, 13 pages.
"Foreign Office Action", JP Application No. 2014-512824, dated Nov. 6, 2015, 5 pages.
"Further Examination Report", NZ Application No. 618284, dated Jul. 13, 2015, 2 pages.
"International Search Report and the Written Opinion", Application No. PCT/US2015/042371, dated Oct. 2, 2015, 10 pages.
"International Search Report and Written Opinion", Application No. PCT/US2014/016658, dated Apr. 23, 2014, 10 pages.
"International Search Report and Written Opinion", Application No. PCT/US2015/042226, dated Oct. 27, 2015, 10 Pages.
"International Search Report and Written Opinion", Application No. PCT/US2015/042205, dated Oct. 30, 2015, 10 pages.
"International Search Report and Written Opinion", Application No. PCT/US2015/042218, dated Nov. 6, 2015, 10 pages.
"International Search Report and Written Opinion", Application No. PCT/USUS15/042259, dated Oct. 12, 2015, 11 Pages.
"International Search Report and Written Opinion", Application No. PCT/US2015/041930, dated Oct. 20, 2015, 12 Pages.
"International Search Report and Written Opinion", Application No. PCT/US2015/041900, dated Oct. 21, 2015, 12 pages.
"International Search Report and Written Opinion", Application No. PCT/US2015/041909, dated Oct. 20, 2015, 13 pages.
"Merge Operator", Retrieved on: Jun. 3, 2014, Available at: https://github.com/facebook/rocksdb/wiki/Merge-Operator, 10 pages.
"New Technology from MIT may Enable Cheap, Color, Holographic Video Displays", Retrieved from <http://www.gizmag.com/holograph-3d-color-video-display-inexpensive-mit/28029/> on Feb. 25, 2015, Jun. 24, 2013, 8 pages.
"Non-Final Office Action", U.S. Appl. No. 13/118,347, dated Dec. 3, 2014, 28 pages.
"Non-Final Office Action", U.S. Appl. No. 13/657,646, dated Aug. 12, 2014, 14 pages.
"Non-Final Office Action", U.S. Appl. No. 13/774,875, dated Sep. 16, 2015, 8 pages.
"Non-Final Office Action", U.S. Appl. No. 13/774,875, dated Nov. 24, 2014, 8 pages.
"Notice of Allowance", U.S. Appl. No. 13/118,347, dated Apr. 1, 2015, 7 pages.
"Notice of Allowance", U.S. Appl. No. 13/657,646, dated Feb. 6, 2015, 15 pages.
"Notice of Allowance", U.S. Appl. No. 14/447,464, dated Nov. 9, 2015, 10 pages.
"Restriction Requirement", U.S. Appl. No. 14/447,419, dated Aug. 4, 2015, 6 pages.
"Restriction Requirement", U.S. Appl. No. 14/454,545, dated Oct. 2, 2015, 6 pages.
"Using Flickr to Organize a Collection of Images", Available at: http://www.jiscdigitalmedia.ac.uk/guide/using-flickr-to-organise-a-collection-of-images, Apr. 2, 2013, 17 pages.
"Windows 7: Display Reminder When Click on Shutdown?", Retrieved From: < http://www.sevenforums.com/customization/118688-display-reminder-when-click-shutdown.html> Jul. 8, 2014, Oct. 18, 2010, 5 Pages.
Ando,"Development of Three-Dimensional Microstages Using Inclined Deep-Reactive Ion Etching", Journal of Microelectromechanical Systems, Jun. 1, 2007, 10 pages.
Callaghan,"Types of writes", Available at: http://smalldatum.blogspot.in/2014/04/types-of-writes.html, Apr. 17, 2014, 3 pages.
Chang-Yen,"A Monolithic PDMS Waveguide System Fabricated Using Soft-Lithography Techniques", In Journal of Lightwave Technology, vol. 23, No. 6, Jun. 2005, 6 pages.
Charles,"Design of Optically Path Length Matched, Three-Dimensional Photonic Circuits Comprising Uniquely Routed Waveguides", In Proceedings of Applied Optics, vol. 51, Issue 27, Sep. 20, 2012, 11 pages.
Chen,"A Study of Fiber-to-Fiber Losses in Waveguide Grating Routers", In Journal of Lightwave Technology, vol. 15, No. 10, Oct. 1997, 5 pages.
Cottier,"Label-free Highly Sensitive Detection of (small) Molecules by Wavelength Interrogation of Integrated Optical Chips", n Proceedings of Sensors and Actuators B: Chemical, vol. 91, Issue 1-3, Jun. 1, 2003, pp. 241-251.
Dumon,"Compact Arrayed Waveguide Grating Devices in Silicon-on-Insulator", In Proceedings of the IEEE/LEOS Symposium Benelux Chapter, May 27, 2014, 4 pages.
Eckel,"Personalize Alerts with the Help of OS X Mavericks Notifications", Retrieved From: <http://www.techrepublic.com/article/customize-os-x-mavericks-notifications-to-personalize-alerts/> Jul. 8, 2014, Mar. 10, 2014, 7 Pages.
Garcia,"COMET: Content Mediator Architecture for Content-Aware Networks", 2011, 8 pages.
Gila,"First Results From a Multi-Ion Beam Lithography and Processing System at The University of Florida", AIP Conference Proceedings, Jun. 1, 2011, 6 pages.
Glendenning,"Polymer Micro-Optics via Micro Injection Moulding", Available at: https://web.archive.org/web/20120310003606/http://www.microsystems.uk.com/english/polymer_optics_injection_moulding.html, Jan. 10, 2011, 6 pages.
Greiner,"Bandpass engineering of lithographically scribed channel-waveguide Bragg gratings", In Proceedings of Optics Letters, vol. 29, No. 8, Apr. 15, 2004, pp. 806-808.
Hepburn,"Color: The Location Based Social Photo App", Available at: http://www.digitalbuzzblog.com/color-the-location-based-social-photo-iphone-app/, Mar. 27, 2011, 12 pages.
Hua,"Engineering of Head-mounted Projective Displays", In Proceedings of Applied Optics, vol. 39, No. 22, Aug. 1, 2000, 11 pages.
Ismail,"Improved Arrayed-Waveguide-Grating Layout Avoiding Systematic Phase Errors", In Proceedings of Optics Express, vol. 19, No. 9, Apr. 25, 2011, pp. 8781-8794.
Jarvenpaa,"Compact near-to-eye display with integrated gaze tracker", Second International Conference on Computer Engineering and Applications, Mar. 19, 2010, 9 pages.
Ksentini,"Building the Bridges between QoS and QoE for Network Control Mechanisms", In Dissertation of University of Rennes, Jul. 3, 2013, 66 pages.
L,"All-Nanoparticle Concave Diffraction Grating Fabricated by Self-Assembly onto Magnetically-Recorded Templates", In Proceedings of Optical Express, vol. 21, Issue 1, Jan. 2013, 1 page.
Lanman,"Near-eye Light Field Displays", In Journal of ACM Transactions on Graphics, vol. 32, No. 6, Nov. 2013, 10 pages.
Levandoski,"Latch-Free, Log-Structured Storage for Multiple Access Methods", U.S. Appl. No. 13/924,567, filed Jun. 22, 2013, 51 pages.
Levandoski,"The Bw-Tree: A B-tree for New Hardware Platforms", In IEEE 29th International Conference on Data Engineering, Apr. 8, 2013, 12 pages.
Mack,"Moto X: The First Two Weeks", Retrieved From: <http://www.gizmag.com/two-weeks-motorola-google-moto-x-review/28722/> Jul. 8, 2014, Aug. 16, 2013, 8 pages.
Mei,"An all fiber interferometric gradient hydrophone with optical path length compensation", In Proceedings of Summaries of Papers Presented at the Conference on Lasers and Electro-Optics, May 28, 1999, 2 pages.
Morga,"History of SAW Devices", In Proceedings of the IEEE International Frequency Control Symposium, May 27, 1998, 22 pages.
Prohaska,"Fast Updates with TokuDB", Available at: http://www.tokutek.com/2013/02/fast-updates-with-tokudb/, Feb. 12, 2013, 2 pages.
Smalley,"Anisotropic Leaky-Mode Modulator for Holographic Video Displays", In Proceedings of Nature, vol. 498, Jun. 20, 2013, 6 pages.
Teng,"Fabrication of nanoscale zero-mode waveguides using microlithography for single molecule sensing", In Proceedings of Nanotechnology, vol. 23, No. 45, Jul. 7, 2012, 7 pages.
Thurrott,"Nokia Lumia "Black": Glance 2.0", Retrieved From:<http://winsupersite.com/windows-phone/nokia-lumia-black-glance-20> Jul. 8, 2014, Jan. 11, 2014, 3 Pages.

(56) References Cited

OTHER PUBLICATIONS

Tien, "Microcontact Printing of SAMs", In Proceedings of Thin Films, vol. 24, May 28, 2014, 24 pages.
Vranjes, "Application Window Divider Control for Window Layout Management", U.S. Appl. No. 13/863,369, filed Apr. 15, 2013, 21 pages.
Wiebe, "Using screen space efficiently with Gridmove", Available at: http://lowerthought.wordpress.com/2010/05/15/using-screen-space-efficiently-with-gridmove/, May 15, 2010, 2 pages.
"Final Office Action", U.S. Appl. No. 14/447,109, dated Jul. 11, 2016, 9 pages.
"Final Office Action", U.S. Appl. No. 14/447,419, dated May 17, 2016, 10 pages.
"Foreign Office Action", JP Application No. 2014-512824, dated Jun. 7, 2016, 6 pages.
"Foreign Office Action", PH Application No. 1-2013-502367, dated Jun. 15, 2016, 2 pages.
"International Search Report and Written Opinion", Application No. PCT/US2015/061713, dated May 12, 2016, 16 pages.
"Non-Final Office Action", U.S. Appl. No. 14/335,927, dated Jun. 3, 2016, 8 pages.
"Non-Final Office Action", U.S. Appl. No. 14/448,975, dated Jul. 1, 2016, 17 pages.
"Second Written Opinion", Application No. PCT/US2015/041909, dated Jun. 21, 2016, 6 pages.
"Second Written Opinion", Application No. PCT/US2015/041930, dated Jun. 21, 2016, 5 pages.
"Second Written Opinion", Application No. PCT/US2015/042187, dated Jun. 30, 2016, 5 pages.
"Second Written Opinion", Application No. PCT/US2015/042226, dated Jun. 10, 2016, 6 pages.
"Second Written Opinion", Application No. PCT/US2015/042371, dated Jun. 27, 2016, 7 pages.
"Can I see a Skydrive folder in Windows as computer disk?", retrieved from http://forums.techarena.in/technology-internet/1386082.htm on Aug. 5, 2011, 3 pages.
"Final Office Action", U.S. Appl. No. 13/229,554, dated Dec. 4, 2013, 19 pages.
"Final Office Action", U.S. Appl. No. 13/551,297, dated Nov. 5, 2014, 18 pages.
"Foreign Office Action", CL Application No. 3370-2013, dated Oct. 29, 2015, 6 pages.
"Foreign Office Action", RU Application No. 2013152630, dated Oct. 26, 2015, 5 pages.
"International Search Report and Written Opinion", Application No. PCT/US2015/042187, dated Oct. 20, 2015, 10 pages.
"International Search Report and Written Opinion", Application No. PCT/US2015/042259, dated Oct. 12, 2015, 11 pages.
"International Search Report and Written Opinion", Application No. PCT/US2015/041046, dated Nov. 9, 2015, 15 pages.
"Non-Final Office Action", U.S. Appl. No. 13/229,554, dated Aug. 16, 2013, 16 pages.
"Non-Final Office Action", U.S. Appl. No. 13/229,554, dated Nov. 17, 2014, 25 pages.
"Non-Final Office Action", U.S. Appl. No. 13/551,297, dated May 23, 2014, 17 pages.
"Non-Final Office Action", U.S. Appl. No. 13/863,369, dated Dec. 21, 2015, 17 pages.
"Supplemental Notice of Allowance", U.S. Appl. No. 14/447,464, dated Jan. 12, 2016, 2 pages.
"Windows Live Logo Windows Live SkyDrive", retrieved from http://toostep.com/trends/india-one-three-chosen-to-test-skydrive-online-storage on Aug. 5, 2011, 2 pages.
"Windows Phone—Pictures Hub", retrieved from http://www.microsoft.com/windowsphone/en-gb/howto/wp7/pictures/pictures-hub.aspx on Jun. 21, 2012, 2012, 2 pages.
Antonopoulos, "Efficient Updates for Web-Scale Indexes over the Cloud", IEEE 28th International Conference on Data Engineering Workshops, Apr. 2012, 8 pages.
Levandoski, "Ranking and New Database Architectures", In Proceedings of the 7th International Workshop on Ranking in Databases, Aug. 2013, 4 pages.
Snavely, "Modeling the World from Internet Photo Collections", International Journal of Computer Vision, vol. 80, Issue 2—Available at <http://phototour.cs.washington.edu/ModelingTheWorld_ijcv07.pdf>, Nov. 2008, 22 pages.
"Foreign Office Action", CO Application No. 13300265, dated Sep. 24, 2014, 10 Pages.
"Non-Final Office Action", U.S. Appl. No. 13/118,339, dated Dec. 10, 2014, 16 pages.
"Adobe Acrobat 8 Standard User Guide", Adobe Systems Incorporated, 2007, pp. 34 & 36.
"Adobe Audition / Customizing Workspaces", Retrieved From: <http://help.adobe.com/en_US/audition/cs/using/WS9FA7B8D7-5991-4e05-B13C-4C85DAF1F051.html> Jul. 5, 2014, May 18, 2011, 6 Pages.
"Advisory Action", U.S. Appl. No. 12/414,382, dated Jan. 20, 2012, 3 pages.
"Advisory Action", U.S. Appl. No. 12/433,605, dated Apr. 5, 2012, 3 pages.
"Alltel Adds Dedicated Search Key to Phones", Retrieved from: <http://www.phonescoop.com/news/item.php?n=2159> on Nov. 26, 2008., Apr. 12, 2007, 2 Pages.
"Android 2.3 User's Guide", AUG-2.3-103, Android mobile technology platform 2.3, Dec. 13, 2010, 380 pages.
"Apple iPhone—8GB AT&T", Retrieved from: <http://nytimes.com.com/smartphones/apple-iphone-8gb-at/4515-6452_7-32309245.html> on Nov. 20, 2008, Jun. 29, 2007, 11 pages.
"Application User Model IDs", Retrieved from: <http://msdn.microsoft.com/en-us/library/dd378459(VS.85).aspx> on Sep. 28, 2010, 2010, 6 pages.
"Ask Web Hosting", Retrieved from: <http://www.askwebhosting.com/story/18501/HTC_FUZE_From_ATandampT_Fuses_Fun_and_Function_With_the_One-Touch_Power_of_TouchFLO_3D.html> on May 5, 2009., Nov. 11, 2008, 3 pages.
"Basics of Your Device: Get Familiar with the Home Screen", Nokia USA—How to—retrieved from <http://www.nokia.ca/get-support-and-software/product-support/c6-01/how-to#> on May 11, 2011, 3 pages.
"Blackberry office tools: Qwerty Convert", Retrieved from: <http://blackberrysoftwarelist.net/blackberry/download-software/blackberry-office/qwerty_convert.aspx> on Nov. 20, 2008, Nov. 20, 2008, 1 page.
"Calc4M", Retrieved from: <http://www.hellebo.com/Calc4M.html> on Dec. 11, 2008, Sep. 10, 2008, 4 Pages.
"Class ScrollView", Retrieved from: <http://www.blackberry.com/developers/docs/6.0.0api/net/rim/device/api/ui/ScrollView.html> on Sep. 28, 2010, 13 pages.
"Content-Centric E-Mail Message Analysis in Litigation Document Reviews", Retrieved from: <http://www.busmanagement.com/article/Issue-14/Data-Management/Content-Centric-E-Mail-Message-Analysis-in-Litigation-Document-Reviews/> on May 6, 2009, 2009, 5 Pages.
"Corrected Notice of Allowance", U.S. Appl. No. 13/656,639, dated Dec. 11, 2013, 3 pages.
"Dial a number", Retrieved from: <http://www.phonespell.org/ialhelp.html> on Nov. 20, 2008, Nov. 20, 2008, 1 page.
"Display Control", Retrieved From: <http://www.portrait.com/technology/display-control.html> Jul. 4, 2014, Jun. 24, 2013, 5 Pages.
"DuoSense™ Multi-Touch Gestures", Retrieved from: <http://www.n-trig.com/Data/Uploads/Misc/DuoSenseMTG_final.pdf>, Jul. 2008, 4 pages.
"Elecont Quick Desktop 1.0.43", Retrieved from: <http://handheld.softpedia.com/get/System-Utilities/Launcher-Applications/Elecont-Quick-Desktop-72131.shtml> on May 5, 2009., Mar. 13, 2009, 2 pages.
"Email Notification for Microsoft Outlook and Outlook Express", Retrieved from: <http://www.contextmagic.com/express-notfication/> on Sep. 29, 2010, Jul. 21, 2004, 3 pages.

(56) References Cited

OTHER PUBLICATIONS

"Enhanced IBM Power Systems Software and PowerVM Restructuring", IBM United States Announcement 208-082, dated Apr. 8, 2008, available at <http://www.ibm.com/common/ssi/rep_ca/2/897/ENUS208-082/ENUS208082.PDF>,Apr. 8, 2008, pp. 1-19.
"Exclusive: Windows Mobile 7 to Focus on Touch and Motion Gestures", Retrieved from: <http://anti-linux.blogspot.com/2008/08/exclusive-windows-mobile-7-to-focus-on.html> on May 6, 2009, Aug. 1, 2008, 14 pages.
"Extended European Search Report", EP Application No. 09818253.8, dated Apr. 10, 2012, 7 pages.
"eXtreme Energy Conservation: Advanced Power-Saving Software for Wireless Devices", White Paper, Freescale Semiconductor, Inc., Document No. XTMENRGYCNSVWP, Rev #0, available at <http://www.freescale.com/files/32bit/doc/white_paper/XTMENRGYCNSVWP.pdf>,Feb. 2006, 15 pages.
"Final Office Action", U.S. Appl. No. 11/305,789, dated Apr. 1, 2009, 10 pages.
"Final Office Action", U.S. Appl. No. 11/502,264, dated Feb. 4, 2010, 15 pages.
"Final Office Action", U.S. Appl. No. 11/502,264, dated Mar. 29, 2013, 16 pages.
"Final Office Action", U.S. Appl. No. 11/502,264, dated Apr. 3, 2009, 9 pages.
"Final Office Action", U.S. Appl. No. 12/244,545, dated Dec. 7, 2011, 16 pages.
"Final Office Action", U.S. Appl. No. 12/244,545, dated Sep. 7, 2012, 23 pages.
"Final Office Action", U.S. Appl. No. 12/413,977, dated Nov. 17, 2011, 16 pages.
"Final Office Action", U.S. Appl. No. 12/414,382, dated Dec. 23, 2011, 7 pages.
"Final Office Action", U.S. Appl. No. 12/414,476, dated Dec. 1, 2011, 20 pages.
"Final Office Action", U.S. Appl. No. 12/433,605, dated Feb. 3, 2012, 11 pages.
"Final Office Action", U.S. Appl. No. 12/433,667, dated Sep. 13, 2011, 17 pages.
"Final Office Action", U.S. Appl. No. 12/469,458, dated Nov. 17, 2011, 15 pages.
"Final Office Action", U.S. Appl. No. 12/469,480, dated Feb. 9, 2012, 17 pages.
"Final Office Action", U.S. Appl. No. 12/484,799, dated Apr. 30, 2012, 13 pages.
"Final Office Action", U.S. Appl. No. 12/560,081, dated Mar. 14, 2012, 16 pages.
"Final Office Action", U.S. Appl. No. 12/721,422, dated Mar. 7, 2013, 10 pages.
"Final Office Action", U.S. Appl. No. 12/972,967, dated Oct. 11, 2013, 21 pages.
"Final Office Action", U.S. Appl. No. 12/983,106, dated Oct. 7, 2013, 19 pages.
"Final Office Action", U.S. Appl. No. 13/073,300, dated Apr. 1, 2014, 14 pages.
"Final Office Action", U.S. Appl. No. 13/118,181, dated Dec. 20, 2013, 18 pages.
"Final Office Action", U.S. Appl. No. 13/118,204, dated Nov. 21, 2013, 24 pages.
"Final Office Action", U.S. Appl. No. 13/118,221, dated Mar. 17, 2014, 21 pages.
"Final Office Action", U.S. Appl. No. 13/118,321, dated Dec. 19, 2013, 30 pages.
"Final Office Action", U.S. Appl. No. 13/118,333, dated Apr. 23, 2014, 22 pages.
"Final Office Action", U.S. Appl. No. 13/118,339, dated Aug. 22, 2013, 21 pages.
"Final Office Action", U.S. Appl. No. 13/118,347, dated Aug. 15, 2013, 25 pages.
"Final Office Action", U.S. Appl. No. 13/224,258, dated Sep. 11, 2013, 37 pages.
"Final Office Action", U.S. Appl. No. 13/228,707, dated May 21, 2014, 16 pages.
"Final Office Action", U.S. Appl. No. 13/229,155, dated Jun. 12, 2014, 15 pages.
"Final Office Action", U.S. Appl. No. 13/229,693, dated Sep. 4, 2013, 23 pages.
"Final Office Action", U.S. Appl. No. 13/655,386, dated Jun. 6, 2013, 34 pages.
"Final Office Action", U.S. Appl. No. 13/656,354, dated Jun. 17, 2013, 14 pages.
"Final Office Action", U.S. Appl. No. 13/656,574, dated Aug. 23, 2013, 20 pages.
"Final Office Action", U.S. Appl. No. 13/657,621, dated Sep. 10, 2013, 18 pages.
"Final Office Action", U.S. Appl. No. 13/657,646, dated May 6, 2013, 12 pages.
"Final Office Action", U.S. Appl. No. 13/657,789, dated Jun. 21, 2013, 35 pages.
"Final Office Action", U.S. Appl. No. 13/658,694, dated Oct. 30, 2013, 17 pages.
"First Examination Report", NZ Application No. 618254, dated May 20, 2014, 3 Pages.
"First Examination Report", NZ Application No. 618264, dated May 20, 2014, 2 pages.
"First Examination Report", NZ Application No. 618269, dated May 20, 2014, 2 pages.
"First Examination Report", NZ Application No. 618284, dated May 20, 2014, 2 pages.
"Foreign Office Action", CN Application No. 201110429183.5, dated Jan. 6, 2014, 10 Pages.
"Foreign Office Action", CN Application No. 201110437542.1, dated Jan. 6, 2014, 10 Pages.
"Foreign Office Action", CN Application No. 201110437572.2, dated Dec. 3, 2013, 7 pages.
"Foreign Office Action", CN Application No. 201110454251.3, dated Dec. 27, 2013, 12 Pages.
"Freeware.mobi", Retrieved from: <http://www.palmfreeware.mobi/download-palette.html> on Nov. 6, 2008, Oct. 9, 2001, 2 pages.
"Gestures Programming", Retrieved from <http://doc.qt.digia.com/4.6/gestures-overview.html> on May 28, 2014, 2010, 3 pages.
"GnomeCanvas", Retrieved from: <http://library.gnome.org/devel/libgnomecanvas/unstable/GnomeCanvas.html> on Sep. 28, 2010, 11 pages.
"How Do I Cancel a "Drag" Motion on an Android Seekbar?", retrieved from <http://stackoverflow.com/questions/2917969/how-do-i-cancel-a-drag-motion-on-an-android-seekbar> on Jun. 20, 2011, May 28, 2010, 1 page.
"How do I use Categories with my Weblog?", Retrieved from: <http://tpsupport.mtcs.sixapart.com/tp/us-tp1/how_do_i_use_categories_with_my_weblog.html> Sep. 28, 2010, Sep. 16, 2009, 3 pages.
"How do you dial 1-800-FLOWERS", Retrieved from: <http://blogs.msdn.com/windowsmobile/archive/2007/02/06/how-do-you-dial-1-800-flowers.aspx> on Nov. 20, 2008, Feb. 6, 2007, 24 pages.
"HTC Shows HTC Snap with Snappy Email Feature", Retrieved from: <http://www.wirelessandmobilenews.com/smartphones/ on May 5, 2009>, May 4, 2009, 10 Pages.
"Image Gestures Example", Retrieved from <http://doc.qt.digia.com/4.6/gestures-imagegestures.html> on May 28, 2014, 2010, 3 pages.
"IntelliScreen—New iPhone App Shows Today Screen Type Info in Lock Screen", Retrieved from: <http://justanotheriphoneblog.com/wordpress//2008/05/13/intelliscreen-new-iphone-app-shows-today-screen-type-info-on-lock-screen/> on Nov. 12, 2008, May 13, 2008, 11 pages.
"International Search Report and Written Opinion", Application No. PCT/US2010/028555, dated Oct. 12, 2010, 10 pages.
"International Search Report and Written Opinion", Application No. PCT/US2010/028699, dated Oct. 4, 2010, 10 pages.
"International Search Report and Written Opinion", Application No. PCT/US2013/060247, dated Dec. 10, 2013, 10 pages.
"International Search Report and Written Opinion", Application No. PCT/US2011/067075, dated Dec. 12, 2012, 10 pages.

(56) References Cited

OTHER PUBLICATIONS

"International Search Report and Written Opinion", Application No. PCT/US2009/061864, dated May 14, 2010, 10 pages.
"International Search Report and Written Opinion", Application No. PCT/US2009/061382, dated May 26, 2010, 10 pages.
"International Search Report and Written Opinion", Application No. PCT/US2011/055725, dated Sep. 27, 2012, 10 pages.
"International Search Report and Written Opinion", Application No. PCT/US2009/061735, dated Jun. 7, 2010, 11 pages.
"International Search Report and Written Opinion", Application No. PCT/US2010/034772, dated Dec. 29, 2010, 12 pages.
"International Search Report and Written Opinion", Application No. PCT/US2012/047091, dated Dec. 27, 2012, 15 pages.
"International Search Report and Written Opinion", Application No. PCT/US2010/038730, dated Jan. 19, 2011, 8 pages.
"International Search Report and Written Opinion", Application No. PCT/US2011/055513, dated Mar. 27, 2012, 8 pages.
"International Search Report and Written Opinion", Application No. PCT/US2011/055514, dated May 22, 2012, 8 pages.
"International Search Report and Written Opinion", Application No. PCT/US2011/055512, dated May 24, 2012, 8 pages.
"International Search Report and Written Opinion", Application No. PCT/US2011/055520, dated May 9, 2012, 8 pages.
"International Search Report and Written Opinion", Application No. PCT/US2011/055524, dated Jun. 1, 2012, 8 pages.
"International Search Report and Written Opinion", Application No. PCT/US2011/065702, dated Aug. 29, 2012, 8 pages.
"International Search Report and Written Opinion", Application No. PCT/US2011/055736, dated Sep. 17, 2012, 8 pages.
"International Search Report and Written Opinion", Application No. PCT/US2011/067073, dated Sep. 17, 2012, 8 pages.
"International Search Report and Written Opinion", Application No. PCT/US2011/055511, dated Apr. 24, 2012, 9 pages.
"International Search Report and Written Opinion", Application No. PCT/US2011/055523, dated May 10, 2012, 9 pages.
"International Search Report and Written Opinion", Application No. PCT/US2011/055521, dated May 15, 2012, 9 pages.
"International Search Report and Written Opinion", Application No. PCT/US2011/055522, dated May 15, 2012, 9 pages.
"International Search Report and Written Opinion", Application No. PCT/US2011/055496, dated Sep. 12, 2012, 9 pages.
"International Search Report and Written Opinion", Application No. PCT/US2011/055712, dated Sep. 21, 2012, 9 pages.
"International Search Report and Written Opinion", Application No. PCT/US2011/055493, dated Sep. 26, 212, 9 pages.
"International Search Report and Written Opinion", Application No. PCT/US2011/055478, dated Sep. 27, 2012, 9 pages.
"International Search Report and Written Opinion", Application No. PCT/US2011/055746, dated Sep. 27, 2012, 9 pages.
"International Search Report and Written Opinion", Application No. PCT/US2010/028553, Application Filing Date: Mar. 24, 2010,Nov. 9, 2010, 9 pages.
"Internet Explorer Window Restrictions", Retrieved from: http://technet.microsoft.com/en-us/library/cc759517(WS.10).aspx on Jun. 28, 2011, Microsoft TechNet, 5 pages.
"Introduction to Windows Touch", Retrieved from: <http://download.microsoft.com/download/a/d/f/adf1347d-08dc-41a4-9084-623b1194d4b2/Win7_touch.docx>, Dec. 18, 2008, pp. 1-7.
"iPad User Guide", retrieved from <http://cyndidannerkuhn.info/CDK/iPads_Resources_files/iPad_User_Guide.pdf> on Jun. 17, 2011, 154 pages.
"iPod touch User Guide for iPhone OS 3.0 Software", Apple Inc., 2009, 153 pages.
"Keyboard (5)", Retrieved from: <http://landru.uwaterloo.ca/cgi-bin/man.cgi?section=5&topic=keyboard> on Dec. 11, 2008., Aug. 11, 1997, 8 Pages.
"Keyboard Shortcuts", Retrieved from: <http://www.pctoday.com/editorial/article.asp?article=articles%2F2005%2Ft0311%2F26t11%2F26t11.asp> on Aug. 3, 2009., Nov. 2005, 5 pages.
"Kiosk Browser Chrome Customization Firefox 2.x", Retrieved from: <http://stlouis-shopper.com/cgi-bin/mozdev-wiki/,pl?ChromeCustomization> on Oct. 22, 2008 Making a new chrome for the kiosk browser, Kiosk Project Kiosk Browser Chrome Customization Firefox-2.x,Aug. 16, 2007, 2 pages.
"Live Photo Gallery—Getting Started—from Camera to Panorama", Retrieved from: <http://webdotwiz.spaces.live.com/blog/cns!27827607521393233!1729.entry> on May 5, 2009., Sep. 2008, 7 Pages.
"Magic mouse", Retrieved from: <http://www.apple.com/magicmouse/> on May 10, 2011, 3 pages.
"Manage Multiple Windows", Retrieved From: <http://windows.microsoft.com/en-hk/windows/manage-multiple-windows#1TC=windows-7> Jul. 8, 2014, 4 Pages.
"MIDTP Tip Sheet: Book Courier", Retrieved from: <http://www.midtb.org/tipsbookcourier.htm> on Dec. 11, 2008., Sep. 26, 2005, 6 Pages.
"Mobile/UI/Designs/TouchScreen/workingUI", Retrieved from: <https://wiki.mozilla.org/Mobile/UI/Designs/TouchScreen/workingUI> on Oct. 26, 2009, 2009, 30 pages.
"moGo beta v.0.4", Retrieved from: <http://forum.xda-developers.com/showthread.php?t=375196> on Sep. 27, 2010, Mar. 7, 2008, 10 pages.
"Multi-touch", Retrieved from <http://en.wikipedia.org/wiki/Multi-touch#Microsoft_Surface> on Apr. 24, 2009, Apr. 17, 2009, 8 pages.
"My Favorite Gadgets, System Monitor II", Retrieved from <http://www.myfavoritegadgets.info/monitors/SystemMonitorII/systemmonitorII.html> on Mar. 12, 2013, Jun. 8, 2010, 5 pages.
"New Features in WhatsUp Gold v12.0", retrieved from <http://www.netbright.co.th/?name=product&file=readproduct&id=12> on Jun. 10, 2011, 4 pages.
"Nokia E61 Tips and Tricks for Keyboard Shortcuts", Retrieved from: <http://www.mobiletopsoft.com/board/1810/nokia-e61-tips-and-tricks-for-keyboard-shortcuts.html> on Dec. 17, 2008., Jan. 27, 2006, 2 Pages.
"Non-Final Office Action", U.S. Appl. No. 13/228,707, dated Oct. 25, 2013, 12 pages.
"Non-Final Office Action", U.S. Appl. No. 13/228,888, dated Feb. 10, 2014, 21 pages.
"Non-Final Office Action", U.S. Appl. No. 11/215,052, dated Jun. 23, 2011, 17 pages.
"Non-Final Office Action", U.S. Appl. No. 11/305,789, dated Sep. 21, 2009, 5 pages.
"Non-Final Office Action", U.S. Appl. No. 11/502,264, dated Sep. 30, 2009, 15 pages.
"Non-Final Office Action", U.S. Appl. No. 11/502,264, dated Sep. 14, 2012, 14 pages.
"Non-Final Office Action", U.S. Appl. No. 12/244,545, dated Mar. 27, 2012, 18 pages.
"Non-Final Office Action", U.S. Appl. No. 12/244,545, dated Aug. 17, 2011, 15 pages.
"Non-Final Office Action", U.S. Appl. No. 12/413,977, dated Jul. 19, 2011, 17 pages.
"Non-Final Office Action", U.S. Appl. No. 12/413,977, dated Jul. 20, 2012, 18 pages.
"Non-Final Office Action", U.S. Appl. No. 12/414,382, dated Jul. 26, 2011, 9 pages.
"Non-Final Office Action", U.S. Appl. No. 12/414,434, dated Jan. 17, 2012, 7 pages.
"Non-Final Office Action", U.S. Appl. No. 12/414,434, dated May 31, 2012, 7 pages.
"Non-Final Office Action", U.S. Appl. No. 12/414,434, dated Aug. 2, 2011, 6 pages.
"Non-Final Office Action", U.S. Appl. No. 12/414,455, dated Aug. 29, 2011, 8 pages.
"Non-Final Office Action", U.S. Appl. No. 12/414,458, dated Jul. 6, 2011, 8 pages.
"Non-Final Office Action", U.S. Appl. No. 12/414,476, dated Nov. 9, 2012, 22 pages.
"Non-Final Office Action", U.S. Appl. No. 12/414,476, dated Aug. 3, 2011, 21 pages.
"Non-Final Office Action", U.S. Appl. No. 12/433,605, dated Jun. 24, 2011, 10 pages.

(56) References Cited

OTHER PUBLICATIONS

"Non-Final Office Action", U.S. Appl. No. 12/433,667, dated Jun. 7, 2011, 15 pages.
"Non-Final Office Action", U.S. Appl. No. 12/433,667, dated Feb. 3, 2012, 16 pages.
"Non-Final Office Action", U.S. Appl. No. 12/469,419, dated Nov. 9, 2011, 15 pages.
"Non-Final Office Action", U.S. Appl. No. 12/469,419, dated May 23, 2012, 13 pages.
"Non-Final Office Action", U.S. Appl. No. 12/469,458, dated Jul. 1, 2011, 15 pages.
"Non-Final Office Action", U.S. Appl. No. 12/469,458, dated Sep. 21, 2012, 14 pages.
"Non-Final Office Action", U.S. Appl. No. 12/469,480, dated Oct. 17, 2012, 16 pages.
"Non-Final Office Action", U.S. Appl. No. 12/469,480, dated Sep. 22, 2011, 14 pages.
"Non-Final Office Action", U.S. Appl. No. 12/470,558, dated Nov. 22, 2011, 9 pages.
"Non-Final Office Action", U.S. Appl. No. 12/480,969, dated Aug. 7, 2012, 15 pages.
"Non-Final Office Action", U.S. Appl. No. 12/484,799, dated Aug. 11, 2011, 12 pages.
"Non-Final Office Action", U.S. Appl. No. 12/484,799, dated Aug. 7, 2012, 13 pages.
"Non-Final Office Action", U.S. Appl. No. 12/484,845, dated Dec. 7, 2011, 16 pages.
"Non-Final Office Action", U.S. Appl. No. 12/560,081, dated Dec. 7, 2011, 16 pages.
"Non-Final Office Action", U.S. Appl. No. 12/721,422, dated Oct. 1, 2012, 7 pages.
"Non-Final Office Action", U.S. Appl. No. 12/972,967, dated Jan. 30, 2013, 19 pages.
"Non-Final Office Action", U.S. Appl. No. 12/977,584, dated Dec. 7, 2012, 8 pages.
"Non-Final Office Action", U.S. Appl. No. 12/978,184, dated Jan. 23, 2013, 7 pages.
"Non-Final Office Action", U.S. Appl. No. 12/983,106, dated Nov. 9, 2012, 17 pages.
"Non-Final Office Action", U.S. Appl. No. 13/073,300, dated Jul. 25, 2013, 13 pages.
"Non-Final Office Action", U.S. Appl. No. 13/118,181, dated Mar. 4, 2013, 22 pages.
"Non-Final Office Action", U.S. Appl. No. 13/118,204, dated Feb. 28, 2013, 13 pages.
"Non-Final Office Action", U.S. Appl. No. 13/118,221, dated Mar. 1, 2013, 22 pages.
"Non-Final Office Action", U.S. Appl. No. 13/118,257, dated Mar. 5, 2013, 19 pages.
"Non-Final Office Action", U.S. Appl. No. 13/118,265, dated Jun. 10, 2014, 13 pages.
"Non-Final Office Action", U.S. Appl. No. 13/118,292, dated Jun. 6, 2014, 25 pages.
"Non-Final Office Action", U.S. Appl. No. 13/118,302, dated Mar. 4, 2014, 10 pages.
"Non-Final Office Action", U.S. Appl. No. 13/118,314, dated Feb. 27, 2014, 13 pages.
"Non-Final Office Action", U.S. Appl. No. 13/118,321, dated Jun. 10, 2013, 32 pages.
"Non-Final Office Action", U.S. Appl. No. 13/118,333, dated Jul. 5, 2013, 18 pages.
"Non-Final Office Action", U.S. Appl. No. 13/118,339, dated Feb. 11, 2013, 15 pages.
"Non-Final Office Action", U.S. Appl. No. 13/118,347, dated Feb. 12, 2013, 14 pages.
"Non-Final Office Action", U.S. Appl. No. 13/196,272, dated Feb. 6, 2013, 10 pages.
"Non-Final Office Action", U.S. Appl. No. 13/196,272, dated Sep. 3, 2013, 5 pages.
"Non-Final Office Action", U.S. Appl. No. 13/224,258, dated Jan. 8, 2013, 35 pages.
"Non-Final Office Action", U.S. Appl. No. 13/228,876, dated Nov. 22, 2013, 14 pages.
"Non-Final Office Action", U.S. Appl. No. 13/228,931, dated Apr. 7, 2014, 21 pages.
"Non-Final Office Action", U.S. Appl. No. 13/228,945, dated Apr. 14, 2014, 22 pages.
"Non-Final Office Action", U.S. Appl. No. 13/229,155, dated Nov. 18, 2013, 14 pages.
"Non-Final Office Action", U.S. Appl. No. 13/229,556, dated Mar. 28, 2014, 12 pages.
"Non-Final Office Action", U.S. Appl. No. 13/229,693, dated Mar. 12, 2013, 21 pages.
"Non-Final Office Action", U.S. Appl. No. 13/229,693, dated Jun. 20, 2014, 25 pages.
"Non-Final Office Action", U.S. Appl. No. 13/229,709, dated Apr. 7, 2014, 12 pages.
"Non-Final Office Action", U.S. Appl. No. 13/492,495, dated Dec. 19, 2012, 6 pages.
"Non-Final Office Action", U.S. Appl. No. 13/492,495, dated Sep. 17, 2012, 8 pages.
"Non-Final Office Action", U.S. Appl. No. 13/655,386, dated Dec. 26, 2012, 23 pages.
"Non-Final Office Action", U.S. Appl. No. 13/655,390, dated Dec. 17, 2012, 12 pages.
"Non-Final Office Action", U.S. Appl. No. 13/656,354, dated Feb. 6, 2013, 10 pages.
"Non-Final Office Action", U.S. Appl. No. 13/656,574, dated Jan. 31, 2013, 21 pages.
"Non-Final Office Action", U.S. Appl. No. 13/656,639, dated Feb. 7, 2013, 29 pages.
"Non-Final Office Action", U.S. Appl. No. 13/657,621, dated Feb. 7, 2013, 19 pages.
"Non-Final Office Action", U.S. Appl. No. 13/657,646, dated Jan. 3, 2013, 13 pages.
"Non-Final Office Action", U.S. Appl. No. 13/657,789, dated Jan. 9, 2013, 38 pages.
"Non-Final Office Action", U.S. Appl. No. 13/658,694, dated Feb. 13, 2014, 19 pages.
"Non-Final Office Action", U.S. Appl. No. 13/658,694, dated Apr. 26, 2013, 13 pages.
"Normalizing Text: A Java Tutorial by Oracle", Retrieved from: <http://docs.oracle.com/javase/tutorial/i18n/text/normalizerapi.html> on Apr. 8, 2014, Nov. 11, 2006, 3 pages.
"Notice of Allowance", U.S. Appl. No. 11/215,052, dated Mar. 14, 2012, 5 pages.
"Notice of Allowance", U.S. Appl. No. 11/305,789, dated Nov. 23, 2009, 8 pages.
"Notice of Allowance", U.S. Appl. No. 12/414,382, dated Apr. 4, 2012, 4 pages.
"Notice of Allowance", U.S. Appl. No. 12/414,434, dated Aug. 17, 2012, 4 pages.
"Notice of Allowance", U.S. Appl. No. 12/414,455, dated Jan. 4, 2012, 4 pages.
"Notice of Allowance", U.S. Appl. No. 12/414,458, dated Oct. 31, 2011, 2 pages.
"Notice of Allowance", U.S. Appl. No. 12/414,458, dated Nov. 29, 2011, 2 pages.
"Notice of Allowance", U.S. Appl. No. 12/414,458, dated Aug. 10, 2011, 6 pages.
"Notice of Allowance", U.S. Appl. No. 12/470,558, dated Apr. 2, 2012, 7 pages.
"Notice of Allowance", U.S. Appl. No. 12/470,558, dated Aug. 23, 2012, 2 pages.
"Notice of Allowance", U.S. Appl. No. 12/484,799, dated Oct. 22, 2012, 10 pages.
"Notice of Allowance", U.S. Appl. No. 12/484,845, dated Mar. 16, 2012, 5 pages.
"Notice of Allowance", U.S. Appl. No. 12/721,422, dated Jul. 11, 2013, 9 pages.
"Notice of Allowance", U.S. Appl. No. 12/977,584, dated Jun. 19, 2013, 5 pages.

(56) References Cited

OTHER PUBLICATIONS

"Notice of Allowance", U.S. Appl. No. 12/978,184, dated Nov. 6, 2013, 5 pages.
"Notice of Allowance", U.S. Appl. No. 12/978,184, dated Aug. 2, 2013, 5 pages.
"Notice of Allowance", U.S. Appl. No. 13/196,272, dated Nov. 8, 2013, 8 pages.
"Notice of Allowance", U.S. Appl. No. 13/492,495, dated Apr. 26, 2013, 5 pages.
"Notice of Allowance", U.S. Appl. No. 13/655,386, dated Apr. 25, 2014, 6 pages.
"Notice of Allowance", U.S. Appl. No. 13/655,390, dated May 24, 2013, 5 pages.
"Notice of Allowance", U.S. Appl. No. 13/656,639, dated Aug. 19, 2013, 14 pages.
"Notifications", retrieved from <http://msdn.microsoft.com/en-us/library/aa511497.aspx> on May 10, 2011, 16 pages.
"OmneMon™ System Resource Metrics", retrieved from <http://www.omnesys.com/documents/OmneMonSRM_Brochure.pdf> on Jun. 10, 2011, 3 pages.
"ONYX Graphics Announces New ONYX Prepedge Job Preparation Software", retrieved from <http://www.largeformatreview.com/rip-software/433-onyx-graphics-announces-new-onyx-> on May 10, 2011, 2 pages.
"Oracle8i Application Developer's Guide—Advanced Queuing Release 2 (8.1.6)", Retrieved from: http://www.cs.otago.ac.nz/oradocs/appdev.817/a76938/adq01in5.htm on May 6, 2009., Dec. 1999, 8 pages.
"Oracle8i Application Developer's Guide—Advanced Queuing", Retrieved from: http://www.cs.umbc.edu/help/oracle8/server.815/a68005/03_adq1i.htm on May 6, 2009., Feb. 1999, 29 Pages.
"Oracle8i Concepts Release 8.1.5", Retrieved from: http://www.cs.umbc.edu/help/oracle8/server.815/a67781/c16queue.htm on May 6, 2009., Feb. 1999, 10 Pages.
"Organize Your Desktop Workspace for More Comfort with WindowSpace", Retrieved From: <http://www.ntwind.com/software/windowspace.html> Jul. 4, 2014, Sep. 19, 2008, 5 Pages.
"Palette Extender 1.0.2", Retrieved from: <http://palette-extender.en.softonic.com/symbian> on Nov. 6, 2008, Jan. 21, 2003, 2 pages.
"Parallax Scrolling", Retrieved from: <http://en.wikipedia.org/wiki/Parallax_scrolling> on May 5, 2009., May 4, 2009, 3 Pages.
"Push Notifications Overview for Windows Phone", Retrieved from: <http://msdn.microsoft.com/en-us/library/ff402558%28VS.92%29.aspx> on Sep. 30, 2010, Sep. 3, 2010, 1 page.
"QPinchGesture Class Reference", Retrieved from <http://doc.qt.digia.com/4.6/qpinchgesture.html> on May 28, 2014, 2010, 6 pages.
"Remapping the Keyboard", Retrieved from: <http://publib.boulder.ibm.com/infocenter/hodhelp/v9r0/index.jsp?topic=/com.ibm.hod9.doc/help/assignkey.html> on Dec. 11, 2008., Jul. 15, 2005, 5 Pages.
"Restriction Requirement", U.S. Appl. No. 13/118,265, dated Feb. 27, 2014, 7 pages.
"Restriction Requirement", U.S. Appl. No. 13/118,288, dated Mar. 4, 2014, 7 pages.
"Restriction Requirement", U.S. Appl. No. 13/658,694, dated Feb. 6, 2013, 6 pages.
"SecureMe-Anti-Theft Security Application for S60 3rd", Retrieved from: <http:/www.killermobile.com/newsite/mobile-software/s60-applications/secureme-%11-anti%11theft-security-application-for-s60-3rd.htm> on Jun. 28, 2011, Dec. 15, 2008, 3 pages.
"SizeUp The Missing Window Manager", Retrieved From: <https://www.irradiatedsoftware.com/sizeup/> Jul. 4, 2014, Jan. 17, 2013, 4 Pages.
"Snap", Windows 7 Features—retrieved from <http://windows.microsoft.com/en-US/windows7/products/features/snap> on Sep. 23, 2011, 2 pages.
"Split the Windows® Desktop: How to Divide a Single Large Desktop into Multiple Smaller Ones", retrieved from <http://www.actualtools.com/multiplemonitors/split-windows-desktop-how-to-divide-single-large-desktop-into-smaller-ones.shtml> on Jul. 7, 2014, Apr. 10, 2014, 3 pages.
"Supplemental Notice of Allowance", U.S. Appl. No. 12/977,584, dated Sep. 16, 2013, 2 pages.
"Supplemental Notice of Allowance", U.S. Appl. No. 12/977,584, dated Oct. 11, 2013, 2 pages.
"Supplemental Notice of Allowance", U.S. Appl. No. 12/978,184, dated Feb. 25, 2014, 2 pages.
"Supplemental Notice of Allowance", U.S. Appl. No. 13/655,390, dated Sep. 19, 2013, 2 pages.
"Supplemental Notice of Allowance", U.S. Appl. No. 13/655,390, dated Jul. 25, 2013, 2 pages.
"Symbian Applications", Retrieved from: <http://symbianfullversion.blogspot.com/2008_12_01_archive.html> on May 5, 2009., Jan. 2009, 51 Pages.
"The Map Screen", retrieved from <http://www.symbianos.org/whereamiusersguide> on Jun. 17, 2011, 3 pages.
"Top 3 Task Switchers for Android", TechCredo—retrieved from <http://www.techcredo.com/android/top-3-task-switchers-for-android> on May 11, 2011, Mar. 9, 2011, 5 pages.
"Top Android App: Swipepad", Best Android Apps Review—retrieved from <http://www.bestandroidappsreview.com/2011/01/top-android-app-swipepad-launcher.html> on May 11, 2011, 4 pages.
"Touch Shell Free", Retrieved from: <http://www.pocketpcfreeware.mobi/download-touch-shell-free.html> on May 5, 2009., Feb. 23, 2009, 2 Pages.
"User Guide", retrieved from <http://wireframesketcher.com/help/help.html> on Jun. 17, 2011, 19 pages.
"Window Magnet", Retrieved From: <http://magnet.crowdcafe.com/> Jul. 4, 2014, Jun. 23, 2011, 2 Pages.
"Windows 8 is Gorgeous, But is it More Than Just a Shell? (Video)", retrieved from <http://techcrunch.com/2011/06/02/windows-8-gorgeous-shell-video/> on Jun. 20, 2011, Jun. 2, 2011, 6 pages.
"Windows Phone 7 (Push Notification)", retrieved from <http://unknownerror.net/2011-06/windows-phone-7-push-notification-36520> on Jul. 6, 2011, 4 pages.
"Windows Phone 7 Live Tiles", Retrieved from: <http://www.knowyourmobile.com/microsoft/windowsphone7/startscreen/640737/windows_phone_7_live_tiles.html> on May 11, 2011, Oct. 20, 2010, 3 pages.
"Winterface Review", Retrieved from: <http://www.mytodayscreen.com/winterface-review/> on Nov. 12, 2008, Jul. 9, 2008, 42 pages.
"Womma", Retrieved from: <http://www.womma.org/blog/links/wom-trends/> on May 5, 2009., 2007, 70 Pages.
"Working with Multiple Windows", MSOFFICE tutorial!—retrieved from <http://www.msoffice-tutorial.com/working-with-multiple-windows.php> on Sep. 23, 2011, 3 pages.
"Working with Windows", Retreived From: <http://windows.microsoft.com/en-us/windows/working-with-windows#1TC=windows-7> Jul. 4, 2014, 10 Pages.
"You've Got Mail 1.4 Build", retrieved from <http://www.fileshome.com/Shows_Animation_Plays_Sound_Automatic_N . . . > on Jan. 6, 2010, Jun. 18, 2007, 2 pages.
"YUI 3: ScrollView [beta]", Retrieved from: <http://developer.yahoo.com/yui/3/scrollview/> on Sep. 28, 2010, 5 pages.
Anson, "Pining for Windows Phone 7 controls? We got ya covered! [Announcing the first release of the Silverlight for Windows Phone Toolkit!]", Retrieved from <http://blogs.msdn.com/b/delay/archive/2010/09/16/pining-for-windows-phone-7-controls-we-got-ya-covered-announcing-the-first-release-of-the-silverlight-for-windows-phone-toolkit.aspx> on May 30, 2014, Sep. 16, 2010, 17 pages.
Ashraf, "Winsplit Revolution: Tile, Resize, and Position Windows for Efficient Use of Your Screen", Retrieved From: <http://dottech.org/11240/winsplit-revolution-tile-resize-and-position-windows-for-efficient-use-of-your-screen/> Jul. 8, 2014, Dec. 18, 2011, 4 Pages.
Bates, "A Framework to Support Large-Scale Active Applications", University of Cambridge Computer Laboratory—Available at <http://citeseerx.ist.psu.edu/viewdoc/download?doi=10.1.1.48.1690&rep=rep1&type=pdf>, 1996, 8 pages.
Beiber, et al.,' "Screen Coverage: A Pen-Interaction Problem for PDA's and Touch Screen Computers", In Proceedings of ICWMC 2007, Mar. 2007, 6 pages.

(56) References Cited

OTHER PUBLICATIONS

Bjork, et al.,' "Redefining the Focus and Context of Focus+Context Visualizations", In Proceedings of INFOVIS 2000—Available at <http://www.johan.redstrom.se/papers/redefining.pdf>, Oct. 2000, 9 pages.

Bowes, et al.,' "Transparency for Item Highlighting", Faculty of Computing Science, Dalhousie University—Available at <http://torch.cs.dal.ca/~dearman/pubs/GI2003-bowes,dearman,perkins-paper.pdf>, 2003, 2 pages.

Bruzzese, "Using Windows 7, Managing and Monitoring Windows 7—Chapter 11", Que Publishing, May 5, 2010, 33 pages.

Buring, "User Interaction with Scatterplots on Small Screens—A Comparative Evaluation of Geometric-Semantic Zoom and Fisheye Distortion", IEEE Transactions on Visualization and Computer Graphics, vol. 12, Issue 5, Available at <http://citeseerx.ist.psu.edu/viewdoc/download?doi=10.1.1.134.4568&rep=rep1&type=pdf>,Sep. 2006, pp. 829-836.

Carrera, et al.,' "Conserving Disk Energy in Network Servers", available at <http://citeseerx.ist.psu.edu/viewdoc/download?doi=10.1.1.6.8301&rep=rep1&type=ps>, Nov. 2002, 15 pages.

Cawley, "How to Customise Your Windows Phone 7", Retrieved from: <http://www.brighthub.com/mobile/windows-mobile-platform/articles/95213.aspx> on May 10, 2011, Nov. 12, 2010, 3 pages.

Cawley, "Windows Phone 7 Customization Tips and Tricks", retrieved from <http://www.brighthub.com/mobile/windows-mobile-platform/articles/95213.aspx> on Jun. 20, 2011, May 16, 2011, 2 pages.

Cohen, et al.,' "Automatic Strategies in the Siemens RTL Tiled Window Manager", In Proceedings: The 2nd IEEE Conference on Computer Workstations, Mar. 7, 1988, pp. 111-119.

Cohen, et al.,' "Wang Tiles for Image and Texture Generation", In Proceedings of SIGGRAPH 2003—Available <http://research.microsoft.com/en-us/um/people/cohen/WangFinal.pdf>, 2003, 8 pages.

Damien, "7 Ways to Supercharge Multitasking in Android", retrieved from <http://maketecheasier.com/7-ways-to-supercharge-multitasking-in-android/2011/01/22/> on May 11, 2011, Jan. 22, 2011, 5 pages.

Davis, "A WPF Custom Control for Zooming and Panning", Retrieved from: <http://www.codeproject.com/KB/WPF/zoomandpancontrol.aspx> on Sep. 28, 2010, Jun. 29, 2010, 21 pages.

Delimarsky, "Sending Tile Push Notifications on Windows Phone 7", retrieved from <http://mobile.dzone.com/articles/sending-tile-push> on May 10, 2011, Aug. 25, 2010, 2 pages.

Denoue, et al.,' "WebNC: Efficient Sharing of Web Applications", In Proceedings of WWW 2009—Available at <http://www.fxpal.com/publications/FXPAL-PR-09-495.pdf>, 2009, 2 pages.

Dolcourt, "Webware", Retrieved from: <http://news.cnet.com/webware/?categoryId=2010> on May 5, 2009., May 5, 2009, 13 Pages.

Dunsmuir, "Selective Semantic Zoom of a Document Collection", Available at <http://www.cs.ubc.ca/~tmm/courses/533/projects/dustin/proposal.pdf>, Oct. 30, 2009, pp. 1-9.

Farrugia, et al.,' "Cell Phone Mini Challenge: Node-Link Animation Award Animating Multivariate Dynamic Social Networks", IEEE Symposium on Visual Analytics Science and Technology, Columbus, OH, USA, Oct. 21-23, 2008, Oct. 21, 2008, 2 pages.

Fischer, "Cool Discussion of Push Notifications—Toast and Tile—on Windows Phone", Retrieved from: <http://www.windowsphoneexpert.com/Connection/forums/p/4153/18399.aspx> on Sep. 29, 2010, May 3, 2010, 3 pages.

Gade, "Samsung Alias u740", Retrieved from: <http://www.mobiletechreview.com/phones/Samsung-U740.htm> on Nov. 20, 2008, Mar. 14, 2007, 6 pages.

Gao, "A General Logging Service for Symbian based Mobile Phones", Retrieved from: <http://www.nada.kth.se/utbildning/grukth/exjobb/rapportlistor/2007/rapporter07/gao_rui_07132.pdf.> on Jul. 17, 2008, Feb. 2007, pp. 1-42.

Gralla, "Windows XP Hacks, Chapter 13—Hardware Hacks", O'Reilly Publishing, Feb. 23, 2005, 25 pages.

Ha, et al.,' "SIMKEYS: An Efficient Keypad Configuration for Mobile Communications", Retrieved from: < http://ieeexplore.ieee.org/stamp/stamp.jsp?arnumber=01362557.> on Dec. 17, 2008, Nov. 2004, 7 Pages.

Harrison, "Symbian OS C++ for Mobile Phones vol. 3", Retrieved from: <http://www.amazon.co.uk/Symbian-OS-Mobile-Phones-Press/dp/productdescription/0470066415> on Oct. 23, 2008, Symbian Press, Jun. 16, 2003, 4 pages.

Hickey, "Google Android has Landed; T-Mobile, HTC Unveil G1", Retrieved from: <http://www.crn.com/retail/210603348> on Nov. 26, 2008., Sep. 23, 2008, 4 pages.

Hollister, "Windows 8 Primer: How to Navigate Microsoft's New Operating System", retrieved from <http://www.theverge.com/2012/10/28/3562172/windows-8-gestures-keyboard-shortcuts-tips-tricks-how-to-guide> on Aug. 7, 2014, Oct. 28, 2012, 30 pages.

Horowitz, "Installing and Tweaking Process Explorer part 2", Retrieved from <http://web.archive.org/web/20110510093838/http://blogs.computerworld.com/16165/installing_and_tweaking_process_explorer_part_2> on Mar. 12, 2013, May 23, 2010, 7 pages.

Janecek, et al.,' "An Evaluation of Semantic Fisheye Views for Opportunistic Search in an Annotated Image Collection", Available at <http://citeseerx.ist.psu.edu/viewdoc/download?doi=10.1.1.67.3084&rep=rep1&type=pdf>, Feb. 15, 2005, pp. 1-15.

Johnson, "Samsung Galaxy Tab Pro 10.1 Review", Retrieved From: <http://hothardware.com/Reviews/Samsung-Galaxy-Tab-Pro-101-Review/?page=3#!baG2DY > Jul. 9, 2014, Mar. 21, 2014, 10 Pages.

Kandogan, et al.,' "Elastic Windows: Improved Spatial Layout and Rapid Multiple Window Operations", In Proceedings of the Workshop on Advanced Visual Interfaces, May 27, 1996, 10 Pages.

Kcholi, "Windows CE .NET Interprocess Communication", Retrieved from http://msdn.microsoft.com/en-us/library/ms836784.aspx on Jul. 17, 2008., Jan. 2004, 15 Pages.

Keranen, "OpenGL-based User Interface Toolkit for Symbian Mobile Devices", Master of Science Thesis, Tamere University of Technology, Department of Information Technology, Apr. 6, 2005, 88 pages.

Kishore, "Split or Divide Your Desktop Screen into Multiple Parts", retrieved from <http://www.online-tech-tips.com/free-software-downloads/split-or-divide-your-desktop-screen-into-multiple-parts/> on Jul. 7, 2014, Oct. 18, 2008, 7 pages.

Kurdi, "Acer GridVista: snap your windows to pre-defined sections on your screen(s)", Retrieved from <http://www.freewaregenius.com/acer-gridvista-snap-your-windows-to-pre-defined-sections-of-your-screens/> on Jun. 30, 2013, Jan. 19, 2010, 6 pages.

Kurdi, "WinSplit Revolution", Retrieved from <http://www.freewaregenius.com/winsplit-revolution/> on Jun. 30, 2013, Aug. 22, 2007, 4 Pages.

La, "Parallax Gallery", Available at <http://webdesignerwall.comtutorials/parallax-gallery/comment-page-1>, Apr. 25, 2008, 16 pages.

Livingston, et al.,' "Windows 95 Secrets", 1995, I DG Books Worldwide, 3rd Edition, 1995, pp. 121-127.

Long, "Gmail Manager 0.6", Retrieved from: <https://addons.mozilla.org/en-US/firefox/addon/1320/> on Sep. 29, 2010, Jan. 27, 2010, 4 pages.

Mann, et al.,' "Spectrum Analysis of Motion Parallax in a 3D Cluttered Scene and Application to Egomotion", Journal of the Optical Society of America A, vol. 22, No. 9—Available at <http://www.cs.uwaterloo.ca/~mannr/snow/josa-mann-langer.pdf>, Sep. 2005, pp. 1717-1731.

Mantia, "Multitasking: What Does It Mean?", retrieved from <http://mantia.me/blog/multitasking/> on Sep. 23, 2011, 3 pages.

Mao, "Comments of Verizon Wireless Messaging Services, LLC", Retrieved from: http://www.ntia.doc.gov/osmhome/warnings/comments/verizon.htm on May 6, 2009., Aug. 18, 2000, 5 Pages.

Marie, "MacBook Trackpad Four Fingers Swipe Left/Right to Switch Applications", MacBook Junkie—retrieved from <http://www.macbookjunkie.com/macbook-trackpad-four-fingers-swipe-left-right-to-switch-applications/> on May 11, 2011, Nov. 13, 2010, 4 pages.

(56) References Cited

OTHER PUBLICATIONS

Mei, et al.,' "Probabilistic Multimodality Fusion for Event Based Home Photo Clustering", Retrieved from: <http://ieeexplore.ieee.org//stamp/stamp.jsp?tp=&arnumber=04036960.>, Dec. 26, 2006, pp. 1757-1760.

Muller, "MultiSplitPane: Splitting without Nesting", Java.net, retrieved from <http://today.java.net/pub/a/today/2006/03/23/multi-split-pane.html> on Mar. 23, 2006, Mar. 23, 2006, 6 pages.

Nordgren, "Development of a Touch Screen Interface for Scania Interactor", Master's Thesis in C—Available at <http://www.cs.umu.se/education/examina/Rapporter/PederNordgren.pdf>omputing Science, UMEA University, Apr. 10, 2007, pp. 1-59.

Oliver, "Potential iPhone Usability and Interface Improvements", Retrieved from: <http://www.appleinsider.com/articles/08/09/18/potential_iphone_usability_and_interface_improvements.html> on Nov. 12, 2008, AppleInsider,Sep. 18, 2008, 4 pages.

O'Reilly, "How to Use the Microsoft Surface Touch Screen and Keyboard", Retrieved From: <http://www.cnet.com/how-to/how-to-use-the-microsoft-surface-touch-screen-and-keyboard/> Jul. 5, 2014, Nov. 6, 2012, 5 Pages.

Oryl, "Review: Asus P527 Smartphone for North America", Retrieved from: <http://www.mobileburn.com/review.jsp?Id=4257> on Dec. 17, 2008., Mar. 5, 2008, 1 Page.

Padilla, "Palm Treo 750 Cell Phone Review—Hardware", Retrieved from: <http://www.wirelessinfo.com/content/palm-Treo-750-Cell-Phone-Review/Hardware.htm> on Dec. 11, 2008., Mar. 17, 2007, 4 Pages.

Paul, "Hands-on: KDE 4.5 Launches with Tiling, New Notifications", Retrieved from: <http://arstechnica.com/open-source/reviews/2010/08/hands-on-kde-45-launches-with-tiling-new-notifications.ars> on Sep. 29, 2010, Aug. 2010, 3 pages.

Paul, "Three Windows Multitasking Features That Help Maximize Your Screen Space", Retrieved From: <http://www.pcworld.com/article/2094124/three-windows-multitasking-features-that-help-maximize-your-screen-space.html> Jul. 4, 2014, Feb. 4, 2014, 4 Pages.

Perry, "Teach Yourself Windows 95 in 24 Hours", 1997, Sams Publishing, 2nd Edition, 1997, pp. 193-198.

Raghaven, et al.,' "Model Based Estimation and Verification of Mobile Device Performance", Available at http://alumni.cs.ucsb.edu/~raimisl/emsoft04_12.pdf., Sep. 27-29, 2004, 10 Pages.

Ray, "Microsoft Re-Tiles Mobile Platform for Windows 7 Era", retrieved from <http://www.theregister.co.uk/2010/02/15/windows_phone_7_series/> on May 11, 2011, Feb. 15, 2010, 2 pages.

Reed, "Microsoft Demos Windows Mobile 6.1 at CTIA", Retrieved from: <http://www.networkworld.com/news/2008/040208-ctia-microsoft-windows-mobile.html> on Jul. 18, 2008, Apr. 2, 2008, 1 page.

Remond, "Mobile Marketing Solutions", Retrieved from: <http://www.mobilemarketingmagazine.co.uk/mobile_social_networking/> on May 5, 2009., Apr. 28, 2009, 16 Pages.

Rice, et al.,' "A System for Searching Sound Palettes", Proceedings of the Eleventh Biennial Symposium on Arts and Technology,, Available at <http://www.comparisonics.com/FindSoundsPalettePaper.pdf>,Feb. 2008, 6 pages.

Ritchie, "iOS 4 features: iPod touch Wi-Fi stays connected when asleep—iPhone too?", Retrieved from: <http://www.goip.com/2010/06/ios-4-features-ipod-touch-wi-fi-stays-connected-when-asleep-%E2%80%94-iphone-too/> on Sep. 30, 2010, Jun. 14, 2010, 2 pages.

Ritscher, "Using Surface APIs in your WPF application—Part 1", Retrieved from: <http://blog.wpfwonderland.com/2009/06/30/using-surface-apis-in-your-wpf-application/> on Sep. 28, 2010, Jun. 30, 2009, 7 pages.

Roberts, "Touching and Gesturing on the iPhone", Available at <http://www.sitepen.com/blog/2008/07/10/touching-and-gesturing-on-the-iphone/comments-pare-1>, Jul. 10, 2008, 16 pages.

Sandoval, "A development platform and execution environment for mobile applications", Universidad Autónoma de Baja California, School of Chemical Sciences and Engineering, Available at <http://citeseerx.ist.psu.edu/viewdoc/download?doi=10.1.1.86.7989&rep=rep1&type=pdf>,2004, 18 pages.

Singh, et al.,' "CINEMA: Columbia InterNet Extensible Multimedia Architecture", Available at <http://www1.cs.columbia.edu/~library/TR-repository/reports/reports-2002/cucs-011-02.pdf>, Sep. 3, 2002, 83 Pages.

Smith, et al.,' "GroupBar: The TaskBar Evolved", Proceedings of OZCHI 2003—Available at <http://research.microsoft.com/pubs/64316/ozchi2003-groupbar.pdf>, Nov. 2003, pp. 1-10.

Steinicke, et al.,' "Multi-Touching 3D Data: Towards Direct Interaction in Stereoscopic Display Environments coupled with Mobile Devices", Advanced Visual Interfaces (AVI) Workshop on Designing Multi-Touch Interaction Techniques for Coupled Public, Available at <http://viscg.uni-muenster.de/publications/2008/SHSK08/ppd-workshop.-pdf.>,Jun. 15, 2008, 4 Pages.

Suror, "PocketShield—New Screenlock App for the HTC Diamond and Pro", Retrieved from: <http://wmpoweruser.com/?tag=htc-touch-diamond> on Jun. 28, 2011, Oct. 23, 2008, 2 pages.

Terpstra, "Beta Beat: Grape, a New Way to Manage Your Desktop Clutter", Retrieved from: Beta Beat: Grape, a New Way to Manage Your Desktop Clutter on Jun. 28, 2011, Apr. 14, 2009, 4 pages.

Vallerio, et al.,' "Energy-Efficient Graphical User Interface Design", Retrieved from: <http://www.cc.gatech.edu/classes/AY2007/cs7470_fall/zhong-energy-efficient-user-interface.pdf>, Jun. 10, 2004, pp. 1-13.

Vermeulen, "BlackBerry PlayBook Hands-on", retrieved from <http://mybroadband.co.za/news/gadgets/20104-BlackBerry-PlayBook-hands-.html> on May 11, 2011, May 8, 2011, 4 pages.

Viticci, "Growl 1.3 to Be Released on Mac App Store, Introduce Lion Support and Drop GrowlMail Support", Retrieved from: <http://www.macstories.net/stories/growl-1-3-to-be-released-on-mac-app-store-introduce-lion-support-and-drop-growlmail-support/> on Jul. 22, 2011, Jul. 6, 2011, 6 pages.

Vornberger, "Bluetile", Retrieved from: <http://www.bluetile.org> on Sep. 29, 2010, 5 pages.

Wilson, "How the iPhone Works", Retrieved from: <http://electronics.howstuffworks.com/iphone2.htm> on Apr. 24, 2009, Jan. 2007, 9 pages.

Wilson, "Robust Computer Vision-Based Detection of Pinching for One and Two-Handed Gesture Input", In Proceedings of UIST 2006—Available at <http://research.microsoft.com/en-us/um/people/awilson/publications/wilsonuist2006/uist%202006%20taffi.pdf>, Oct. 2006, 4 pages.

Wobbrock, et al.,' "User-Defined Gestures for Surface Computing", CHI 2009, Apr. 4-9, 2009, Boston, MA—available at <http://faculty.washington.edu/wobbrock/pubs/chi-09.2.pdf>, Apr. 4, 2009, 10 pages.

Wu, et al.,' "Achieving a Superior Ownership Experience in Manageability and Quality for Siebel CRM", available at <http://www.oracle.com/us/products/enterprise-manager/superior-exp-for-siebel-crm-068962.pdf>, Aug. 2008, 25 pages.

Wyatt, "/Flash/the art of parallax scrolling", .net Magazine, Aug. 1, 2007, pp. 74-76.

Yang, et al.,' "Semantic Photo Album Based on MPEG-4 Compatible Application Format", Retrieved from: <http://ieeexplore.ieee.org/stamp/stamp.jsp?arnumber=04146254.>, 2007, 2 Pages.

"Advisory Action", U.S. Appl. No. 14/448,913, dated Jun. 14, 2017, 3 pages.

"Corrected Notice of Allowance", U.S. Appl. No. 14/460,985, dated Aug. 15, 2017, 2 pages.

"Non-Final Office Action", U.S. Appl. No. 14/447,446, dated Jun. 9, 2017, 15 pages.

"Non-Final Office Action", U.S. Appl. No. 14/448,975, dated Jul. 28, 2017, 17 pages.

"Non-Final Office Action", U.S. Appl. No. 14/800,391, dated Aug. 16, 2017, 14 pages.

"Notice of Allowance", U.S. Appl. No. 14/448,913, dated Aug. 9, 2017, 10 pages.

"Notice of Allowance", U.S. Appl. No. 14/460,985, dated May 25, 2017, 8 pages.

(56) References Cited

OTHER PUBLICATIONS

"Examiner's Answer to Appeal Brief", U.S. Appl. No. 14/447,419, dated Feb. 27, 2017, 8 pages.
"Final Office Action", U.S. Appl. No. 14/447,109, dated May 8, 2017, 13 pages.
"Final Office Action", U.S. Appl. No. 14/448,911, dated Mar. 7, 2017, 28 pages.
"Final Office Action", U.S. Appl. No. 14/448,913, dated Feb. 9, 2017, 25 pages.
"Final Office Action", U.S. Appl. No. 14/448,946, dated Feb. 24, 2017, 25 pages.
"Foreign Notice of Allowance", AU Application No. 2011369365, dated Jan. 25, 2017, 3 pages.
"Foreign Office Action", IL Application No. 229621, dated Feb. 20, 2017, 6 pages.
"Final Office Action", U.S. Appl. No. 14/448,975, dated Dec. 19, 2017, 16 pages.
"Non-Final Office Action", U.S. Appl. No. 14/448,946, dated Jan. 9, 2018, 21 pages.
"Non-Final Office Action", U.S. Appl. No. 14/448,911, dated Jan. 19, 2018, 27 pages.
"Corrected Notice of Allowance", U.S. Appl. No. 14/460,985, dated Sep. 8, 2017, 2 pages.
"Foreign Office Action", CA Application No. 2,836,263, dated Aug. 28, 2017, 4 pages.
"Foreign Office Action", KR Application No. 10-2013-7031528, dated Sep. 13, 2017, 13 pages.
"Foreign Office Action", MY Application No. PI2013702227, dated Jul. 31, 2017, 3 pages.
"Non-Final Office Action", U.S. Appl. No. 14/447,109, dated Oct. 25, 2017, 18 pages.
"Non-Final Office Action", U.S. Appl. No. 14/448,975, dated May 30, 2018, 20 pages.
"Final Office Action", U.S. Appl. No. 14/448,946, dated Apr. 23, 2018, 23 pages.
"Final Office Action", U.S. Appl. No. 14/448,911, dated Jun. 18, 2018, 31 pages.
Chirgwin, Richard, "Researchers Propose 'overclock' Scheme for Mobiles—Processing at a Sprint to Overcome Tech Limitations", Retrieved From: https://web.archive.org/web/20160314160328/http://www.theregister.co.uk/2012/02/21/sprint_processing_for_smartphones/, Feb. 21, 2012, 2 Pages.
Coldewey, Devin, "Researchers Propose Computational Sprinting" to Speed up Chips by 1000%- but Only for a Second, Retrieved from https://web.archive.org/web/20160527204642/http://techcrunch.com:80/2012/02/29/researchers-propose-computational-sprinting-to-speed-up-chips-by-1000-but-only-for-a-second/, Feb. 29, 2012, 2 Pages.
Deagazio, David, "Selecting Display Backlighting for Portable, Handheld Devices", Retrieved From http://www.electronicproducts.com/Optoelectronics/Hardware_and_Accessories/Selecting_display_backlighting_for_portable_handheld_devices.aspx, Feb. 1, 2008, 4 Pages.
Eadicicco, Lisa, "First Transparent Tablet Lets You Touch From Both Sides", Retrieved From: https://web.archive.org/web/20131227011158/http://blog.laptopmag.com/first-transoarent-tablet, Dec. 26, 2013, 4 Pages.
Elnaka, et al., "Real-Time Traffic Classification for Unified Communication Networks", In Proceedings of International Conference on Selected Topics in Mobile and Wireless Networking, Aug. 19, 2013, 6 Pages.
Grabarnik, et al., "Concave Diffraction Gratings Fabricated With Planar Lithography", In Proceedings of the SPIE, vol. 6992, Micro-Optics, May 14, 2008, 8 Pages.
Greenemeier, Larry, "Could Computational Sprinting" Speed up Smart Phones without Buring Them Out?, Retrieved From: https://web.archive.org/web/20140719144629/http://www.scientificamerican.com/article/computational-sprinting/, Feb. 29, 2012, 2 Pages.

Han, et al., "Accurate Diffraction Efficiency Control for Multiplexed Volume Holographic Gratings", In Journal of the Optical Engineering, vol. 41, Issue 11, Nov. 1, 2002, 4 Pages.
Jacques, et al., "Polarized Light Imaging of Tissue", In Book of Lasers and Current Optical Techniques in Biology vol. 4, Chapter 19, 2004, 17 Pages.
Jaworski, et al., "A Novel Design of Heart Sink with PCM for Electronics Cooling", In Proceedings of the 10th International Conference on Thermal Energy Storage, vol. 31, May 31, 2006, 8 Pages.
Karp, et al., "Planar Micro-optic Solar Concentration using Multiple Imaging Lenses into a Common Slab Waveguide", In Proceedings of International Society for Optics and Photonic SPIE Solar Energy+ Technology, Aug. 20, 2009, 11 Pages.
Kim, et al., "Determination of small angular displacement by moire fringes of matched radialparallel gratings", In Proceedings of Applied Optics, vol. 36, No. 13, May 1, 1997, 8 Pages.
Kress, et al., "Exit Pupil for Wearable See-Through Displays", In Proceedings of the Photonic Applications for Aerospace, Transportation, and Harsh Environment III, SPIE, vol. 8368, May 10, 2012, 8 Pages.
Krishnan, et al., "A Novel Hybrid Heat Sink Using Phase Change Materials for Transient Thermal Management of Electronics", In Proceedings of the IEEE Transactions on Components and Packaging Technologies, vol. 28, Issue 2, Jun. 2005, 9 pages.
Large, et al., "Parallel Optics in Waveguide Displays: A Flat Panel Autostereoscopic Display", In Journal of the Display Technology, vol. 6, Issue 10, Oct. 1, 2010, 7 Pages.
Lerner, Evan, "Penn Helps Rethink Smartphone Design With Computational Sprinting", In Proceedings of the Penn News Release, Feb. 28, 2012, 2 Pages.
Levola, T, "Diffractive Optics for Virtual Reality Displays", In Journal of the Society for Information Display, vol. 14, Issue 5, Jan. 1, 2006, 9 pages.
Li, et al., "Switchable Electro-optic Diffractive Lens with High Efficiency for Ophthalmic Applications", In Proceedings of the National Academy of Sciences, vol. 103, Issue 16, Apr. 18, 2006, 4 Pages.
Lindau, Sten, "Controlling the Groove Depth of Holographic Gratings", In Proceedings of the Optical System Design, Analysis, and Production, vol. 0399, Oct. 26, 1983, 2 Pages.
Li, et al., "Design Optimization of Reflective Polarizers for LCD Backlight Recycling", In Journal of Display Technology, vol. 5, Issue 8, Aug. 1, 2009, 6 Pages.
Li, et al., "QRON: QoS-Aware Routing in Overlay Networks", In Proceedings of IEEE Journal on Selected Areas in Communications, vol. 22, No. 1, Jan. 2004, 12 Pages.
Man, et al., "IT Equipment Noise Emission Standards: Overview of New Development in the Next Edition of ISO/ECMA Standards", In Proceedings of the 37th International Congress and Exposition on Noise Control Engineering, vol. 2008, Issue 3, Oct. 26, 2008, 8 Pages.
Massenot, et al., "Multiplexed Holographic Transmission Gratings Recorded in Holographic Polymer-Dispersed Liquid Crystals: Static and Dynamic Studies", In Journal of Applied Optics, vol. 44, Issue 25, Sep. 1, 2005, 8 Pages.
McMillan, Robert, "Your Future iPhone May Be Stuffed With Wax", Retrieved From: https://web.archive.org/web/20140424175005/https://www.wired.com/2013/08/sprinting/, Aug. 23, 2013, 3 Pages.
Melcher, R, L., "LCoS for High Performance Displays", In Proceedings of the 16th Annual Meeting of the IEEE Lasers and Electro-Optics Society, vol. 2, Oct. 27, 2003, 2 Pages.
Minier, et al., "Diffraction Characteristics of Superimposed Holographic Gratings in Planar Optical Waveguides", In Proceedings of the IEEE Photonics Technology Letters, vol. 4, Issue 10, Oct. 1, 1992, 4 Pages.
Moore, Nicole Casal., "Computational Sprinting Pushes Smartphones Till They're Tired", In Michigan News Release, Feb. 28, 2012, 2 Pages.
Nguyen, et al., "Advanced Cooling System Using Miniature Heat Pipes in Mobile PC", In Proceedings of IEEE Transactions on Components and Packaging Technology, vol. 23, Issue 1, Mar. 1, 2000, 5 Pages.

(56) References Cited

OTHER PUBLICATIONS

Owano, Nancy, "Study Explores Computing Bursts for Smartphones", In Proceedings of the 18th Symposium on High Performance Computer Architecture (HPCA), Feb. 21, 2012, 2 Pages.
Patrizio, Andy, "Researchers Working on Ways to Put 16-Core Processors in Smartphones", Retrieved From: https://web.archive.org/web/20150711030453/http://www.brighthand.com/news/researchers-working-on-ways-to-put-16-core-processors-in-smartphones/, Mar. 18, 2012, 2 Pages.
"International Search Report and Written Opinion Issued in PCT Application No. PCT/US2012/069330", dated Mar. 28, 2013, 9 Pages.
"International Search Report and Written Opinion Issued in PCT Patent Application No. PCT/US2012/069331", dated Mar. 29, 2013, 10 Pages.
"International Search Report and Written Opinion Issued in PCT Application No. PCT/US2012/071563", dated Apr. 25, 2013, 13 Pages.
"International Search Report and Written Opinion Issued in PCT Application No. PCT/US2013/021783", dated May 15, 2013, 9 Pages.
"International Search Report and Written Opinion Issued in PCT Application No. PCT/US2013/021784", dated Apr. 30, 2013, 9 Pages.
"International Search Report and Written Opinion Issued in PCT Application No. PCT/US2013/026200", dated Jun. 3, 2013, 9 Pages.
"International Search Report and Written Opinion Issued in PCT Application No. PCT/US2013/028477", dated Jun. 21, 2013, 11 Pages.
"International Search Report and Written Opinion Issued in PCT Application No. PCT/US2013/030632", dated Jun. 26, 2013, 10 Pages.
"International Search Report and Written Opinion Issued in PCT Application No. PCT/US2013/031111", dated Jun. 26, 2013, 11 Pages.
"International Search Report & Written Opinion Issued in PCT Application No. PCT/US2013/050583", dated Oct. 18, 2013, 8 Pages.
"International Search Report and Written Opinion Issued in PCT Application No. PCT/US2013/053676", dated Oct. 16, 2013, 10 Pages.
"International Search Report and Written Opinion Issued for PCT Patent Application No. PCT/US2013/061225", dated Jun. 4, 2014, 12 Pages.
"Second Written Opinion Issued in PCT Application No. PCT/US2013/061225", dated Oct. 10, 2014, 6 Pages.
"International Search Report & Written Opinion Issued in PCT Application No. PCT/US2013/076832", dated Mar. 17, 2014, 12 Pages.
"International Search Report and Written Opinion Issued in PCT Appiication No. PCT/US2015/043892", dated Feb. 11, 2016, 18 Pages.
"Second Written Opinion Issued in PCT Application No. PCT/US2016/015496", dated Feb. 9, 2017, 6 Pages.
"Second Written Opinion Issued in PCT Application No. PCT/US2015/043892", dated Jul. 4, 2016, 7 Pages.
"International Preliminary Report on Patentability Issued in PCT Application No. PCT/US2016/015496", dated May 4, 2017, 9 Pages.
"International Search Report and Written Opinion Issued in PCT Application No. PCT/US2016/015496", dated Apr. 11, 2016, 11 Pages.
"Final Office Action Issued in U.S. Appl. No. 13/525,649", dated Oct. 9, 2014, 9 Pages.
"Non-Final Office Action Issued in U.S. Appl. No. 13/525,649", dated Jan. 29, 2014, 7 Pages.
"Non-Final Office Action Issued in U.S. Appl. No. 13/525,649", dated Jun. 5, 2014, 7 Pages.
"Non-Final Office Action Issued in U.S. Appl. No. 13/525,649", dated Feb. 5, 2015, 8 Pages.
"Non-Final Office Action Issued in U.S. Appl. No. 13/570,073", dated Jan. 23, 2015, 9 Pages.
"Non-Final Office Action Issued in U.S. Appl. No. 13/631,308", dated Feb. 23, 2015, 10 Pages.
"Non-Final Office Action Issued in U.S. Appl. No. 13/722,917", dated May 21, 2015, 13 Pages.
"Final Office Action Issued in U.S. Appl. No. 13/774,875", dated Apr. 22, 2016, 11 Pages.
"Office Action Issued in European Patent Application No. 13769961.7", dated Jun. 30, 2015, 6 Pages.
"Office Action Issued in European Patent Application No. 13769961.7", dated Mar. 11, 2015, 8 Pages.
"Supplementary Search Report Issued in European Patent Application No. 13769961.7", dated Mar. 3, 2015, 3 Pages.
"Final Office Action Issued in U.S. Appl. No. 14/134,993", dated Aug. 20, 2014, 15 Pages.
"Final Office Action Issued in U.S. Appl. No. 14/134,993", dated Jul. 16, 2015, 19 Pages.
"Non-Final Office Action Issued in U.S. Appl. No. 14/134,993", dated Apr. 17, 2014, 35 Pages.
"Non-Final Office Action Issued in U.S. Appl. No. 14/134,993", dated Jan. 22, 2015, 17 Pages.
"Final Office Action Issued in U.S. Appl. No. 14/447,446", dated Dec. 5, 2017, 16 Pages.
"Non Final Office Action Issued in U.S. Appl. No. 14/447,446", dated Mar. 20, 2018, 16 Pages.
"Non Final Office Action Issued in U.S. Appl. No. 14/617,574", dated Feb. 26, 2016, 23 Pages.
"Final Office Action Issued in U.S. Appl. No. 14/617,606", dated Sep. 5, 2017, 15 Pages.
"Final Office Action Issued in U.S. Appl. No. 14/617,606", dated Dec. 27, 2016, 14 Pages.
"Non Final Office Action Issued in U.S. Appl. No. 14/617,606", dated Mar. 27, 2017, 15 Pages.
"Non Final Office Action Issued in U.S. Appl. No. 14/617,606", dated Sep. 9, 2016, 12 Pages.
"Non Final Office Action Issued in U.S. Appl. No. 14/617,606", dated May 23, 2016, 13 Pages.
"Final Office Action Issued in U.S. Appl. No. 14/617,666", dated Nov. 20, 2017, 30 Pages.
"Final Office Action Issued in U.S. Appl. No. 14/617,666", dated Dec. 12, 2016, 29 Pages.
"Non Final Office Action Issued in U.S. Appl. No. 14/617,666", dated Mar. 22, 2017, 23 Pages.
"Non Final Office Action Issued in U.S. Appl. No. 14/617,666", dated Jul. 26, 2016, 21 Pages.
"Final Office Action Issued in U.S. Appl. No. 14/617,683", dated Nov. 28, 2016, 16 Pages.
"Non Final Office Action Issued in U.S. Appl. No. 14/617,683", dated Aug. 3, 2016, 16 Pages.
"Non Final Office Action Issued in U.S. Appl. No. 14/617,633", dated Apr. 21, 2017, 13 Pages.
"Final-Office Action Issued in U.S. Appl. No. 14/617,710", dated Aug. 2, 2016, 20 Pages.
"Non Final Office Action Issued in U.S. Appl. No. 14/617,710", dated Oct. 20, 2017, 24 Pages.
"Non-Final Office Action Issued in U.S. Appl. No. 14/617,710", dated Mar. 2, 2016, 17 Pages.
"Non Final Office Action Issued in U.S. Appl. No. 14/617,769", dated Jan. 12, 2017, 11 Pages.
"Non-Final Office Action Issued in U.S. Appl. No. 14/670,242", dated Jun. 8, 2017, 26 Pages.
"Final Office Avtion Issued in U.S. Appl. No. 14/800,391", dated Dec. 21, 2017, 15 Pages.
"Final Office Action Issued in U.S. Appl. No. 14/448,975", dated Dec. 16, 2016, 22 Pages.
"Non Final Office Action Issued in U.S Appl. No. 15/198,628", dated Apr. 7, 2017, 20 Pages.
"First Office Action and Search Report Issued in Chinese Patent Application No. 201210563730.3", dated Jan. 7, 2015, 16 Pages.

(56) References Cited

OTHER PUBLICATIONS

"First Office Action Issued in Chinese Patent Application No. 201210567932.5", dated Aug. 14, 2014, 12 Pages.
"Office Action Issued in Japanese Patent Application No. 2015-549765", dated Nov. 1, 2017, 7 Pages.
Allen, Steven C., "ELiXIR-Solid-State Luminaire with Enhanced Light Extraction by Internal Reflection", In Journal of Display Technology, vol. 3, Issue 2, Jun. 2007, 5 Pages.
Aron, Jacob, "'Sprinting' Chips Could Push Phones to the Speed Limit", In Proceedings of the New Scientist, Issue 2852, Feb. 20, 2012, 2 Pages.
Baluja, et al., "Non-Intrusive Gaze Tracking Using Artificial Neural Networks", In Journal Advances in Neural Information Processing Systems, Technical Report CMU-CS-94-102, Jan. 5, 1994, pp. 753-760.
Barger, Walt, "COTS Cooling", Retrieved From: https://web.archive.org/web/20151025173626/https://www.empf.org/empfasis/2009/Oct09/cots.html, Oct. 1, 2009, 4 Pages.
Baudisch, et al., "Back-of-Device Interaction Allows Creating Very Small Touch Devices", In Proceedings of the SIGCHI 27th International Conference on Human Factors in Computing Systems, Apr. 4, 2009, 10 Pages.
Berger, et al., "Photonic Band Gaps and Holography", In Journal of Applied Physics, vol. 82, Issue 1, Jul. 1, 1997, 6 Pages.
Brar, et al., "Laser-Based Head-Tracked 3D Display Research", In Journal of Display Technology, vol. 6, Issue 10, Oct. 1, 2010, 13 Pages.
Chen, et al., "Strategies for 3D Video With Wide Fields-of-View", In Proceedings of the IEEE Optoelectronics, vol. 148, Issue 2, Apr. 1, 2001, 6 Pages.
Cheng, et al,, "Waveguide Displays Based on Polymer-Dispersed Liquid Crystals", In SPIE Newsroom, Aug. 12, 2011, 2 Pages.
"BragGrate Mirror", Retrieved From: https://web.archive.org/web/20090814104232/http://www.optigrate.com/BragGrate_Mirror.html, Jul. 8, 2014, 2 Pages.
"DigiLens", Retrieved From: http://web.archive.org/web/20120619040109/http://www.digilens.com/products.html, Jun. 19, 2012, 1 Page.
"HDTV Helmet Mounted Display", Retrieved From: http://web.archive.org/web/20150405163729/http://www.defense-update.com/products/h/HDTV-HMD.htm, Jan. 26, 2005, 1 Page.
"Light Guide Techniques Using LED Lamps", Retrieved From: http://www-eng.lbl.gov/~shuman/XENON/REFERENCES&OTHER_MISC/Lightpipe%20design.pdf, Dec. 7, 2001, 22 Pages.
"Two-Faced: Transparent Phone With Dual Touch Screens", Retrieved From: http://web.archive.org/web/20170614133819/http://gajitz.com/two-faced-transparent-phone-with-dual-touch-screens/, Jun. 2012, 3 Pages.
"Variable Groove Depth (VGD) Master Gratings", Retrieved From: http://www.horiba.com/scientific/products/diffraction-gratings/catalog/variable-groove-depth-vgd/, May 28, 2014, 2 Pages.
"Final Office Action Issued in U.S. Appl. No. 13/336,873", dated Jan. 5, 2015, 21 Pages.
"Non-Final Office Action Issued in U.S. Appl. No. 13/336,873", dated Jul. 25, 2014, 17 Pages.
"Non-Final Office Action Issued in U.S. Appl. No. 13/336,873", dated Apr. 9, 2015, 19 Pages.
"Final Office Action Issued in U.S. Appl. No. 13/336,895", dated May 27, 2014, 12 Pages.
"Non-Final Office Action Issued in U.S. Appl. No. 13/336,895", dated Oct. 24, 2013, 9 Pages.
"Non-Final Office Action Issued in U.S. Appl. No. 13/343,675", dated Jul. 16, 2013, 10 Pages.
"Final Office Action Issued in U.S. Appl. No. 13/355,836", dated Mar. 10, 2014, 19 Pages.
"Non-Final Office Action Issued in U.S. Appl. No. 13/355,836", dated Nov. 4, 2013, 17 Pages.
"Final Office Action Issued in U.S. Appl. No. 13/355,914", dated Feb. 23, 2015, 21 Pages.
"Final Office Action Issued in U.S. Appl. No. 13/355,914", dated Jun. 19, 2014, 12 Pages.
"Non-Final Office Action Issued in U.S. Appl. No. 13/355,914", dated Feb. 14, 2014, 11 Pages.
"Non-Final Office Action Issued in U.S. Appl. No. 13/355,914", dated Oct. 28, 2014, 19 Pages.
"Final Office Action Issued in U.S. Appl. No. 13/397,495", dated May 29, 2014, 11 Pages.
"Non-Final Office Action Issued in U.S. Appl. No. 13/397,495", dated Nov. 13, 2013, 9 Pages.
"Non-Final Office Action Issued in U.S. Appl. No. 13/397,495", dated Apr. 3, 2015, 11 Pages.
"Final Office Action Issued in U.S. Appl. No. 13/397,516", dated Jan. 29, 2015, 13 Pages.
"Non Final Office Action Issued in U.S. Appl. No. 13/397,516", dated Nov. 25, 2013, 11 Pages.
"Non Final Office Action Issued in U.S. Appl. No. 13/397,516", dated Jun. 12, 2014, 11 Pages.
"Final Office Action Issued in U.S. Appl. No. 13/397,539", dated Jun. 29, 2015, 11 Pages.
"Non-Final Office Action Issued in U.S. Appl. No. 13/397,539", dated Mar. 16, 2015, 10 Pages.
"Non Final Office Action Issued in U.S. Appl. No. 13/397,617", dated May 5, 2015, 6 Pages.
"Non-Final Office Action Issued in U.S. Appl. No. 13/397,617", dated Oct. 9, 2014, 8 Pages.
"Final Office Action Issued in U.S. Appl. No. 13/428,879", dated Jul. 14, 2014, 13 Pages.
"Non Final Office Action Issued in U.S. Appl. No. 13/428,879", dated Jun. 26, 2015, 14 Pages.
"Non-Final Office Action Issued in U.S. Appl. No. 13/428,879", dated Feb. 24, 2015, 11 Pages.
"Non-Final Office Action Issued in U.S. Appl. No. 13/428,879", dated Mar. 17, 2014, 11 Pages.
"Final Office Action Issued in U.S Appl. No. 13/432,311", dated Dec. 24, 2014, 26 Pages.
"Final Office Action Issued in U.S. Appl. No. 13/432,311", dated Dec. 15, 2014, 25 Pages.
"Non Final Office Action Issued in U.S. Appl. No. 13/432,311", dated Jun. 2, 2015, 26 Pages.
"Non Final Office Action Issued in U.S. Appl. No. 13/432,311", dated Aug. 17, 2016, 19 Pages.
"Non-Final Office Action Issued in U.S. Appl. No. 13/432,311", dated Jul. 8, 2014, 34 Pages.
"Final Office Action Issued in U.S. Appl. No. 13/432,372", dated Jan. 29, 2015, 34 Pages.
"Non-Final Office Action Issued in U.S. Appl. No. 13/432,372", dated May 9, 2014, 27 Pages.
"Non-Final Office Action Issued in U.S. Appl. No. 13/432,372", dated Oct. 24, 2014, 28 Pages.
"Final Office Action Issued in U.S. Appl. No. 13/440,165", dated Jun. 6, 2014, 13 Pages.
"Final Office Action Issued in U.S. Appl. No. 13/440,165", dated Jul. 21, 2015, 11 Pages.
"Non-Final Office Action Issued in U.S. Appl. No. 13/440,165", dated Feb. 6, 2014, 13 Pages.
"Non-Final Office Action Issued in U.S. Appl. No. 13/440,165", dated Feb. 13, 2015, 10 Pages.
"Non-Final Office Action Issued in U.S. Appl. No. 13/440,165", dated Oct. 16, 2014, 12 Pages.
"Final Office Action Issued in U.S. Appl. No. 13/477,646", dated Feb. 23, 2015, 36 Pages.
"Final Office Action Issued in U.S. Appl. No. 13/477,646", dated May 5, 2014, 26 Pages.
"Non Final Office Action Issued in U.S. Appl. No. 13/477,646", dated Jun. 18, 2015, 44 Pages.
"Non-Final Office Action Issued in U.S. Appl. No. 13/477,646", dated Oct. 6, 2014, 35 Pages.
"Non-Final Office Action Issued in U.S. Appl. No. 13/477,646", dated Nov. 22, 2013, 21 Pages.
"International Search Report and Written Opinion Issued in PCT Appiication No. PCT/US2016/015497", dated May 19, 2016, 16 Pages.

(56) References Cited

OTHER PUBLICATIONS

"International Search Report and Written Opinion Issued in PCT Application No. PCT/US2016/015869", dated May 12, 2016, 12 Pages.
"Second Written Opinion Issued in PCT Application No. PCT/US2016/015869", dated Jan. 20, 2017, 5 Pages.
"International Preliminary Report on Patentability Issued in PCT Application No. PCT/US2016/015871", dated May 15, 2017, 10 Pages.
"International Search Report & Written Opinion Issued in PCT Application No. PCT/US2016/015871", dated Jun. 13, 2016, 12 Pages.
"Second Written Opinion Issued in PCT Application No. PCT/US2016/015871", dated Feb. 6, 2017, 8 Pages.
"International Preliminary Report on Patentability Issued in PCT Application No. PCT/US2016/015873", dated May 15, 2017, 8 Pages.
"International Search Report and Written Opinion Issued in PCT Application No. PCT/US2016/015873", dated May 23, 2016, 11 Pages.
"Second Written Opinion Issued in PCT Application No. PCT/US2016/015873", dated Feb. 6, 2017, 6 Pages.
"International Preliminary Report on Patentability Issued in PCT Application No. PCT/US2016/016027", dated May 3, 2017, 8 Pages.
"International Search Report and Written Opinion Issued in PCT Application No. PCT/US2016/016027", dated May 17, 2016, 12 Pages.
"International Search Report and Written Opinion Issued in PCT Application No. PCT/US2016/016028", dated May 25, 2016, 11 Pages.
"Second Written Opinion Issued in PCT Application No. PCT/US2016/016028", dated Feb. 3, 2017, 5 Pages.
"International Search Report and Written Opinion Issued in PCT Application No. PCT/US2016/016029", dated May 12, 2016, 12 Pages.
"International Preliminary Report on Patentability Issued in PCT Application No. PCT/US2016/016241", dated May 4, 2017, 09 Pages.
"International Search Report and Written Opinion Issued in PCT Application No. PCT/US2016/016241", dated Apr. 20, 2016, 12 Pages.
"Second Written Opinion Issued in PCT Application No. PCT/US2016/016241", dated Feb. 9, 2017, 6 Pages.
"International Search Report and Written Opinion Issued in PCT Application No. PCT/US2016/016242", dated May 27, 2016, 14 Pages.
"International Preliminary Report on Patentability Issued in PCT Patent Application No. PCT/US2016/019006", dated Jun. 6, 2017, 11 Pages.
"International Search Report and Written Opinion Issued in PCT Application No. PCT/US2016/019006", dated May 12, 2016, 14 Pages.
"Second Written Opinion Issued in PCT Application No. PCT/US2016/019006", dated Feb. 20, 2017, 1 Page.
Pu, et al "Exposure Schedule for Multiplexing Holograms in Photopolymer Films", In Journal of the Optical Engineering, vol. 35, Issue 10, Oct. 1, 1996, 6 Pages.
Raghavan, et al., "Computational Sprinting", In Proceedings of the IEEE 18th International Symposium on High-Performance Computer Architecture (HPCA), Feb. 25, 2012, 12 Pages.
Raghavan, et al., "Computational Sprinting on a Hardware/Software Testbed", In Proceedings of the Eighteenth International Conference on Architectural Support for Programming Languages and Operating Systems, vol. 41, Issue 1, Mar. 16, 2013, 12 Pages.
Raghavan, et al., "Designing for Responsiveness With Computational Sprinting", In IEEE Micro Journal, vol. 33, Issue 3, May 2013, 8 Pages.
Scott, et al., "RearType: Text Entry Using Keys on the Back of a Device", In Proceedings of the 12th ACM Conference on Human-Computer Interaction with Mobile Devices and Services, Sep. 7, 2010, 9 pages.
Shane, Baxtor, "TwinTech GeForce GTS 250 XT OC 1GB Graphics Card", Retrieved from https://web.archive.org/web/20090518014045/http://www.tweaktown.com/reviews/2733/twintech_geforce_gts_250_xt_oc_1gb_graphics_card/index3.html, Apr. 24, 2009, 4 Pages.
Stupar, et al., "Optimization of Phase Change Material Heat Sinks for Low Duty Cycle High Peak Load Power Supplies", In Proceedings of the IEEE Transactions on Components, Packaging and Manufacturing Technology, vol. 2, Issue 1, Jan. 1, 2012, 14 Pages.
Tari, et al., "CFD Analyses of a Notebook Computer Thermal Management System and a Proposed Passive Cooling Alternative", In Proceedings of the IEEE Transactions on Components and Packaging Technologies, vol. 33, Issue 2, Jun. 2010, 10 Pages.
Theocaris, P. S.., "Radial Gratings as Moire Gauges", In Journal of Scientific Instruments (Journal of Physics E), Series 2, vol. 1, Jun. 1968, 6 Pages.
Travis, et al., "Collimated Light from a Waveguide for a Display Backlight", In Journal of Optics Express, vol. 17, Issue 22, Oct. 26, 2009, pp. 19714-19719.
Travis, et al., "The Design of Backlights for View-Sequential 3D", Retrieved from: https://www.microsoft.com/en-us/research/publication/design-backlights-view-sequential-3d/, Jun. 21, 2010, 4 Pages.
Van, et al., "A Survey of Augmented Reality Technologies, Applications and Limitations", In Proceedings of the International Virtual Reality, vol. 9, Issue 2, Jun. 1, 2010, 19 Pages.
Walker, Tony, "Thermalright Ultra-120 Extreme CPU Cooler", Retrieved From: https://web.archive.org/web/20091231194530/pro-clockers.com/cooling/66-thermalright-ultra-120-extreme-cpu-cooler.html, Jul. 2, 2009, 7 Pages.
Widnall, S, "Lecture L3-Vectors, Matrices and Coordinate Transformations", 16.07 Dynamics, Lecture Notes based on J. Peraire Version 2.0, 2009, 16 Pages.
Wigdor, et al., "LucidTouch: A See-Through Mobile Device", In Proceedings of the 20th Annual ACM Symposium on User Interface Software and Technology, Oct. 7, 2007, 10 Pages.
Xie, et al., "Fabrication of Varied-Line-Spacing Grating by Elastic Medium", In Proceedings of the SPIE Holography, Diffractive Optics, and Applications II, vol. 5636, Nov. 2004, 4 Pages.
Yan, et al., "Multiplexing Holograms in the Photopolymer With Equal Diffraction Efficiency", In Proceedings of the SPIE Advances in Optical Data Storage Technology, vol. 5643, Jan. 3, 2005, 9 pages.
Zharkova, et al., "Study of the Dynamics of Transmission Gratings Growth on Holographic Polymer-Dispersed Liquid Crystals", In Proceedings of the International Conference on Methods of Aerophysical Research, 2008, 4 Pages.
"Final Office Action Issued in U.S. Appl. No. 14/448,975", dated Nov. 27, 2018, 22 Pages.
"Final Office Action Issued in U.S. Appl. No. 14/447,446", dated Oct. 18, 2018, 15 Pages.
"Non Final Office Action Issued in U.S. Appl. No. 14/448,911", dated Jan. 10, 2019, 29 Pages.

* cited by examiner

ADAPTIVE SIZING AND POSITIONING OF APPLICATION WINDOWS

BACKGROUND

This background is provided for the purpose of generally presenting a context for the instant disclosure. Unless otherwise indicated herein, material described in the background is neither expressly nor impliedly admitted to be prior art to the instant disclosure or the claims that follow.

Conventional operating systems permit users to view multiple computing applications through windows. Each of these windows generally includes a frame or control for selecting which window is primary or to move, size, or otherwise manage placement of the window with respect to a workspace and other windows. These frames or controls, however, often only enable a currently selected window to be moved or sized, which can result in unintended occlusion and overlap between the windows. Additionally, moving or sizing multiple windows often requires a user to perform a series of redundant tasks to iteratively move or size each window as desired. As such, managing the layout of multiple windows in this fashion can be overly complicated, time-consuming, and annoying to users.

SUMMARY

This document describes techniques and apparatuses enabling adaptive sizing and positioning of application windows in a multi-application environment. The multi-application environment described herein presents one or more application windows, which can be sized, positioned, or layered to provide an optimized layout. In some embodiments, these techniques and apparatuses enable a size or position of an application window to be determined based on an edge of another application window. Also, in some embodiments the techniques and apparatuses enable an application window to be sized to a predefined area based on selection of a region of the multi-application environment. Further still, some embodiments enable joint dividers or joint corner controls, which enable multiple application windows to be sized or positioned simultaneously. Further, some embodiments identify available regions of a multi-application environment and enable selection of application windows to present via the available region.

This summary is provided to introduce simplified concepts that are further described below in the Detailed Description. This summary is not intended to identify essential features of the claimed subject matter, nor is it intended for use in determining the scope of the claimed subject matter. Techniques and/or apparatuses enabling adaptive sizing and positioning of application windows are also referred to herein separately or in conjunction as the "techniques" as permitted by the context, though techniques may include or instead represent other aspects described herein.

BRIEF DESCRIPTION OF THE DRAWINGS

Embodiments enabling a multi-application environment are described with reference to the following drawings. The same numbers are used throughout the drawings to reference like features and components.

DETAILED DESCRIPTION

Overview

This document describes techniques and apparatuses enabling adaptive sizing and positioning of application windows. These apparatuses and techniques may enable application windows of a multi-application environment to be conveniently and efficiently positioned or sized to provide optimized layouts of application windows. In some embodiments, these techniques and apparatuses enable a size or position of an application window to be determined based on an edge of another application window. Also, in some embodiments the techniques and apparatuses enable an application window to be sized to a predefined area based on selection of a region of the multi-application environment. Further still, some embodiments enable joint dividers or joint corner controls, which enable multiple application windows to be sized or positioned simultaneously. Further, some embodiments identify available regions of a multi-application environment and enable selection of application windows to present via the available region. These and other forms of application window management are enabled, in some embodiments, through regions or predefined areas of the multi-application environment. These are but a few examples of many ways in which the techniques enable adaptive sizing and positioning of application windows, others of which are described below.

Example System

Figure 1:
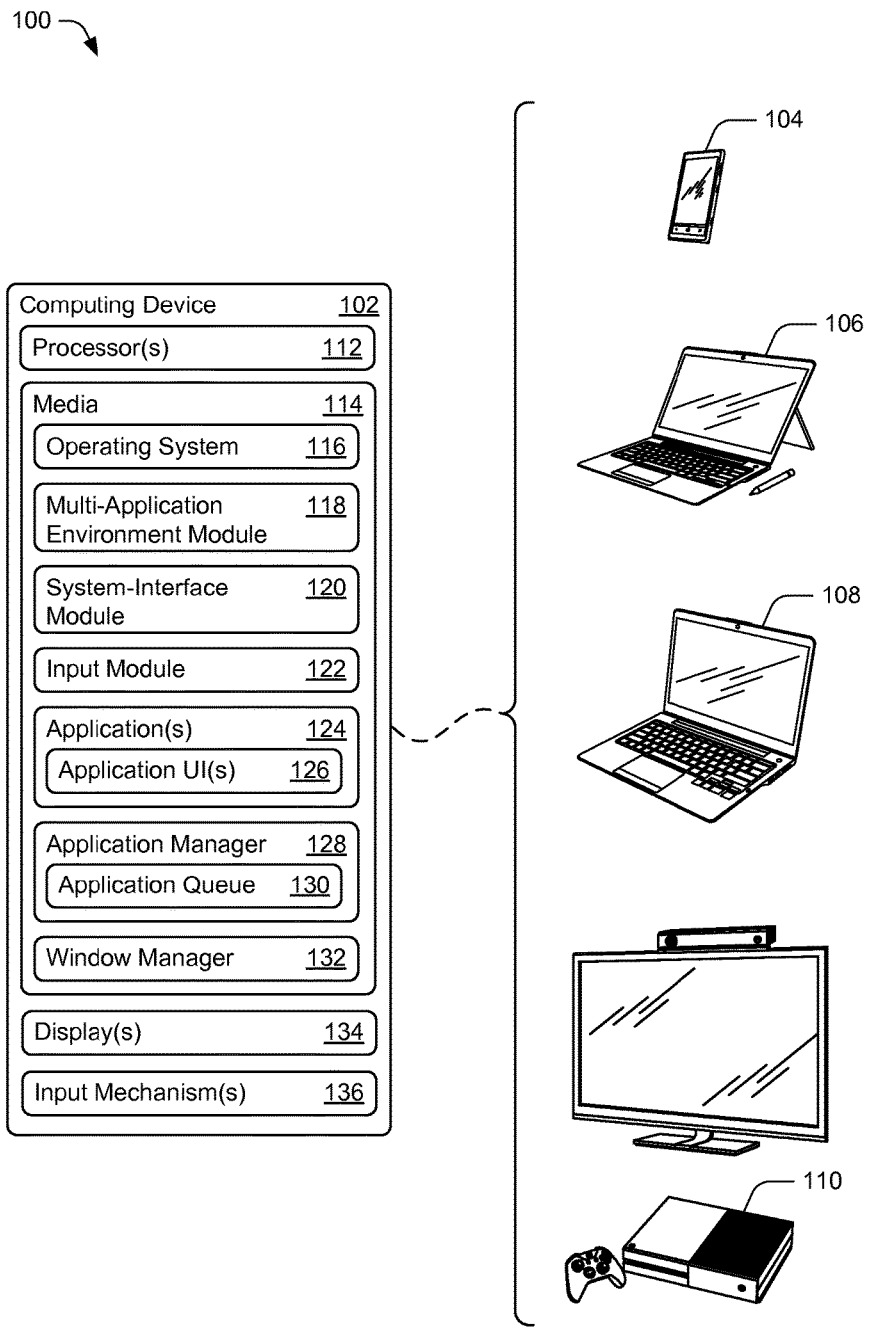
FIG. 1 illustrates an example system in which techniques enabling adaptive sizing and positioning of application windows can be implemented.

FIG. 1 illustrates an example system 100 in which techniques enabling adaptive sizing and positioning of application windows can be embodied. System 100 includes a computing device 102, which is illustrated with four examples: a smart phone computer 104, a tablet computing device 106, a laptop computer 108, and a gaming device 110, though other computing devices and systems, such as set-top boxes, servers, and netbooks, may also be used.

Computing device 102 includes computer processor(s) 112 and computer-readable storage media 114 (media 114). Media 114 includes an operating system 116, multi-application environment module 118, system-interface module 120, input module 122, application(s) 124, each having one or more application user interfaces 126 (application UI(s) 126), application manager 128, which includes or has access to application queue 130, and window manager 132.

Computing device 102 also includes or has access to one or more displays 134 and input mechanisms 136. FIG. 1 illustrates four example displays, which may be separate or integrated with computing device 102. Input mechanisms 142 may include gesture-sensitive sensors and devices, such as touch-based sensors and movement-tracking sensors (e.g., camera-based), as well as mice (free-standing or integral with a keyboard), a stylus, touch pads, accelerometers, and microphones with accompanying voice recognition software, to name a few. Input mechanisms 136 may be separate or integral with displays 134; integral examples include gesture-sensitive displays with integrated touch-sensitive or motion-sensitive sensors.

Operating system 116 manages resources of computing device 102 and may be implemented using any suitable instruction format, such as 64-bit, 32-bit, reduced instruction set computing (RISC), complex instruction set computing (CISC), and the like. In some cases, operating system 116 may enable execution of a module or application having a different instruction format through virtualization. Operating system 116 enables other modules of computing device 102 to access the resources of computing device 102, such as multi-application environment module 118 and applications 124.

Multi-application environment module 118 provides a multi-application environment by which a user may view and interact with one or more of applications 124 through application UIs 126, which are presented via respective application windows. In some cases, the multi-application environment is an overlapping windowing environment or workspace that enables management or manipulation of a position, size, and/or front-to-back ordering (collectively, "placement") of overlapping windows (e.g., the z-ordering of the windows) or non-overlapping windows. The ordering or 'depth' of each application window in a workspace can be maintained via a z-stack of multi-application environment module 118. Typically, primary application or non-occluded application windows reside at the top of the z-stack. Other application windows, such as non-primary or occluded application windows reside at positions deeper in the z-stack. These non-primary application windows may overlap or occlude each other based on their respective positions within the z-stack.

Multi-application environment module 118 may present application UIs 126 through application windows having frames. These frames may provide controls through which to interact with an application and/or controls enabling a user to position and size the window. Alternately or additionally, multi-application environment module 118 may present application UIs 126 through application windows having little or no window frame, and/or without presenting visual controls (e.g., permanent controls on a window frame or in a window obscuring content).

The multi-application environment enabled by multi-application environment module 118 can be, but is not required to be, hosted and/or surfaced without use of a windows-based desktop environment. Thus, in some cases multi-application environment module 118 presents a multi-application environment as an immersive environment and precludes usage of desktop-like displays (e.g., a taskbar). Further still, in some embodiments this multi-application environment is similar to an operating system in that it is not closeable or capable of being un-installed. While not required, in some cases this multi-application environment enables use of all or nearly all of the pixels of a display by applications within the multi-application environment.

System-interface module 120 provides one or more interfaces through which interaction with operating system 116 is enabled, such as an application-launching interface, an application management user interface (application management UI), a start menu, a control panel, or a system tools or options menu, to name just a few. Input module 122 receives input through the application windows, input mechanisms 136, or other controls and affordances of a multi-application environment.

Applications 124 may include any suitable type of application, such as productivity applications, web browsers, media viewers, navigation applications, multimedia editing applications, and the like. Operating system 116 or multi-application environment module 118 may support applications of varying types or instruction sets natively or via virtualization. For example, multi-application environment module 118 may simultaneously present multiple applications 124 of varying types or instruction sets, such as 32-bit, 64-bit, run-time environments (e.g., Java or Silverlight, plug-ins (e.g., Flash), RISC, CISC, run-time-languages, and so on.

Each application 124 includes one or more application UIs 126, which enables viewing or interaction with content of the application. Application UIs 126 may include pre-defined properties or preferences (e.g., default values or settings) for presenting an application 124, such as an aspect ratio, maximum size, minimum size, position, primacy, display orientation, and the like. In at least some embodiments, application programming interfaces (APIs) associated with an application 124 enable access to the properties or preferences of the application 124 or respective application UI 126.

Application manager 128 enables management of applications 124, such as launching, switching, and tracking active applications. In some cases, application manager 128 enables relationships between applications to be established and maintained, such as applications that are frequently launched, positioned, or used within close proximity to each other. Application manager 128 may also have access to, or maintain, application queue 130, which may include active applications, minimized applications, or previously-interacted-with applications. Applications of application queue 130 may be organized in any suitable fashion, such as most-recently-used, most-frequently-used, alphabetically, by application association, or by application grouping.

In at least some embodiments, window manager 132 enables techniques that position or size application windows to provide an optimized layout of application windows in a multi-application environment. Examples of these techniques and layouts of application windows, some of which are presented based on regions of the multi-application environment, are provided below, though they are not exhaustive or intended to limit the techniques described herein.

Any or all of operating system 116, multi-application environment module 118, system-interface module 120, input module 122, application(s) 124, application manager 128, and window manager 132 may be implemented separate from each other or combined or integrated in any suitable form.

Example Methods

Example methods 300, 500, 900, and 1100 address sizing or positioning application windows based on another application window or a region of a multi-application environment, example methods 1400 and 1800 address enabling joint dividers for sizing or positioning application windows, and example methods 2400 and 2600 address presenting an application window in an available area of a multi-application environment.

The methods described herein may be used separately or in combination with each other, in whole or in part. These methods are shown as sets of operations (or acts) performed, such as through one or more entities or modules, and are not necessarily limited to the order shown for performing the operation. For example, the techniques may present an application window in a region of a multi-application environment and automatically present another application window in another region of the multi-application environment. The techniques may also size and position an application window based on a selected region of a multi-application environment, present the sized application window in the selected region, and then establish a joint divider that enables the application window and another application window contacting the application window to be simultaneously resized. Further, the techniques may present an application window in a region of a multi-application environment and then present a prompt of other application windows that are selectable to fill one or more available regions of the multi-application environment.

Figure 2:
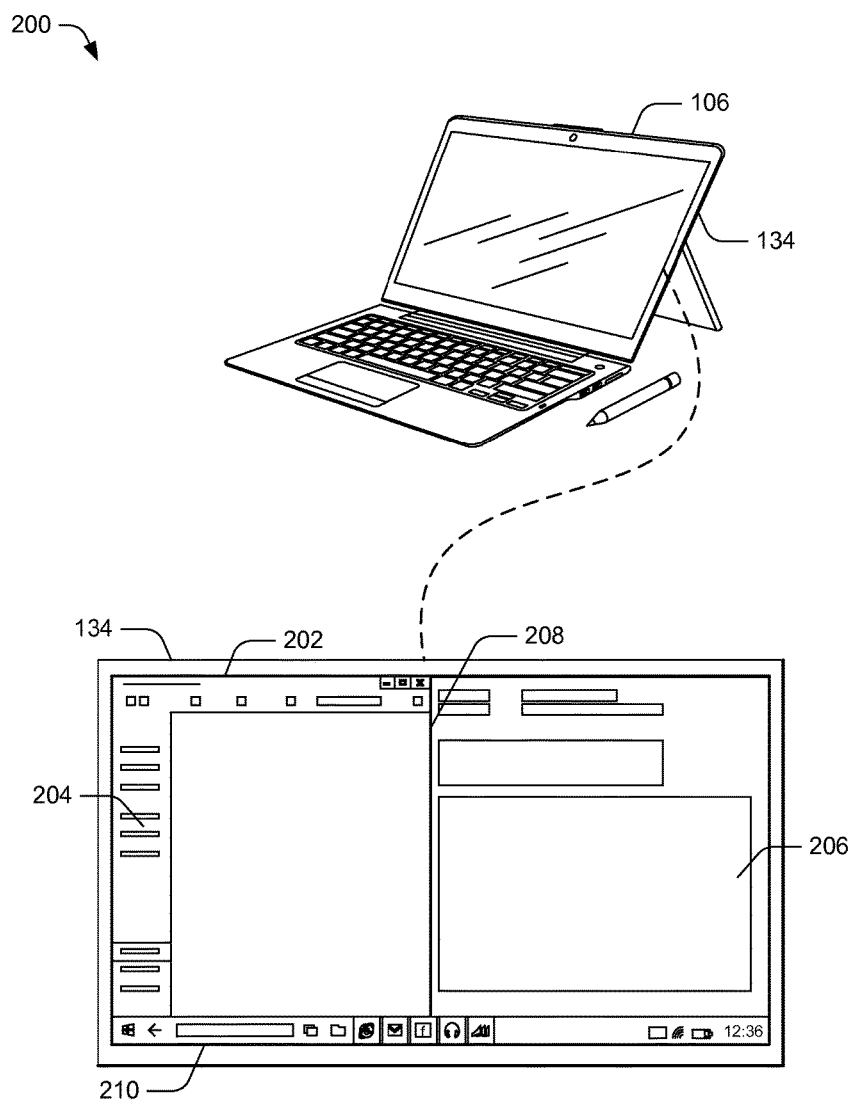
FIG. 2 illustrates an example tablet computing device having a touch-sensitive display presenting an immersive interface.

FIG. 2 illustrates an example operating environment 200 in which the techniques described herein can be performed. In this particular example, tablet computing device 106 presents, via multi-application environment module 118, multi-application environment 202 via display 134. Here, multi-application environment 202, which may also be referred to as a workspace, includes application window 204 and application window 206, each of which occupy approximately half of multi-application environment 202 as shown by application window divider 208.

As noted above, application windows may include controls (e.g., application window 204) that enable the application window to be sized, positioned, minimized, closed, and so on. Alternately, application windows may not include controls (e.g., application window 206), which enables a user interface or content of an application to fully occupy a region or an area of multi-application environment 202. It should be noted that application windows without controls may still be sized, positioned, or otherwise manipulated by engaging an edge or contents of the application window.

Alternately or additionally, multi-application environment 202 may be implemented as a desktop, virtual or otherwise, and include a control area, which is shown as application management UI 210 or a start menu (not shown). For example, when implemented as a desktop, multi-application environment 202 may provide a windows-based workspace in which application windows can be individually moved, sized, or selected as a primary window (e.g. moved to the top of the z-stack).

Multi-application environment 202 may also provide one or more virtual desktops through which different sets of application windows can be presented or accessed. By way of example, a user may configure one virtual desktop with work-based or productivity application windows and another virtual desktop with media consumption application windows. By so doing, the user can interact with two different sets of application windows by switching or pivoting between the two virtual desktops. In some cases, the user may switch an application window from another virtual desktop to a currently selected virtual desktop thereby precluding the need to pivot between the virtual desktops. In at least some embodiments, multi-application environment 202, or a section thereof, fully occupies a screen or visible area of a display. As such, edges of multi-application environment 202 may align with respective edges of the screen or visible area of the display.

Application management UI 210 enables access to features and functions of operating system 116, system-interface module 120, or other applications 124 of computing device 102. For example, application windows can be launched or switched from application management UI 210. Using the techniques herein, application windows can be efficiently added, switched, positioned, sized, or otherwise manipulated in multi-application environment 202 to provide optimized layouts of application windows.

Adaptive Sizing and Positioning of Application Windows

Figure 3:
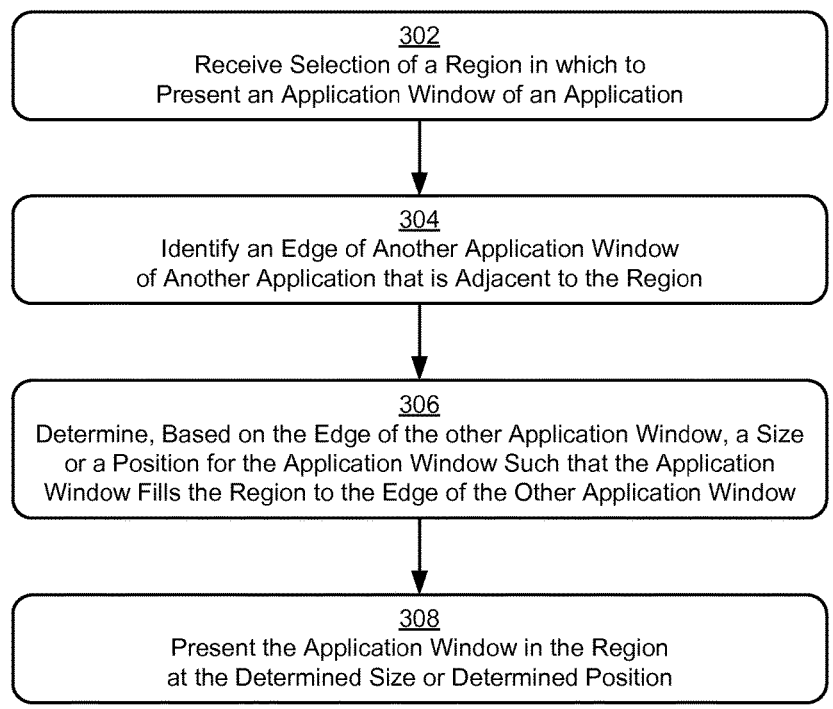
FIG. 3 illustrates a method sizing or position a window of an application to fill a region of a multi-application environment.

FIG. 3 depicts method 300 for sizing or positioning an application window based on another application window, including operations performed by windows manager 132 or multi-application environment module 118. In portions of the following discussion, reference may be made to system 100 of FIG. 1, the operating environment 200 of FIG. 2, and other methods and example embodiments described elsewhere herein, reference to which is made for example only.

At 302, a selection of a region of a multi-application environment is received. The region can be selected via any suitable input, such as a hot-key combination or directional input received via an application window (e.g., window dragging). In some cases, selection of the region is received via an application window being added to, switched to, or moved within the multi-application environment. The region may include any suitable section or area of the multi-application environment, such as a section along an edge of a screen or a section in the center of the screen. In some cases, a user may define or configure particular areas (e.g., sections or strips of screen area) within the multi-application environment as user-defined regions.

The region may be fixed, predefined, or dynamic, such as a region that changes size or position due to an orientation of a display or type of input received. In some cases, a region may be associated with a corresponding operation, such as a "snap" operation, which fills the region with an application window at a predefined size or predefined position. These predefined sizes or predefined positions may correspond to predefined areas of a multi-application environment, which may include horizontal and/or vertical quadrants or fractions of a workspace, such as halves, quarters, thirds, and any combination thereof Alternately or additionally, the predefined areas of the multi-application environment may be defined by a user, such as by partitioning a workspace or by saving an application window's size, position, or location within a z-stack as a predefined area.

Figure 4:
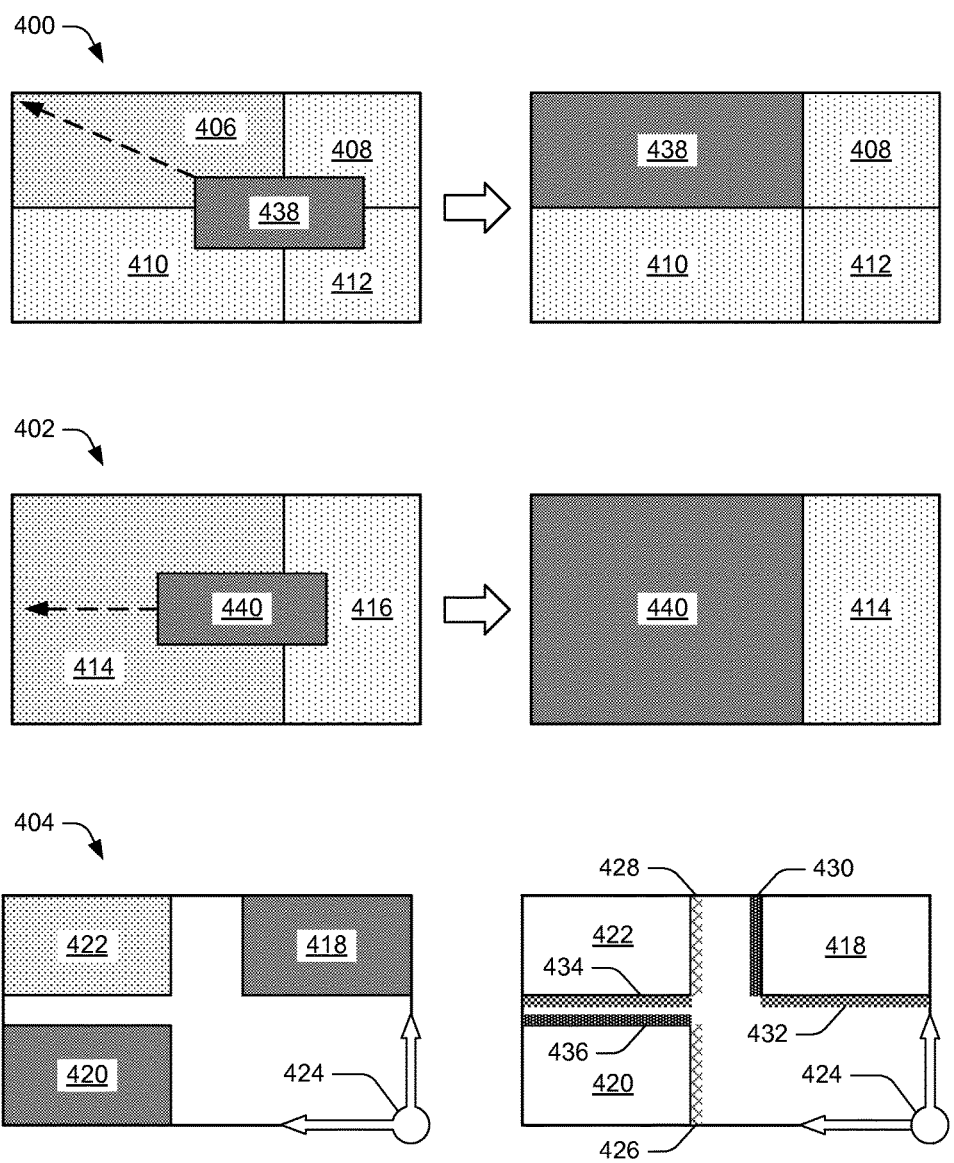
FIG. 4 illustrates example layouts for regions of a multi-application environment.

By way of example, consider FIG. 4, which illustrates example workspaces 400, 402, and 404, each of which illustrate various layouts of regions. Here, application windows 406, 408, 410, and 412 of workspace 400 are initially snapped to quadrant areas of the workspace. An application window may be considered snapped when the application window contacts or touches two or more adjacent edges of a workspace or screen. Similarly, application windows 414 and 416 are initially snapped to half areas of workspace 402.

At 304, an edge of another application window that is adjacent to the selected region is identified. The other application window may occupy an adjacent region of the multi-application environment. In some cases, the edge of the other application window is complimentary to the selected region. Alternately or additionally, an edge of a non-adjacent application window may be identified (e.g., complimentary or non-complimentary).

For example, consider region 418, region 420, and region 422 of workspace 404 along axes originating from corner 424. Here, region 418 and region 420 are adjacent to corner 424 and region 422 is not adjacent to corner 424. Further, edges of regions may be classified as complementary or non-complementary along an individual axis. From corner 424 and along an X-axis, edge 426 and edge 428 are complimentary and edge 430 is not complimentary. Similarly, from corner 424 and along a Y-axis, edge 432 and edge 434 are complimentary and edge 436 is not complimentary.

In the context of workspace 400, assume window 438 is being dragged into a corner region of workspace 400. Here, window manager 132 identifies an edge of application window 410, which is adjacent to the region into which application window 438 is moving. Additionally, in the context of workspace 402, application window 440 is being dragged into a side region of workspace 402. Here, window manager 132 identifies an edge of application window 416, which is adjacent to the region into which application window 440 is moving.

At 306, a size or a position is determined for the application window based on the edge of the other application window. The size or position of the application window may be determined such that the application window fills the region to the edge of the other application window. In some cases, the size or position is determined such that an edge of the application window aligns with a complimentary edge of an adjacent application window. In such cases, the application window and adjacent application window may have a same width or a same height. Alternately or additionally, the determined size or position may correspond to a predefined area of a multi-application environment, such as a quadrant area or half area of a workspace.

Returning to example workspace 400, window manager determines a size for application window 438 such that edges of application window 438 align with edges of application window 410 and application window 408. Additionally, in the context of workspace 402, window manager determines a size for application window 440 such that an edge of application window 440 aligns with the edge of application window 416.

At 308, the application window is presented in the selected region of the multi-application environment at the determined size or determined position. In some cases, the application window is presented over another application window occupying the selected regions. In such cases, the other application window may be relegated to another primacy layer of the multi-application environment (e.g., deeper in the z-stack). Alternately or additionally, the application window may be snapped into the region.

Concluding the example referencing workspace 400, window manager presents application window 438 in a quadrant of workspace 400, which places application window 438 against the other snapped windows of workspace 400. Additionally, in the context of workspace 402, window manager places application window 440 against half-snapped application window 414.

Figure 5:
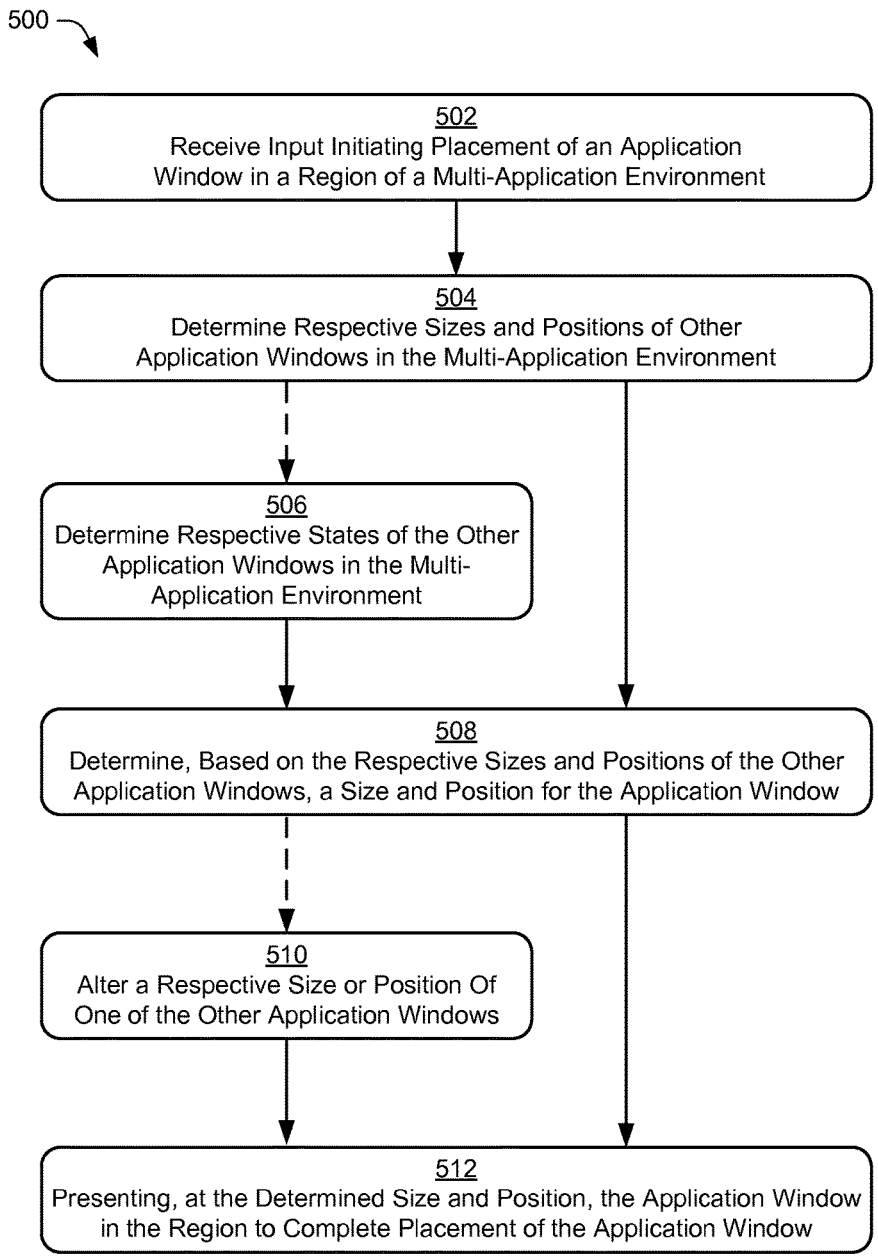
FIG. 5 illustrates a method for sizing and positioning an application window based on other application windows of a multi-application environment.

FIG. 5 depicts a method 500 for sizing and positioning an application window based on other application windows of a multi-application environment, including operations performed by windows manager 132 or multi-application environment module 118. In portions of the following discussion reference may be made to system 100 of FIG. 1, operating environment 200 of FIG. 2, and other methods and example embodiments described elsewhere herein, reference to which is made for example only.

At 502, input is received to initiate placement of an application window in a region of a multi-application environment. Placement of the application window may be responsive to input to add, switch, or move an application window in the multi-application environment. In some cases, the input is a gesture or edge trigger action in which an application window, or visual representation thereof, is dragged to or moved against an edge of the multi-application environment. In such cases, the application window's contact or movement into the edge of the multi-application environment can 'trigger' a placement, or other transformation, of the application window.

At 504, respective sizes and positions of other application windows in the multi-application environment are determined. In some cases, respective edges of the other application windows are identified as complimentary or non-complimentary edges to the region. In such cases, these respective edges may be identified on a per-axis basis, such as a vertical axis or horizontal axis. When complimentary edges of other applications are identified along both axes (e.g., two adjacent application windows), edges of the horizontal axis may be disregarded.

Optionally at 506, respective states of the other application windows are determined. Application windows that are not snapped within a multi-application environment or are occluded by other windows may be disregarded from other operations of method 500. Alternately or additionally, application windows that are minimized, maximized, or presented via another display may also be disregarded from the other operations of method 500. By so doing, currently snapped or primary windows of the multi-application environment are considered when sizing or positioning the application window to provide an optimized layout of application windows. In some cases, a data structure of information describing the other application windows (e.g., on-screen application windows) and their respective state information is created or maintained. This data structure can be accessed or consulted to determine which application windows to consider when optimizing a layout of the application windows.

At 508, a size and position for the application window are determined based on the respective sizes and positions of the other application windows. In some cases, the size and position of the window are also determined based on properties or preferences of the application window, such as a default aspect ratio or minimum size. In other cases, properties or preferences of the other application windows may be considered, such as to maintain a minimum size of one of the other application windows.

Figure 6:
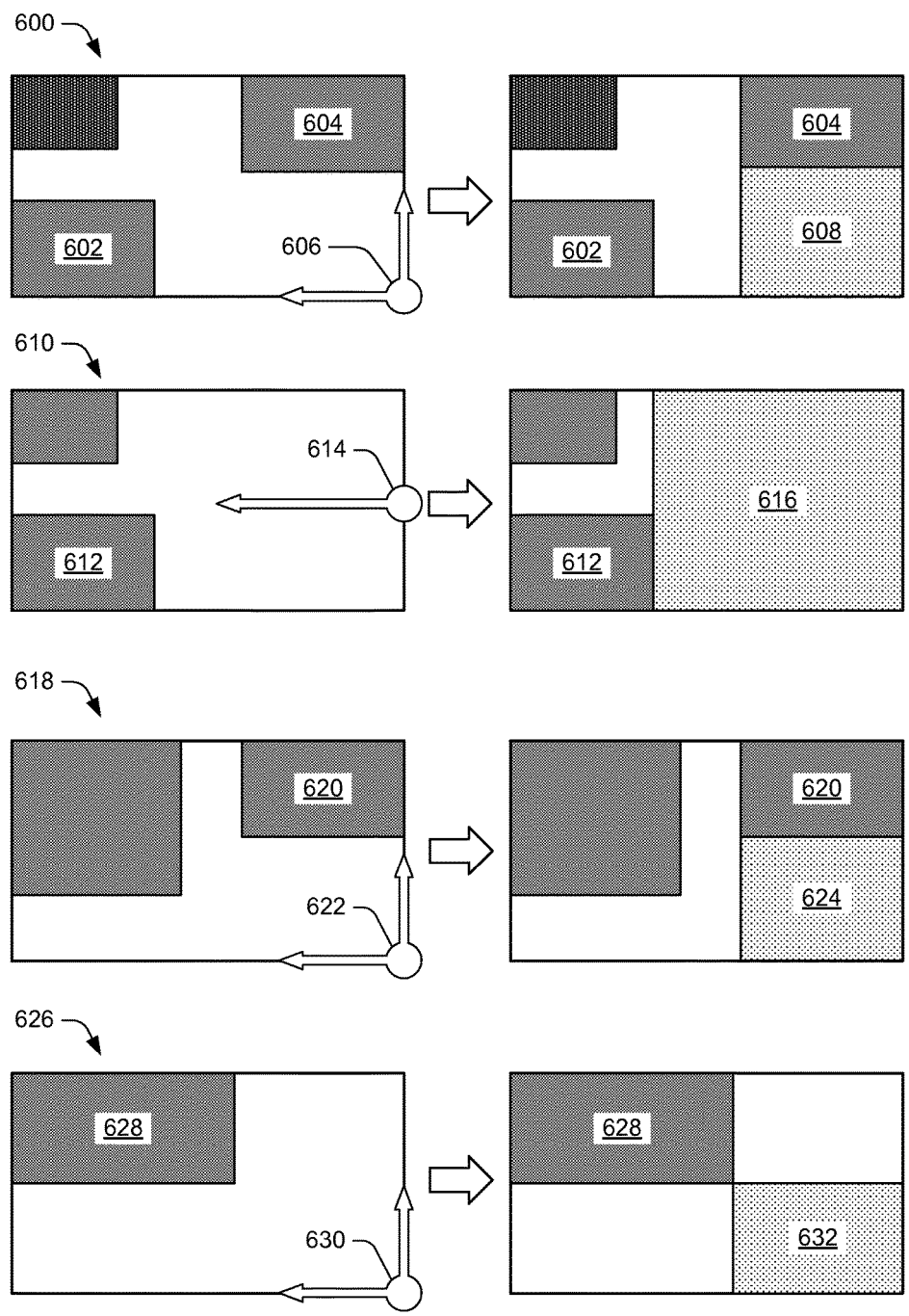
FIG. 6 illustrates examples of sizing and/or positioning application windows for presentation in a multi-application environment.

In some embodiments, the application window is sized and positioned to line up with other application windows that are adjacent to the region in which the application window is selected for presentation. For example, the application window may be sized to line up with a complimentary edge of an adjacent application window. When two of the other application windows are adjacent to the region, the application window may be sized to both complimentary edges of a vertically adjacent window. An example of this is illustrated in example workspace 600 of FIG. 6, which includes application windows 602 and 604 that are adjacent to corner region 606. Here, a size and position are determined for application window 608 such that the application window aligns with application window 604.

Alternately, if another application window is not vertically adjacent, the application window can be sized to a horizontally adjacent window. This is illustrated by example workspace 610, which includes application window 612 that is horizontally adjacent to half-region 614. Here, a size and position are determined for application window 616 such that the application window aligns with a complimentary edge of application window 612.

Further, when an adjacent application window does not have a complimentary edge in the region, the application window can be sized and positioned to line up with a non-complimentary edge of the adjacent window. This is illustrated by example workspace 618, which includes application window 620 that is adjacent to corner 622. Here, a size and position are determined for application window 624 to align the application window with a non-complimentary edge of application window 620.

Additionally, when another application window is not adjacent to the region, the application window can be sized to a complimentary edge of a non-adjacent region. This is illustrated by example workspace 626, which includes application window 628 that is not adjacent to corner 630. Here, a size and position are determined for application 632 to align the application window with a complimentary edges of application window 628.

Figure 7:
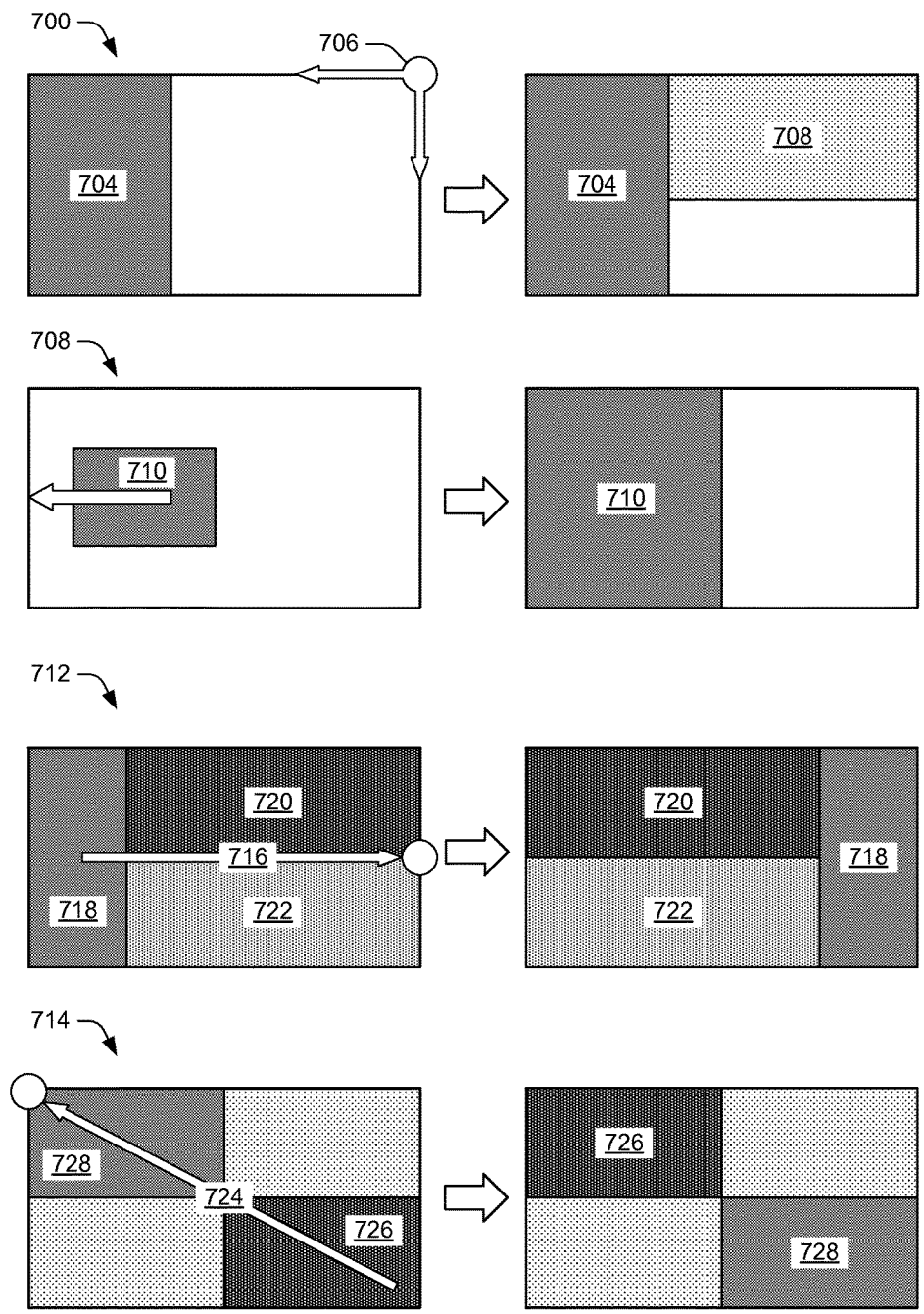
FIG. 7 illustrates additional examples presenting sizing and/or positioning application windows for presentation in a multi-application environment.

Alternately, when there are no other edges or application windows present, the application window can be sized and positioned to a predefined area of the multi-application environment, such as a quadrant area or half area. This is illustrated in example workspaces 700 and 702 of FIG. 7, which do not include an adjacent application window or those having complimentary edges. In workspace 700, application window 704 is snapped to half the workspace and located opposite of corner 706. As such, a size and position are determined such that application window 708 half snaps into an upper region of work space 700. In workspace 702, there are no other application windows when application window 710 is moved into a half-region. Accordingly, a size and position are determined such that window 710 can be snapped into a half-snap area of workspace 708.

Optionally at 510, a respective size or position of one of the other application windows is altered. In some cases, a size or position of the other application window is determined based on properties or preferences of the other application window, such as a default aspect ratio or minimum size. Altering the other application window may include moving or sizing the other application window to fit or fill a predefined area of the multi-application environment, such as a quadrant area or half area.

In some embodiments, this can be effective in enabling application window swapping, such as when the application window and another application window are similarly sized. Examples of this are illustrated in workspaces 712 and 714 of FIG. 7, in which application window swapping is initiated in response to half-snap and quarter-snap edge trigger actions (triggers), respectively. In workspace 712, half-snap edge trigger 716 is received via application window 718 to move the application window to the right edge of workspace 712.

Here, application windows 720 and 722 are repositioned to the left edge of workspace 712 thereby enabling a position swap with application window 718. In workspace 714, quarter-snap edge trigger 724 is received via application window 726 to move the application window to the upper-left corner of workspace 714. Here, application window 728 is repositioned to the lower-left corner of workspace 714 thereby enabling a position swap with application window 726.

An example algorithm to determine when to initiate an application window swap is based on the input moving one of the application windows. When edge components of the application windows that are perpendicular to movement are identical, the application windows can be swapped. In other words, when moving an application window along the X-axis, the application window edges in the Y-axis must match. For diagonal movement, this algorithm can be applied twice, once in each axial direction. Vector-based movement along each axis may be determined by mapping the movement back to an edge trigger or other directional input.

At 512, the application window is presented at the determined size and position to complete placement of the window. In some cases, the application window is presented over another application window occupying the selected regions. In such cases, the other application window may be relegated to another primacy layer of the multi-application environment (e.g., deeper in the z-stack). Alternately or additionally, the application window may be snapped into the region at a predefined size, such as to occupy a quadrant-area or half-area of the multi-application environment.

Further, method 300 or 500 may be implemented to resize an existing snapped window or maximized window. Resizing these windows may be initiated using any suitable input, such a half-snap or quadrant-snap edge triggers. In some cases, these operations are enabled responsive to receiving additional input, such as a mouse button or keyboard input (e.g., ALT key), in addition to an edge trigger or window dragging input.

Figure 8:
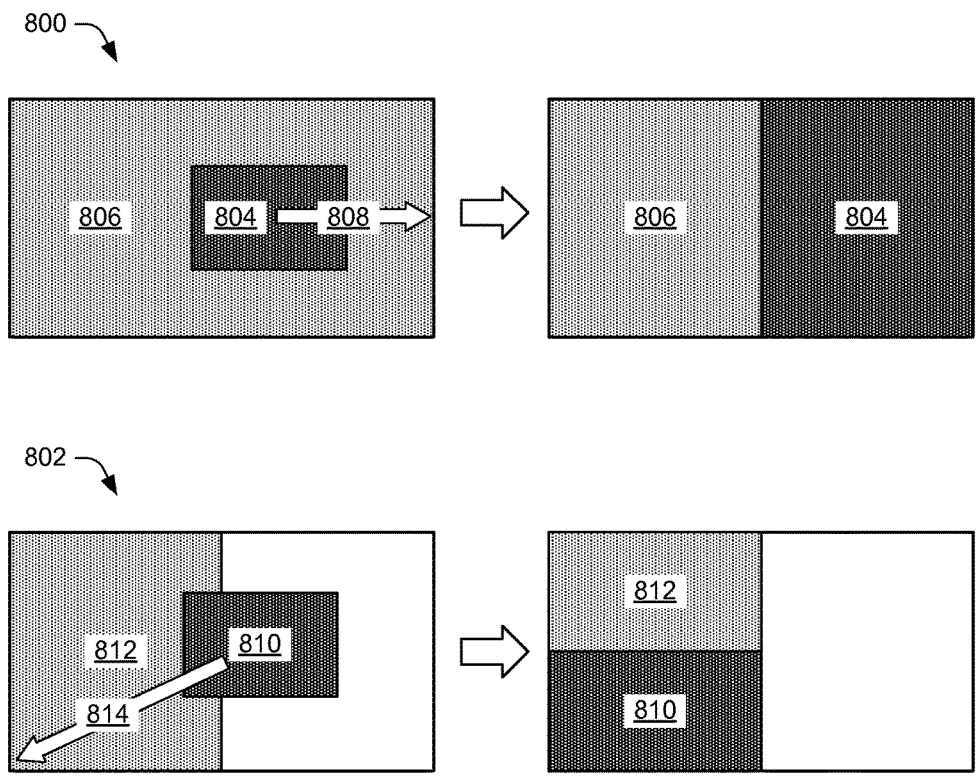
FIG. 8 illustrates examples of re-sizing snapped application windows in various regions of a multi-application environment.

FIG. 8 illustrates examples of resizing snapped application windows, which are shown with reference to workspaces 800 and 802. Workspace 800 includes application window 804 and application window 806, which is initially maximized in the workspace. Here, half-snap edge trigger 808 positions and sizes application window 810 to a half-area of workspace 800. In response to this, window manager 132 resizes application window 806 to another half-area of workspace 800.

As another example, consider workspace 802, which includes application window 810 and application window 812 occupying a half-area of workspace 802. Here, quadrant-snap edge trigger 811 positions and sizes application window 810 to a quadrant-area of workspace 802. In response to this, window manager 132 resizes application window 812 to an adjacent quadrant-area of workspace 802. These are but a few examples of how methods 300 and 500 can be implemented to position or size snapped application windows.

Region-Based Sizing and Positioning of Application Windows

Figure 9:
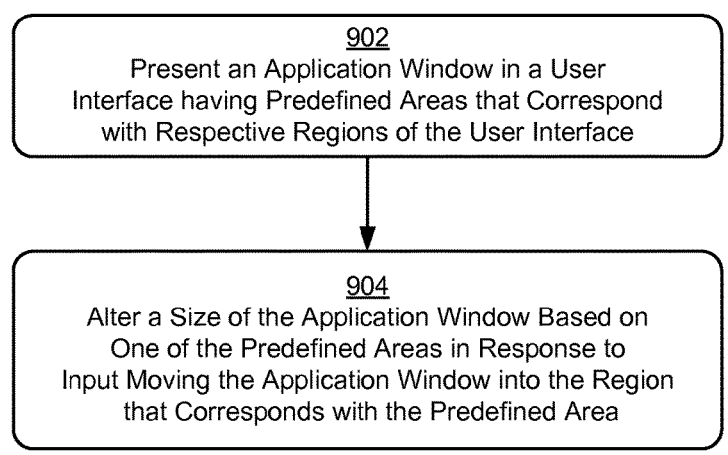
FIG. 9 illustrates a method for sizing an application window based on a region of a multi-application environment.

FIG. 9 depicts a method 900 for region-based sizing of application windows, including operations performed by windows manager 132 or multi-application environment module 118. In portions of the following discussion reference may be made to system 100 of FIG. 1, operating environment 200 of FIG. 2, and other methods and example embodiments described elsewhere herein, reference to which is made for example only.

At 902, an application window is presented in a user interface having predefined areas. The application window may be presented in one of the predefined areas or over the predefined areas. Each of the predefined areas corresponds with a region of the user interface. In some cases, the regions (e.g., edges) of the user interface are used to trigger placement of an application window into a corresponding one of the predefined areas (e.g., quadrants). These regions of the user interface may be default regions, such as screen edges, or user-defined regions that include any section of the screen. In some cases, the predefined areas may have an associated size or position within the user interface, such as a quadrant size, half size, maximized size, minimized size, and so on. The user interface may be implemented as a multi-application environment.

Figure 10:
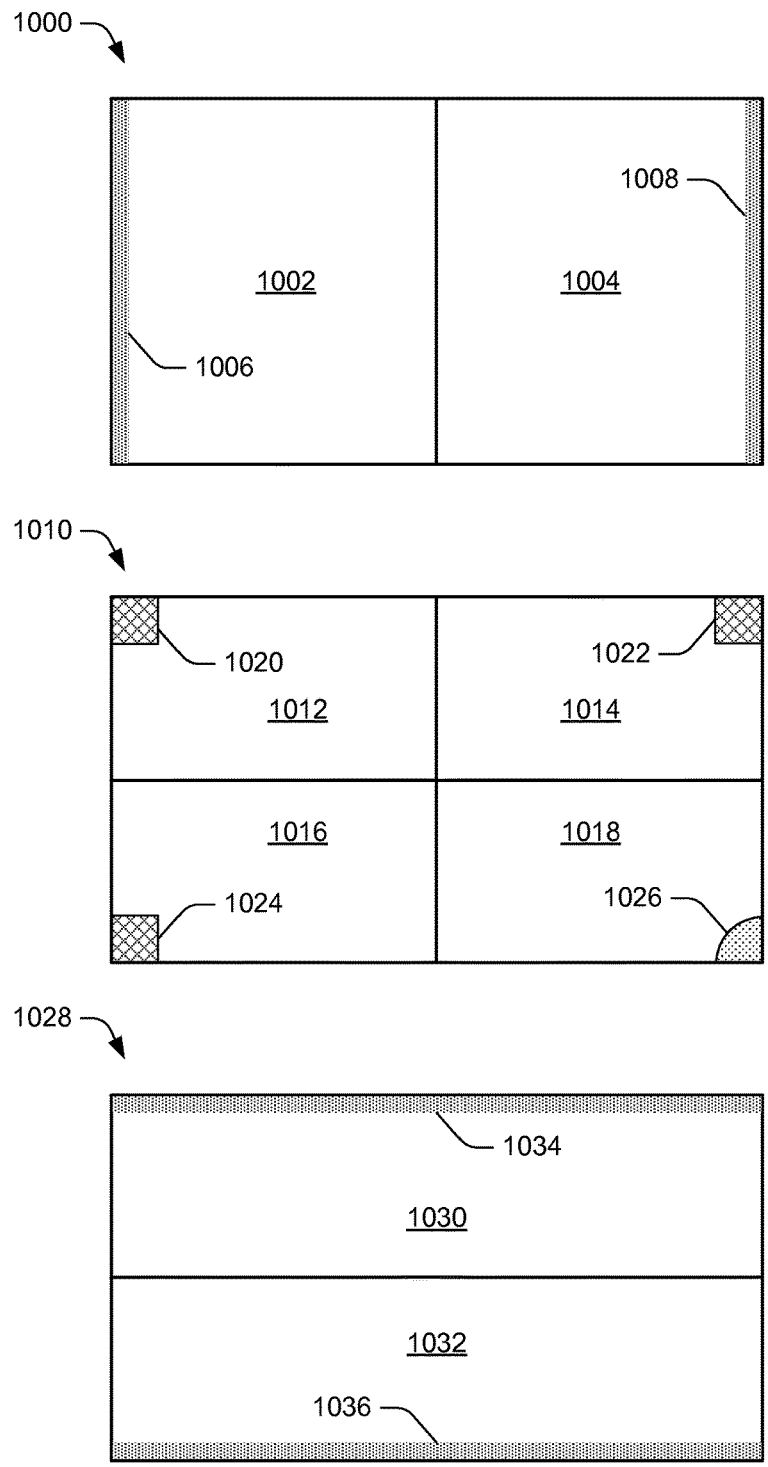
FIG. 10 illustrates example selection areas associated with various regions of a multi-application environment.

By way of example, consider FIG. 10, which illustrates example predefined areas and corresponding regions. By way of example only, the predefined areas are illustrated as snap-areas, which may be evenly or unevenly split across sections of a workspace. For instance, workspace 1000 of FIG. 10 includes half-snap area 1002 and half-snap area 1004, which correspond edge region 1006 and edge region 1008, respectively.

Example workspace 1010 includes quadrant areas, such as quadrant-snap areas 1012, 1014, 1016, and 1018, which correspond to corner regions 1020, 1022, 1024, and 1026, respectively. Corner regions may be defined as square or round (e.g., corner region 1026), and may have a predefined size, such as a width or radius of approximately 25 pixels. Other example half areas are shown in workspace 1028, which includes half-snap area 1030 and half-snap area 1032. Edge region 1034 may correspond with a maximized area of a workspace or, in the case of a portrait-oriented display, may correspond with half-snap area 1030. Finally, half-snap area 1032 corresponds with edge region 1036 located along the bottom of workspace 1028.

In some embodiments, a size of a region may be altered depending on a type of input expected. For example, when a more-precise input is received, such as mouse input, regions may have a smaller size because a user can easily engage an intended region. In other cases, the size of the regions (e.g., edge region or corner edge) may be increased when less-precise input is received, such as touch input or gesture input. Alternately or additionally, a size of a region may be altered based on display topology, such as providing larger regions where edges of displays meet to enable more-accurate region selection.

At 904, a size of the application window is altered based on one of the predefined areas. The size of the application window is altered in response to input moving the application window into a region that corresponds with the predefined area. In some cases, the application window is positioned to occupy a portion or all of the predefined area. The input moving the application window may include any suitable input, such as an edge trigger or directional input (e.g., dragging) received through the application window. For example, dragging an application window into a corner region sizes the application window into a quadrant that corresponds to the corner region. Thus, an application window can be sized to any predefined area of a workspace by moving that window to a corresponding region.

Figure 11:
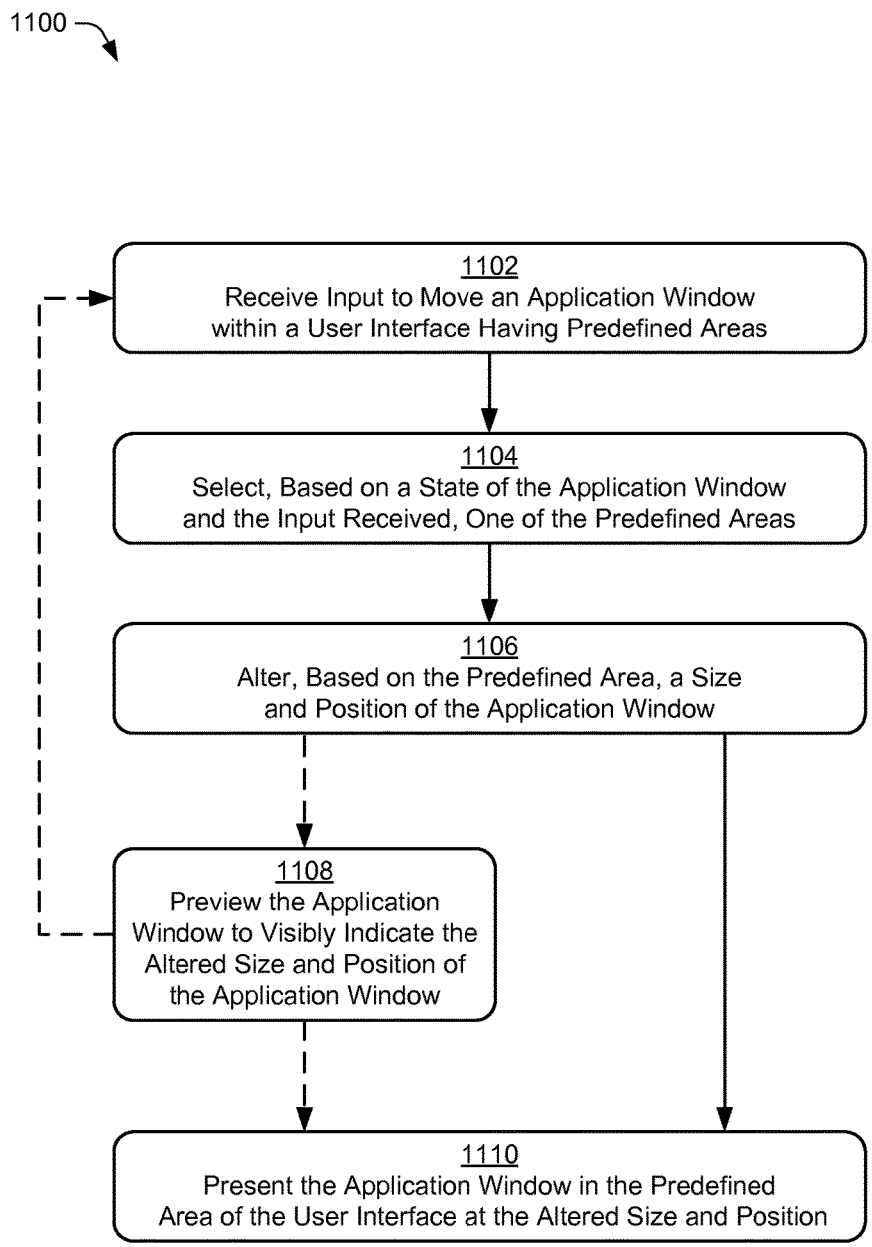
FIG. 11 illustrates a method for selecting a region of a multi-application environment based on a state of an application window.

FIG. 11 depicts a method 1100 for region-based sizing and positioning of application windows, including operations performed by windows manager 132 or multi-application environment module 118. In portions of the following discussion reference may be made to system 100 of FIG. 1, operating environment 200 of FIG. 2, and other methods and example embodiments described elsewhere herein, reference to which is made for example only.

At 1102, input is received to move an application window within a user interface having predefined areas. The input received may include any suitable type of input, such as key strokes, directional input, gesture input, and the like. For example, the input may include selection and dragging of the application via a mouse or one or more key strokes, such as the Windows™ key and an arrow key. In other instances, the application may be dragged into a region that corresponds with one of the predefined areas.

At 1104, a predefined area of the user interface is selected based on the input and the state of the application window. The state of the application window may include a current size, a current position, a current depth in the z-stack, or a current predefined area occupied by the application window. The predefined area may include any predefined area, such as a user defined area or other predefined area described herein, such as snap areas. In some embodiments, the predefined areas may also be overlapping and have customizable depths in the z-stack of windows. By so doing, application window layouts of varying primacy or depth can be created.

Using the state of the application window can enable dynamic sizing and positioning of the application window. By way of example, selection of a predefined area or application window state can be determined using a state machine. In some cases, accessing the state machine based on a current state of an application window and the input received can select a next-predefined area or next-state for the application window.

Figure 12:
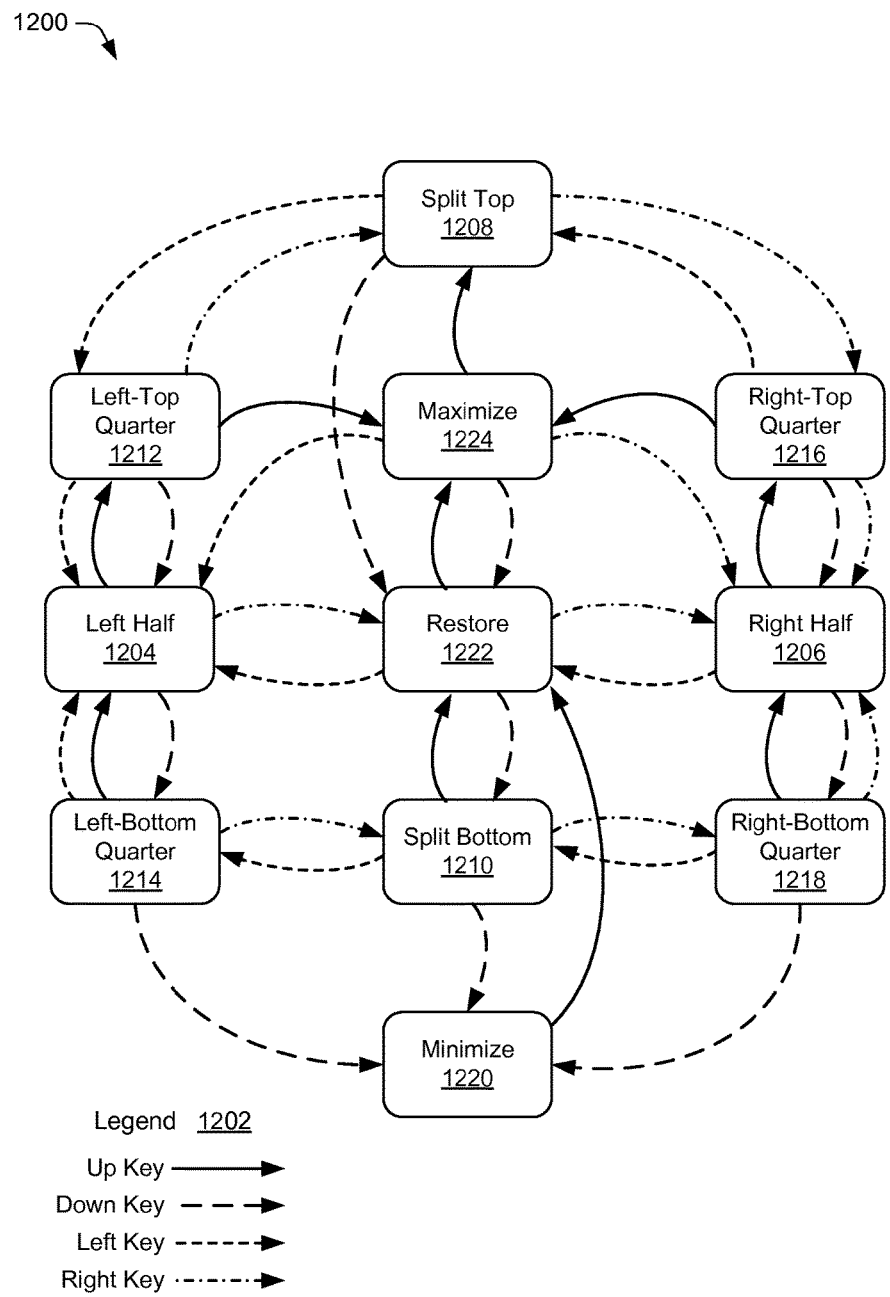
FIG. 12 illustrates an example state machine for implementing the method of FIG. 12.

Consider FIG. 12, which illustrates example state machine 1200 for dynamically selecting predefined areas or states for application windows. Here, legend 1202 indicates which state transitions occur in response to a respective input received, such as an arrow key pressed while holding a Windows™ key. As shown by states of state machine 1200, predefined areas can be selected by entering a series of keystrokes to reach a corresponding state. In this particular example, state machine 1200 includes states for half areas, such as left half 1204, right half 1206, split top 1208, and split bottom 1210. State machine also includes states for quadrant areas, such as left-top quarter 1212, left-bottom quarter 1214, right-top quarter 1216, and right-bottom quarter 1218. Further, other predefined areas or states of state machine 1200 are also selectable and include minimize 1220, restore 1222, and maximize 1224. Alternately or additionally, a user can map one or more of the states, or other key combinations, to custom user-defined areas of a workspace.

Returning to the method at hand, at 1106, a size and position of the application window are altered such that the application window will fill the predefined area. In some cases, the application window is sized to fill a quadrant area or half area of the user interface. In other cases, the application window may be minimized or relegated deeper in a z-stack of currently presented application windows. As noted above, the predefined area may be user defined, such as a drop region in a center of a user interface or multi-application environment.

Figure 13:
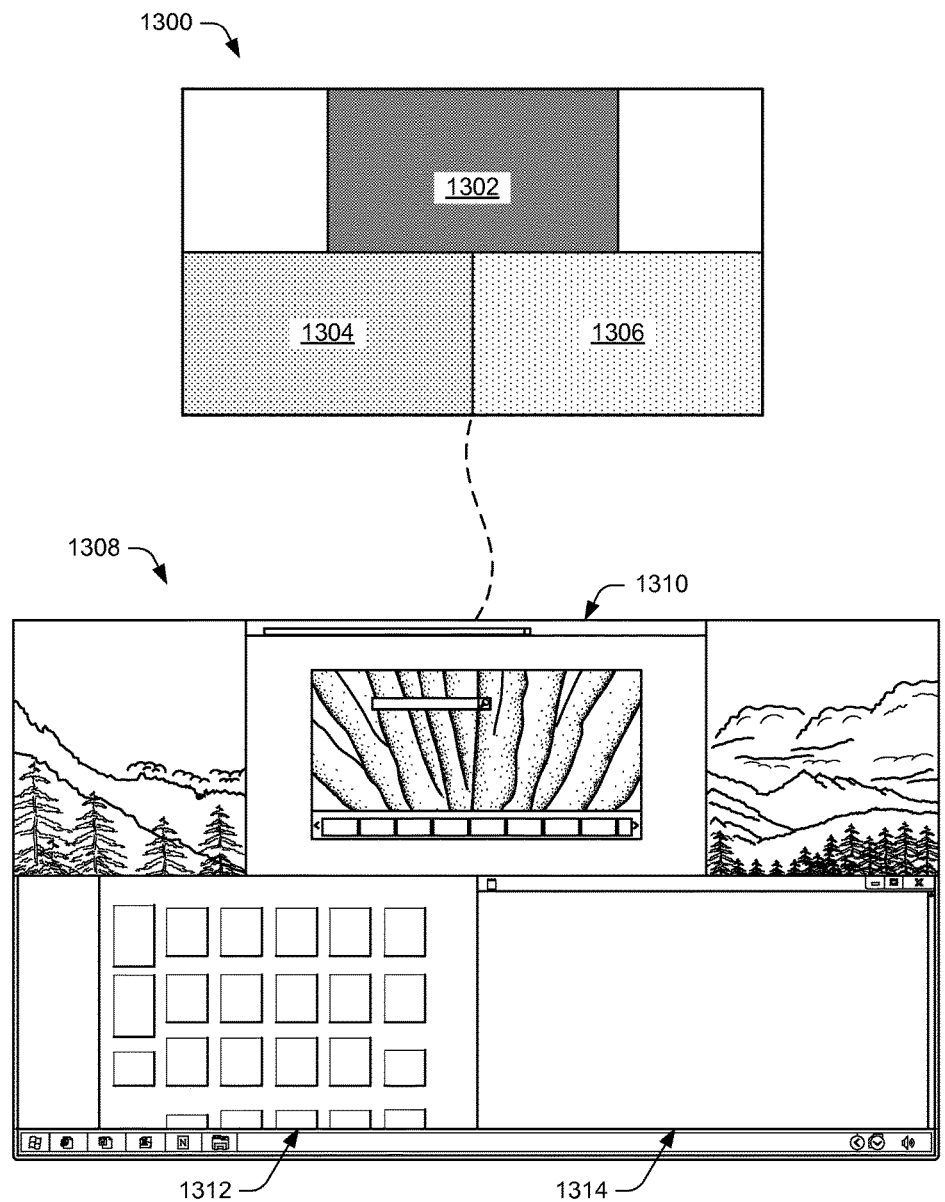
FIG. 13 illustrates example drop areas of a multi-application environment.

By way of example, consider workspace 1300 of FIG. 13, which illustrates custom drop areas 1302, 1304, and 1306. These custom drop areas may be defined by a user and mapped to a region (e.g., a region in the middle of the workspace) or key combination such that a size and position of an application window are altered to fill the drop area. These drop areas may be configured in any suitable fashion, such as by storing an application window's size, position, or depth in a z-stack as a user-defined area of a workspace.

Optionally at 1108, the application window is previewed to visibly indicate the altered size and position of the application window. The preview of the application window can be shown as a non-opaque (or partially transparent) representation of the application window or content thereof. In some cases, additional input is received confirming the previewed placement of the application window in the predefined area. In such cases, method 500 may advance to operation 1110 in response to input committing the application window as previewed.

Alternately, the additional input may select another of the predefined areas in which to present the application interface. This may be effective to cause method 500 to return to operation 1102 for selection of another predefined area. In yet other cases, the additional input may be received in the form of continued dragging or inertia imparted on the application window or the preview thereof. In response to this continued dragging or inertia (e.g., into an edge region), the preview of the application window can be resized in the predefined area or sized to another predefined area.

At 1110, the application window is presented in the predefined area of the user interface at the altered size and position. In some cases, the application window is presented at a particular depth in the z-stack in accordance with a depth associated with the predefined region of the user interface. Presenting the application at the altered size and position can be effective to fill the predefined area. An example of this is illustrated by workspace 1308 in which search application 1310 is sized and positioned to fill drop areas 1302. In the context of FIG. 13, operations of method 1100 may be repeated to fill drop areas 1304 and 1306 with image application 1312 and notepad application 1314, respectively.

Dynamic Joint Dividers for Application Windows

Figure 14:
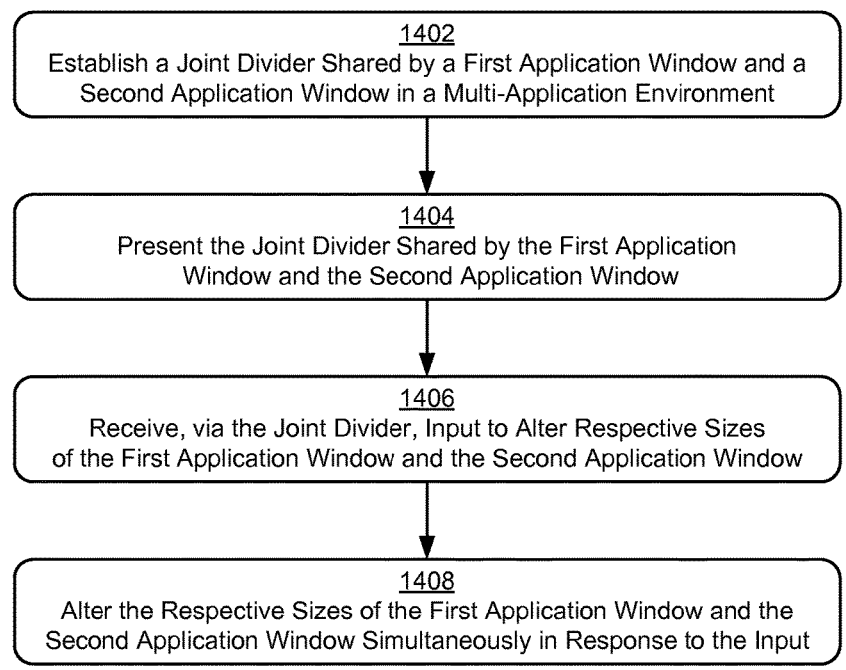
FIG. 14 illustrates a method for simultaneously sizing multiple application windows using a joint divider.

FIG. 14 depicts a method 1400 for establishing a joint divider between application windows, including operations performed by windows manager 132 or multi-application environment module 118. In portions of the following discussion reference may be made to system 100 of FIG. 1, operating environment 200 of FIG. 2, and other methods and example embodiments described elsewhere herein, reference to which is made for example only.

At 1402, a joint divider is established between a first application window and a second application window of a multi-application environment. The joint divider is established in response to an edge of the first application window contacting (e.g., touching with no overlap) an edge of the second application window. In some cases, the joint divider is established along respective sections of each application window that are in contact. In other cases, the joint divider is established along an entire length of each respective application window, regardless of an amount of contact between the application windows. Contact between the edges of the application windows may be caused by any suitable operation, such as moving, snapping, adding, or sizing one of the application windows in the multi-application environment. The joint divider can also be established along any visible edges of the application windows. In some cases, establishing the joint divider may be limited to snapped application windows and preclude non-snapped or floating application windows.

In some embodiments, the joint divider is established between multiple application windows contacting each other along one or more edges. For example, a single joint divider can be established when respective edges of two applications windows contact an edge of a third application window. Alternately, complex joint dividers can be formed when application windows contact each other at respective corners of the application windows. Alternately or additionally, establishing the joint divider groups (or relates) the application windows together enabling operations to be performed on the grouped application windows. For example, grouped application windows may be opened, closed, minimized, resized, switched to/from, or moved together. Further, ungrouping the grouped application windows may return the previously-grouped application windows to their respective original states. In some cases, the grouped application windows are presented together in switching affordances, such as a start menu, application management UI, or hotkey switcher (e.g., ALT+Tab or Windows™+Tab).

Figure 15:
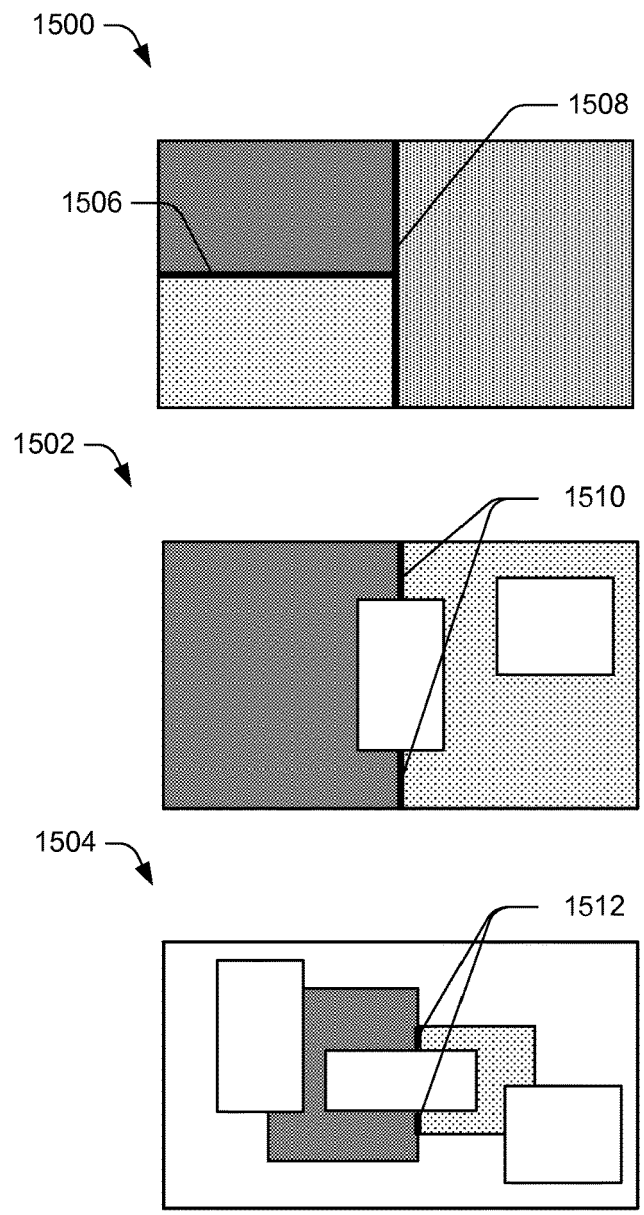
FIG. 15 illustrates example joint dividers established between various application windows.

A joint divider can be established whenever and wherever respective edges of two or more application windows contact each other. By way of example, consider FIG. 15 which illustrates various joint dividers in workspaces 1500, 1502, and 1504. Workspace 1500 includes joint divider 1506 established between quadrant-snapped application windows and joint divider 1508 established between the quadrant-snapped application windows and a half-snapped application window. Joint dividers may also be established between occluded application windows as shown in workspace 1502 where application divider 1510 is established between partially-occluded and snapped application windows. Further, application divider 1512 is established between occluded and floating application windows, which are not at a highest level in the z-stack of application windows.

At 1404, the joint divider shared by a first application window and a second application window is presented. Presenting the joint divider may include providing a visual or haptic indication of the joint divider. For example, a visual indication is presented over edges of application windows that share the joint divider. In other cases, the joint divider is presented between two application windows that share the joint divider. In such cases, the size of one or both application windows may be reduced to provide space in which to present the joint divider. Alternately or additionally, haptic feedback (e.g., bumps or undulations) can be used to indicate a presence of the joint divider. In some cases, the joint divider is presented in response to input or cursor movement that is proximate the joint divider.

In some embodiments, a joint-separation control or affordance is also presented to enable a joint divider to be disabled. The joint-separation control can be presented over a section of the joint divider, an edge of the joint control, or both edges of the joint control. In some cases, the joint-separation control enables a user to 'unbuckle' the joint divider, which enables individual sizing or movement of application windows previously sharing the joint divider. The joint divider may also be disabled by other operations, such as double-clicking the joint divider, clicking the joint divider while holding a key (e.g., CTRL), or by sizing or moving an application window via an edge that is not part of the joint divider.

Figure 16:
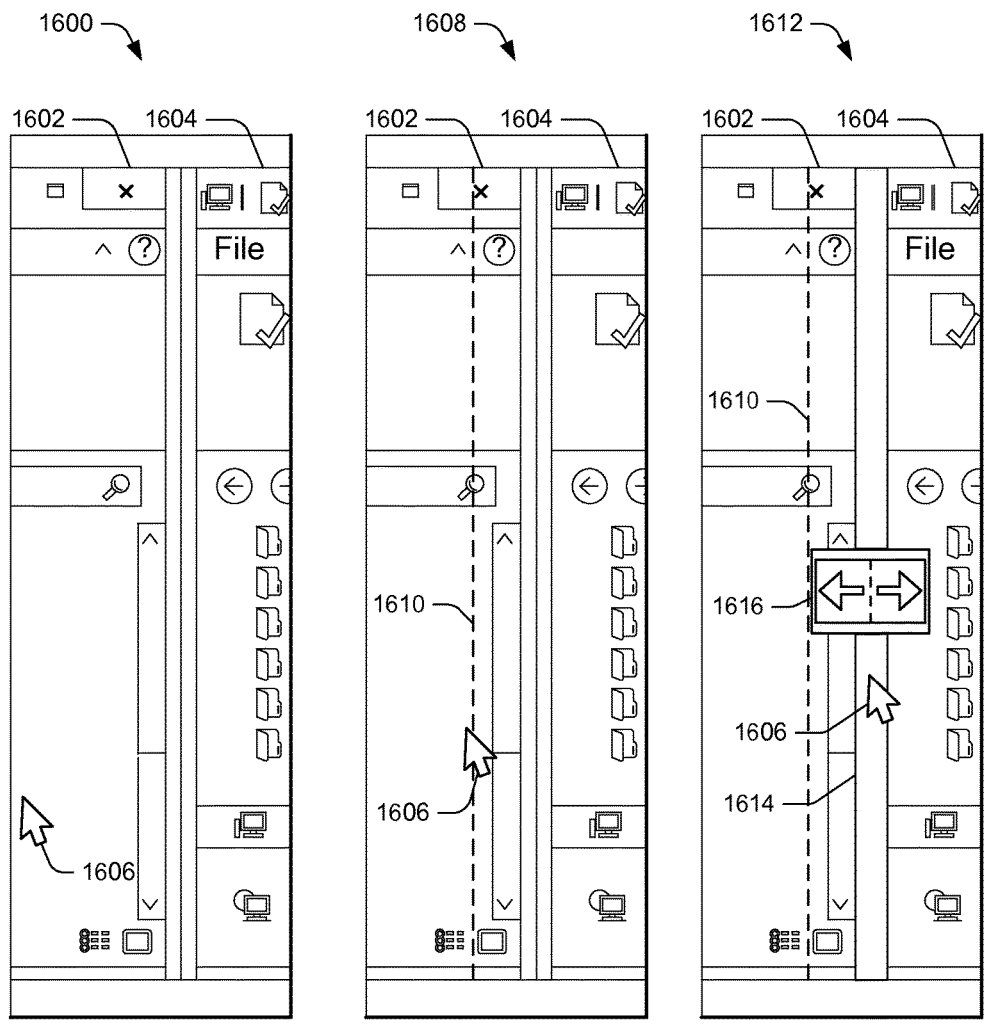
FIG. 16 illustrates presentation of a joint control divider in accordance with one or more embodiments.

The joint divider can be presented in response to establishing the joint divider between application windows. Alternately, the joint divider may exist without being presented until input or cursor movement is received proximate to the joint divider. FIG. 16 illustrates an example of presenting a joint divider in response to cursor movement. Movement of a curser is shown in a progression of illustrated workspaces starting in workspace 1600, which includes application window 1602, application window 1604, and cursor 1606.

As shown in workspace 1608, movement of cursor 1606 can be detected based on proximity threshold 1610. Proximity threshold 1610 may be configured having any suitable dimensions, such as 10 pixels from a joint divider, and may be reconfigured based on a type of input being received. As cursor 1606 crosses proximity threshold 1610, as shown in workspace 1612, joint divider 1614 and joint-separation control 1616 are presented over contacting edges of application windows 1602 and 1604.

At 1406, input to alter respective sizes of the first application window and the second application window is received via the joint divider. The input received may include any suitable type of input, such as directional input received via a cursor movement, touch input, or arrow keys. By way of example, consider example workspace 1700 of FIG. 17, which includes joint divider 1702 shared by application windows 1704 and 1706. In this particular example, joint divider 1702 also includes joint-separation control to enable individual sizing of application windows 1704 and 1706. Here, input to size application windows 1704 and 1706 in a lateral direction is received via cursor 1710.

At 1408, the respective sizes of the first application window and the second application window are altered simultaneously in response to the input. The respective sizes of the application windows may be altered as the input, such as directional cursor movement, is received. For example, the altered sizes of the application windows may be visually indicated by sliding the joint divider along an axis in which input is received. Thus, the sliding joint divider may visually indicate the simultaneous sizing of the first and second application windows.

Alternately or additionally, joint dividers may exhibit an attraction or affinity (e.g., magnetism) for midpoints along an edge of a workspace. This can be effective to aid a user in sizing windows in a symmetrical layout. In some cases, the attraction to points along edges of the workspace can be disable in response to key input (e.g., holding the CTRL key).

Figure 17:
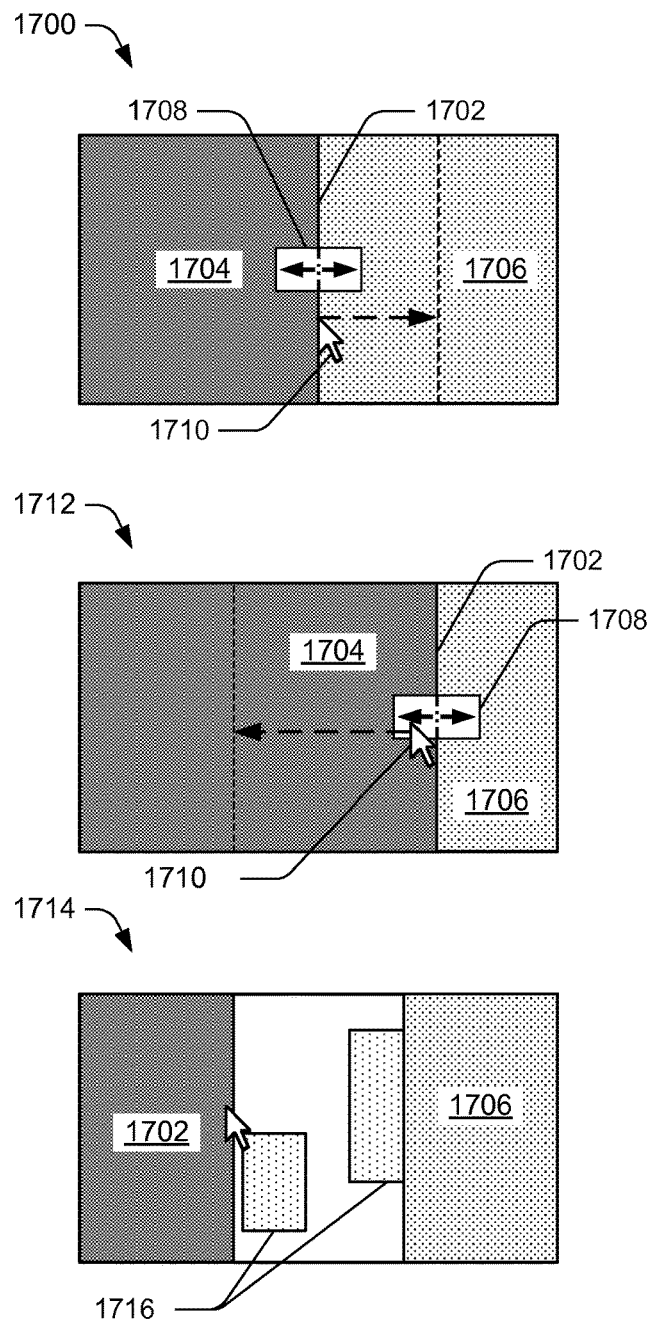
FIG. 17 illustrates an example of sizing application windows using a joint divider.

In the context of FIG. 17, application windows 1704 and 1706 are sized based on the movement of joint divider 1702 to a position shown in workspace 1712. In this particular example, features of the joint-separation control are also illustrated. Here, additional input to independently size application window 1704 is received via joint-separation control 1708. As shown, input received from cursor 1710 sizes application window 1704 an opposite lateral direction. As a result, application window 1704 is separated from application window 1706 as shown in workspace 1714, disabling the joint divider, and sized to expose previously-occluded application windows 1716.

Figure 18:
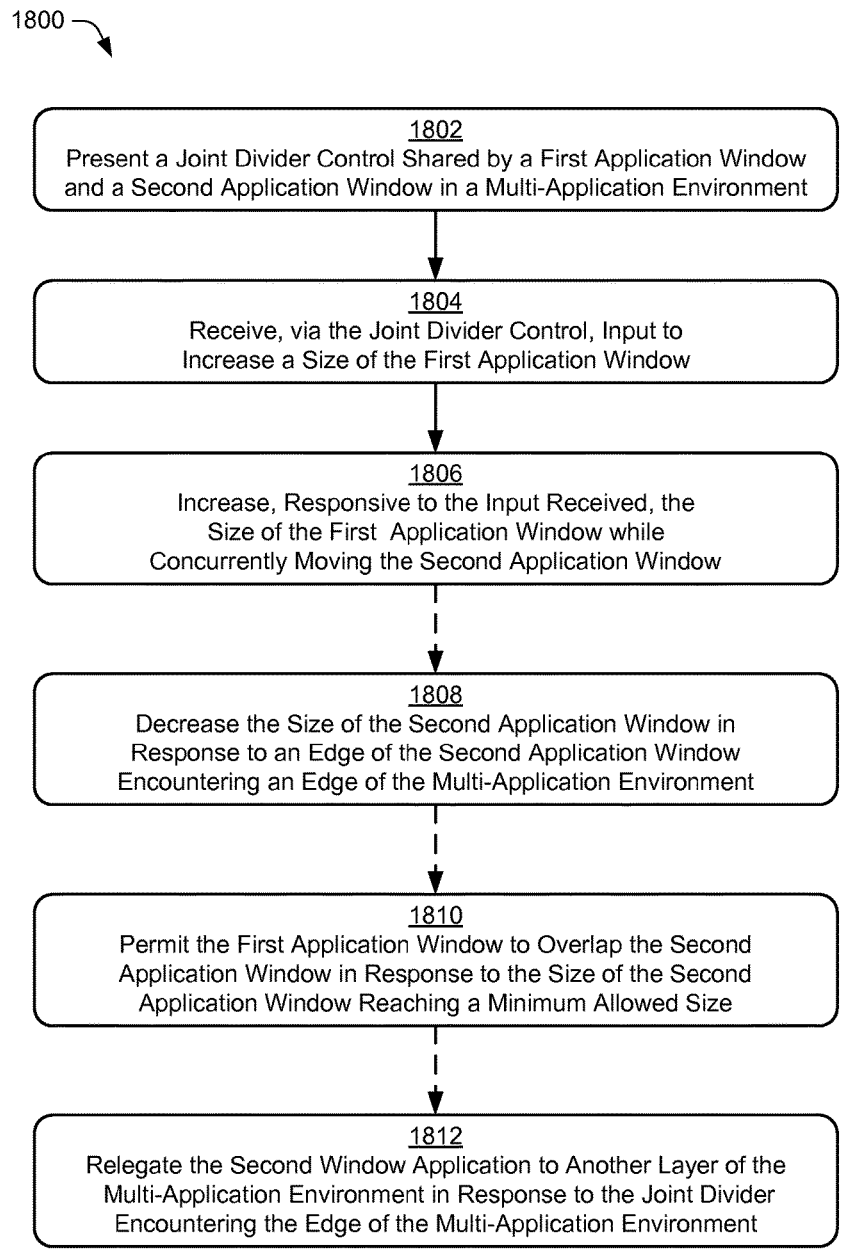
FIG. 18 illustrates a method for re-sizing an application window while moving another application window.

FIG. 18 depicts a method 1800 for sizing and positioning application windows with a joint divider, including operations performed by windows manager 132 or multi-application environment module 118. In portions of the following discussion reference may be made to system 100 of FIG. 1, operating environment 200 of FIG. 2, and other methods and example embodiments described elsewhere herein, reference to which is made for example only.

At 1802, a joint divider shared between a first application window and a second application window is presented in a multi-application environment. Presenting the joint divider may include providing a visual or haptic indication of the joint divider. For example, a visual indication is presented in between or over edges of application windows that share the joint divider. Alternately or additionally, haptic feedback (e.g., bumps or undulations) can be used to indicate a presence of the joint divider. By way of example, consider workspace 1900 of FIG. 19 in which application window 1902 and application window 1904 share joint divider 1906. Here, joint divider 1906 is visually indicated over contacting edges of application window 1902 and application window 1904.

At 1804, input to increase a size of the first application window is received via the joint divider. In some cases, the input to increase the size of the first application window may indicate to increase the size of the first application window in a direction toward the second application window. In such cases, depending on a position of the second window with respect to an edge of a workspace, the input may indicate to size, move, or relegate the second application deeper into a z-stack of windows. For example, application windows not touching an edge of a multi-application environment may be moved rather than sized.

The input received may include any suitable type of input, such as directional input received via a cursor movement, touch input, or arrow keys. In the context of the current example, directional input is received via application divider as shown in workspace 1900 of FIG. 19. Here, note that application window 1904 is not in contact with an edge of workspace 1900 and is thus movable without being sized.

At 1806, the size of the first application window is increased in response to the input received. While the size of the first application window is increased the second application window is simultaneously moved effective to maintain a size of the second application window. Movement of the second application window may continue until an edge of the multi-application environment is encountered. Continuing the ongoing example, a size of application window 1902 is increased while application window 1904 is moved toward an edge of workspace 1908.

Figure 19:
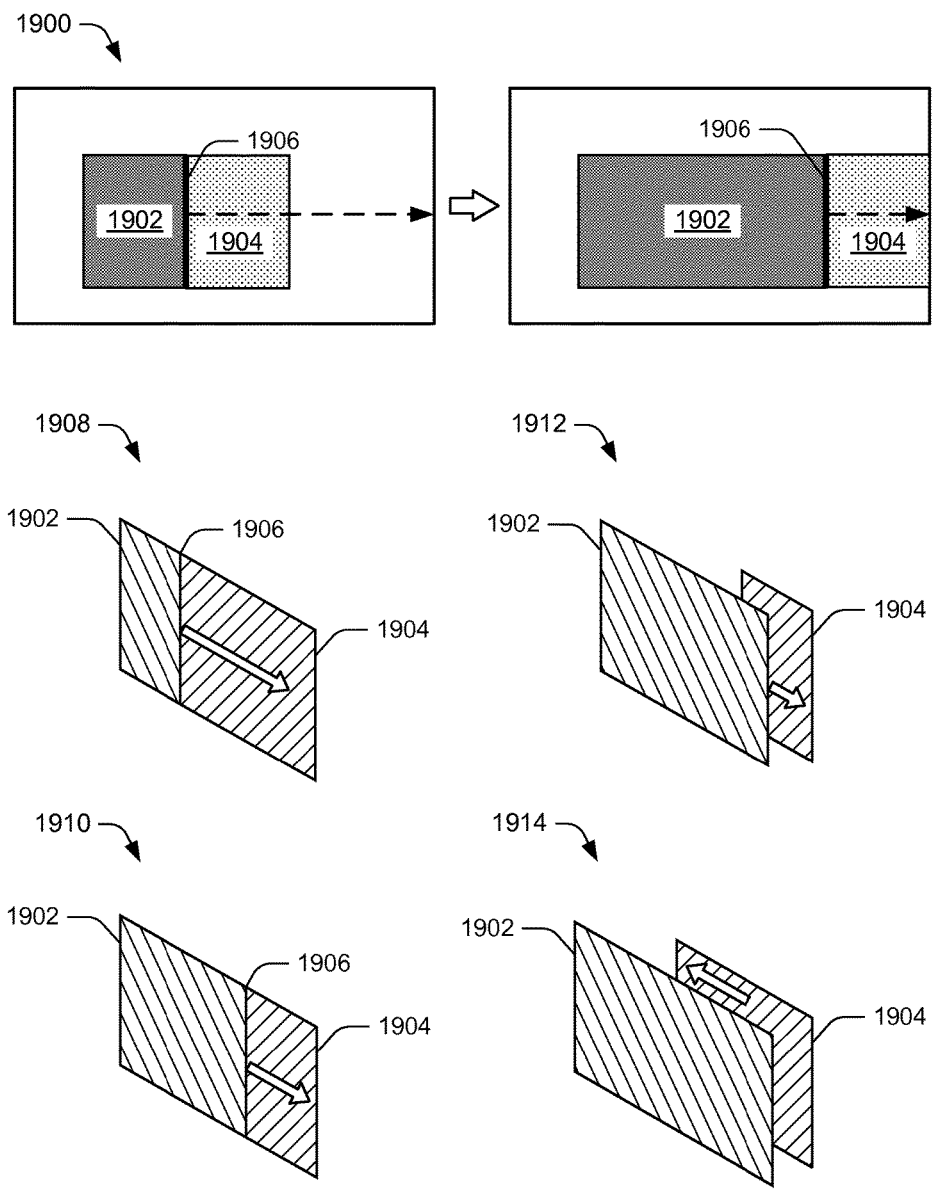
FIG. 19 illustrates an example application of the method of FIG. 18, including an eviction of an application window to another layer of a multi-application environment.

Operations 1808, 1810, and 1812 are optional and may be performed responsive to additional input or further increases in the size of the first application window. At 1808, a size of the second application window is decreased in response to an edge of the second application window encountering an edge of the multi-application environment. Decreasing the size of the second application window occurs while the size of the first application window continues to increase. The size of the second application window may be decreased until a minimum window size is reached. In the context of FIG. 19, this is illustrated in layer view 1908 where continued movement of joint divider 1906 increase the size of application window 1902 and decreases a size of application window 1904.

At 1810, the first application window is permitted to overlap the second application window in response to the size of the second application window reaching a minimum size. Once the minimum size of the second application window is reached, the advancing edge of the first application begins to overlap the second application window. The minimum size of the application window may be defined by an application associated with the application user interface, an operating system, or by user input. Continuing the ongoing example, a minimum size of application window 1904 is reached by joint divider 1906 as shown in layer view 1910. In response to this and as illustrated in layer view 1912, an advancing edge of application window 1902 begins to overlap application window 1904.

At 1812, the second application window is relegated to another layer of the multi-application environment in response to the joint divider encountering the edge of the multi-application environment. In some cases, the second application window is pushed deeper into a z-stack of application windows. Alternately or additionally, the size of the second application window can be restored to a default size or a size previous to being moved. This can be effective to enable the second application window to be restored or switched to without resizing. Concluding the present example, application window 1904 is relegated to a next-layer of the workspace at a restored size. Thus, application window 1904 can be restored or switched to without resizing.

Joint dividers may also be established between multiple application windows and may be referred to as complex joint dividers. Sizing or movement of multiple application windows may be implemented by operation described with respect to method 1400 or 1800. By way of example consider FIG. 20, which includes example workspaces 2000 and 2002 illustrating joint dividers established between multiple application windows. In the context of workspace 2000, joint divider 2004 enables sizing of application windows 2006 and 2008, which are adjacent to each other and share joint divider 2004. Joint divider 2010, which is shared between edges of application windows 2006, 2008, and 2012 enables sizing of all three application windows.

This aspect can be extended to four application windows as shown in workspace 2002, which includes application windows 2014, 2016, 2018, and 2020. In this example, joint dividers 2022, 2024, 2026, and 2028 each enable sizing of their respective adjacent windows that share edges. For example, joint divider 2022 sizes application windows 2014 and 2016, but not application windows 2018 or 2020. Alternately or additionally, when sizing multiple windows, a joint divider may separate or 'unbuckle' in response to sizing one of the multiple windows to a minimum size.

Complex joint dividers may also be implemented to maintain an independence of a window or localize changes to a particular windows. For example, consider workspaces 2030, 2032, and 2034 of FIG. 20, which illustrate a three floating application windows that share a joint divider. Here, application windows 2036, 2038, and 2040 share joint divider 2042. As shown in workspace 2030, input 2044 received via a section of joint divider 2042 shared by application windows 2036 and 2040 sizes those application windows but not application window 2038. Another example of this independent sizing is shown in workspaces 2032, in which input 2046 sizes application window 2040 over application windows 2036 and 2038. Alternately, input 2048 received via a section of joint divider shared by application windows 2038 and 2040 can size these application windows as shown in workspace 2034.

Figure 20:
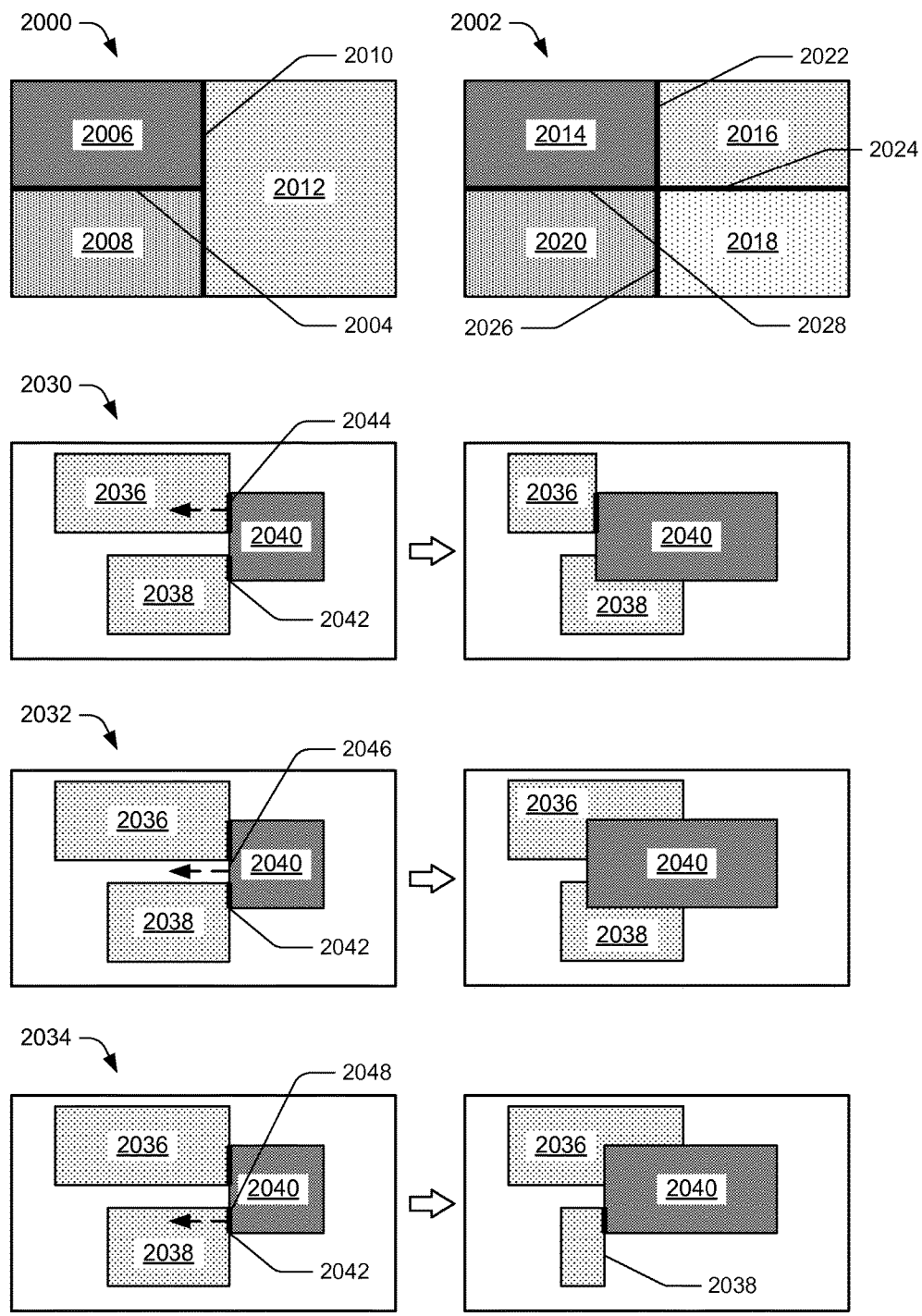
FIG. 20 illustrates example joint dividers that can be established between application windows.

Joint dividers may also be implemented in combination to provide joint corners. Joint corners enable application window sizing in one or two axes and may size at least two application windows that share the joint corner. FIG. 20 illustrates various examples of corner joints as shown in workspaces 2100 and 2102. In workspace 2100, corner joint 2104 enables application windows 2106, 2108, 2110, and 2112 to be sized in both axes.

In some cases, joint corners can be established when two application windows share a corner and not a common edge. An example of this is illustrated by workspace 2102 in which application windows 2114 and 2116 meet at corners and share joint corner 2118. Here, joint corner 2118 enables sizing of application windows 2114 and 2116 in both axes. As with joint dividers, joint corners may be disabled responsive to reaching an application windows minimum size or other suitable input, such as key input or dragging an application window from an edge that is not part of the joint corner.

Figure 21:
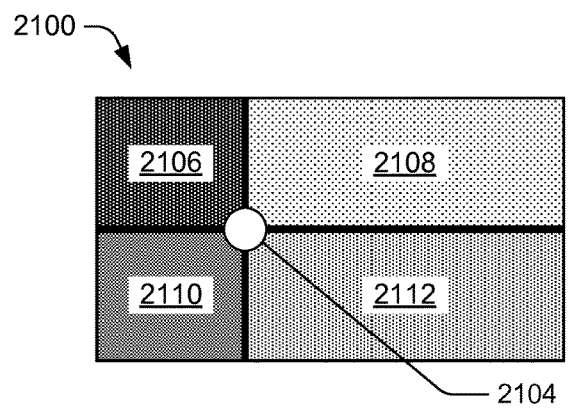
FIG. 21 illustrates example of joint corners that can be established between application windows.
Figure 21:
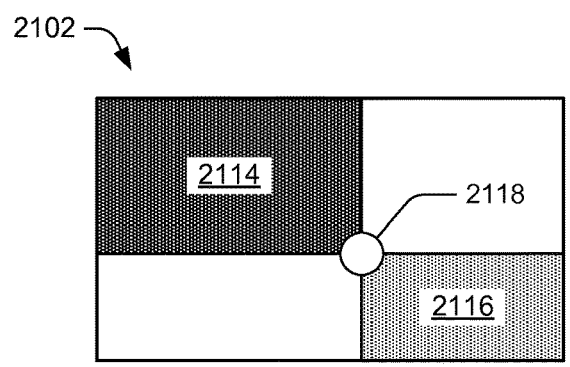
Figure 21:
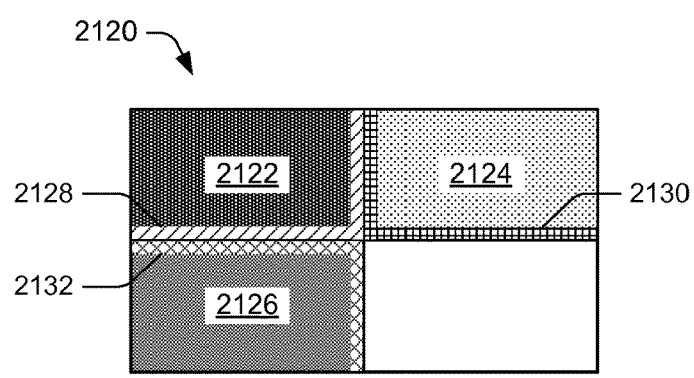

Joint corners can be established whenever corners of application windows contact or touch each other. Window manager 132 can establish or maintain joint corners by tracking corner, or two adjacent edges, of individual windows. Returning to FIG. 21, consider example workspace 2120 that includes application windows 2122, 2124, and 2126. Each of these windows includes a corner where two of their respective edges meet. Here, window manager 132 tracks edges 2128, 2130, and 2132 to establish or maintain a joint corner for these application windows.

Window manager 132 may also track edges of individual application windows to establish or maintain joint dividers. By way of example, consider FIG. 22 in which workspace 2200 includes application windows 2202 and 2204. Application windows 2202 and 2204 share joint divider 2206, and thus can be sized through input received through the joint divider. To enable sizing or other joint divider operations window manager 132 can build a dependency chain to track individual edges of application windows.

Figure 22:
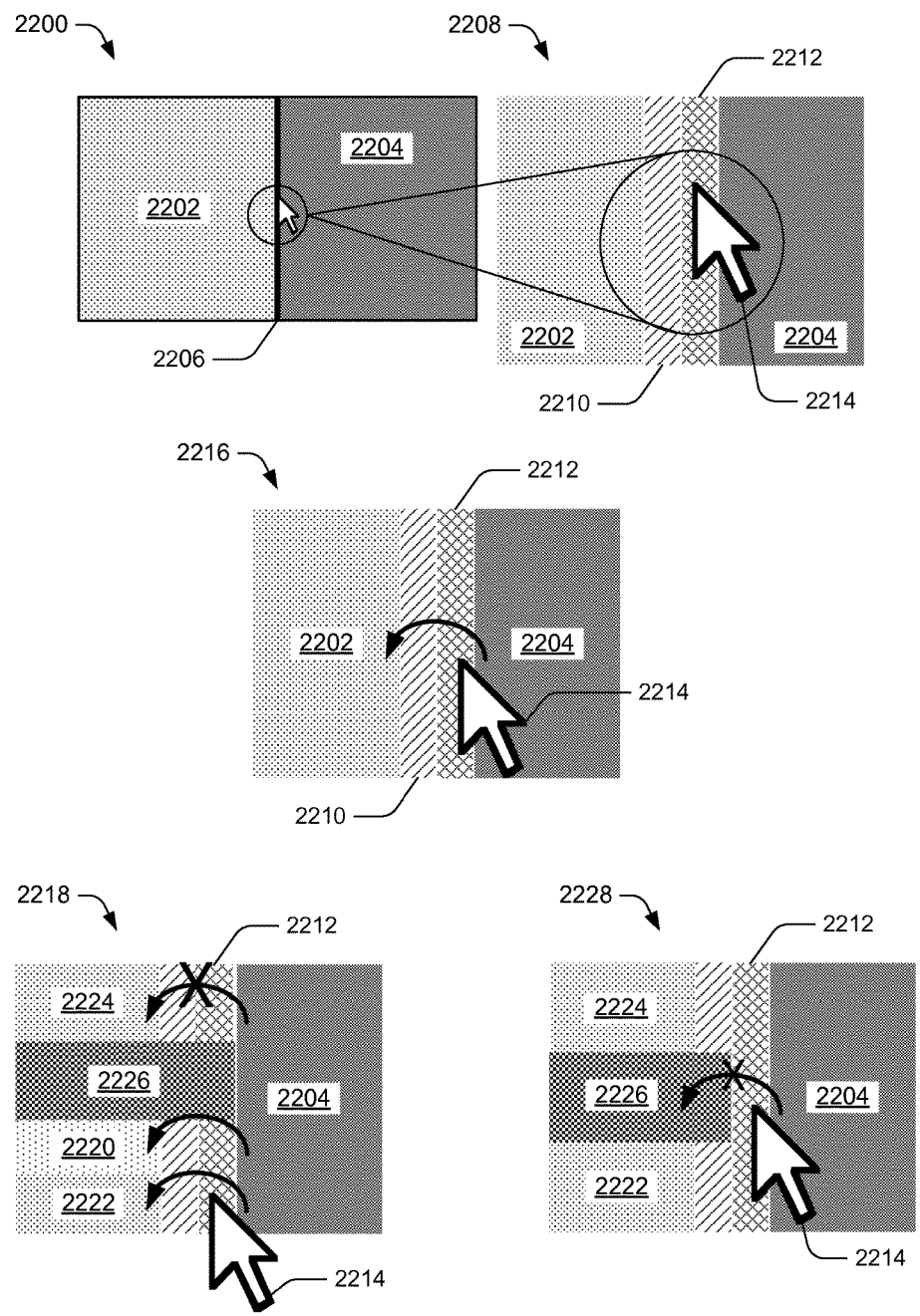
FIG. 22 illustrates detailed examples of a joint divider and application window edges.

In the context of FIG. 22 and as shown in detailed view 2208, joint divider 2206 includes edge 2210 of application window 2202 and edge 2212 of application window 2204. Here, cursor 2214 is hovering over edge 2212 of application window 2204 and window manager 132 can build a dependency chain with respect to edge 2212 and a position of cursor 2214. Starting from edge 2212, window manager determines which other application window edges are in contact with edge 2212. Here, edge 2210 is determined to be contacting edge 2212 as shown in detailed view 2216, and is thus affected by joint divider 2206.

Alternately or additionally, non-contiguous edges may be disregarded and ignored when performing joint divider operations. For example, in detailed view 2218, window manager 132 determines that edges of application windows 2220 and 2222 are in contact with edge 2212. An edge of application window 2224, however, is determined to not be in contact with edge 2212 because of intervening application window 2226 and may be disregarded. As shown in detailed view 2228, Application window 2226 may also be determined as not contacting edge 2212 and may also be disregarded for joint divider operations.

Figure 23:
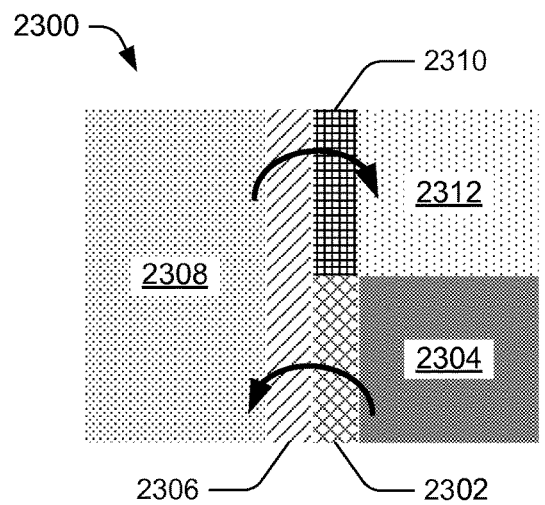
FIG. 23 illustrates detailed examples of contiguous and non-contiguous application window edges.
Figure 23:
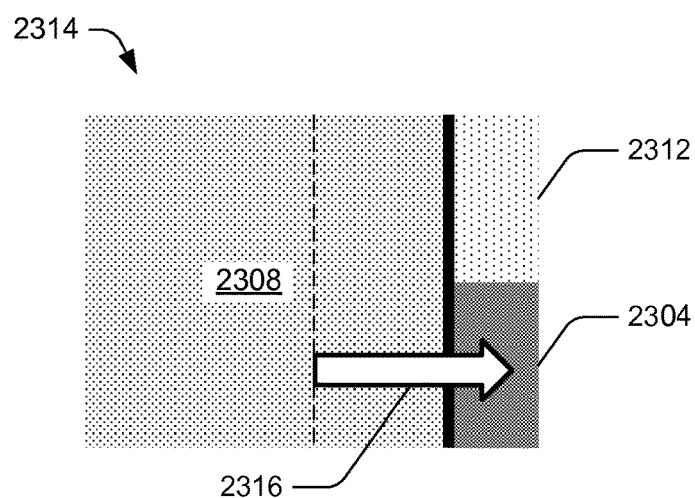

FIG. 23 further illustrates an example of edge dependency at detailed view 2300, in which edge 2302 of application window 2304 is determined to be in contact with edge 2306 of application window 2308. From application window 2304, window manager 132 can determine contact from the perspective of a next application window in an edge dependency chain. Here, edge 2310 of application window 2312 is determined to be in contact with edge 2306 of application window 2308. In detailed view 2314, a size operation initiated by input 2316 is propagated through the dependency chain and causing each of the contacting application windows to size or move accordingly.

Assisted Presentation of Application Windows

Figure 24:
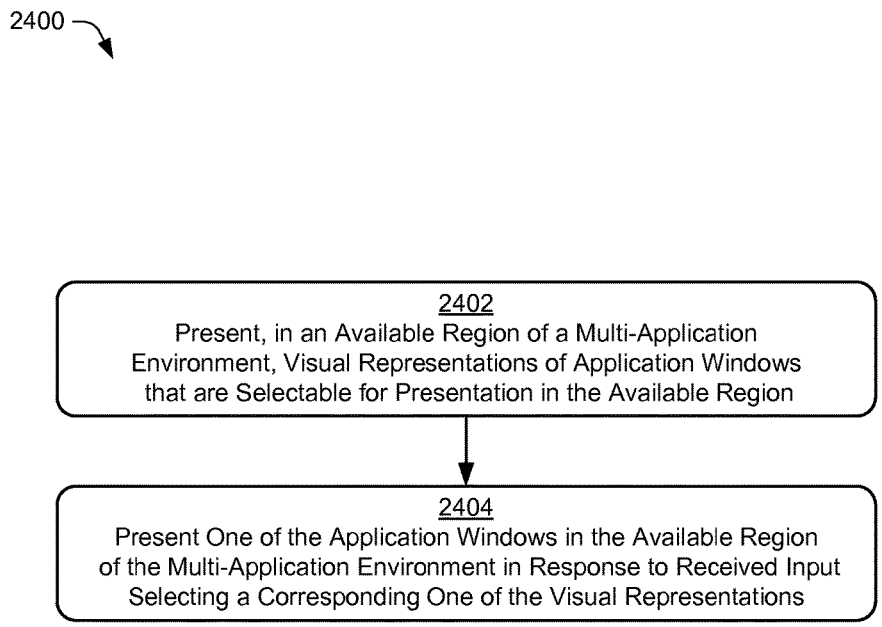
FIG. 24 illustrates a method for enabling selection of an application window for presentation in an available region.

FIG. 24 depicts a method 2400 for presenting selectable application windows in an available region of a multi-application environment, including operations performed by windows manager 132 or multi-application environment module 118. In portions of the following discussion reference may be made to system 100 of FIG. 1, operating environment 200 of FIG. 2, and other methods and example embodiments described elsewhere herein, reference to which is made for example only.

At 2402, visual representations of application windows are presented in an available region of a multi-application environment. The visual representations correspond to application windows that are selectable or suitable for presentation in the available area, such as application windows that can be sized to fully-occupy the available region. The visual representations of the application windows may include text, icons, or reduced-sized images of the application windows, such as thumbnail images. These reduced-sized images may visibly indicate a preview of an application windows content or previously-presented content.

In some embodiments, the visual representations of the application windows are presented via a prompt or other application-selection interface in the available region. In some cases, the visual representations are presented in response to presenting another application in another region of the multi-application environment, such as a snap operation to present the other application in a quadrant-area or half-area. In other cases, the visual representations are presented in response to input received via an application-selection control, such as a control to invoke the prompt or application-selection interface. The application-selection control may be implemented as a hover-region or graphical tab near along an edge of the available area.

An application-selection control may also be presented in response to cursor movement or other input that 'pushes' into an edge region of the multi-application environment. The push movement may include a double push movement or movement over a distance of workspace or screen area. In some cases, a push movement is detected using particular criteria to avoid recognizing inadvertent contact with an edge (e.g., scrolling a scrollbar) as push movement. For example, once movement of a cursor pauses at, or just within, an edge region, a subsequent 'push' (e.g., double push) further into the edge region can invoke the application-selection control. Alternately, the application-selection control may not be invoked if the cursor leaves the edge region, a length of the pause fails to meet a predefined threshold, or the cursor continues to move through the edge region without pausing.

In some embodiments, movement of a cursor prior to encountering an edge region can also be considered. Vertical and horizontal components of cursor movement may be tracked to determine if the cursor traveled far enough across a workspace or into the edge region at a sufficient angle. By way of example, when encountering a horizontal edge, the application-selection control can be invoked in response to determining that the cursor traveled at least 150 vertical pixels and moved more vertically than horizontally within the edge region. Similar criteria may be applied to vertical edge regions, such as by determining that the cursor moved more horizontally than vertically within the edge region. Alternately or additionally, cursor movement or other input can be tracked by a state machine configured to invoke or trigger presentation of the application-selection control in response to these criteria being met.

Figure 25:
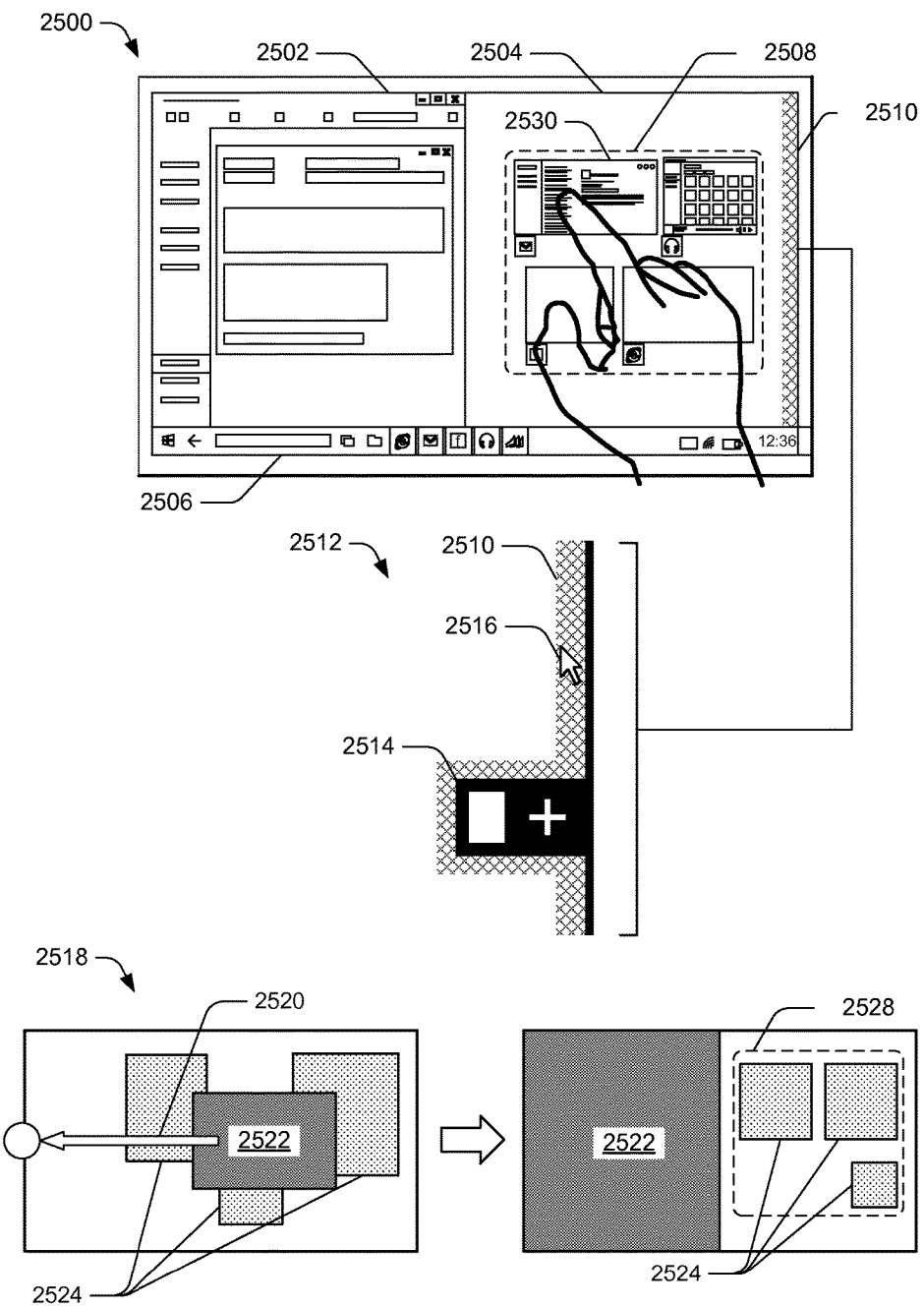
FIG. 25 illustrates an example multi-application environment having an available region to present an application window.

By way of example, consider FIG. 25 in which example workspace 2500 of a multi-application environment is illustrated. Workspace 2500 includes application window 2502, available region 2504, and taskbar 2506. In this particular example, application-selection prompt 2508 is presented in available region 2504, which also includes application-selection control 2510. A more detailed view of application-selection control 2510 is provided at 2512 and includes dismiss control 2514.

Application-selection control 2510 is implemented as a hover region along an edge of available region 2504 and appears responsive to proximity to cursor 2516 (or touch input). The hover region may have a predefined width or area, such as 10 to 25 pixels along an edge of a workspace. Application-selection control 2510 enables a user to trigger or invoke application selection-prompt 2508, which may then present all active application windows to the user in a contextual fashion. Alternately or additionally, dismiss control 2415 enables application-selection prompt 2508 to be dismissed (or hidden) temporarily or until subsequent proximity with a cursor or other input. Here, assume that a user has tapped application-selection control 2510 to invoke application-selection prompt 2508. In response to this input, application-selection prompt 2508 is presented and includes visual representations (e.g., thumbnail images) of application windows that were most-recently accessed by the user.

Alternately or additionally, the visual representation of the application windows may be presented in response to presenting another application window in another region of the multi-application environment. This may be effective to enable a user to easily select one of the application windows for the available region to complete a layout of application windows in the multi-application environment.

An example of this is shown in workspace 2518 of FIG. 25, in which edge trigger 2520 is received via application window 2522. Edge trigger 2520 half-snaps application window 2522 to an edge of workspace 2518 and application window 2522 is presented in the half-snap region. This example illustrates but one instance in which an edge trigger or other contact with an edge can be effective to cause presentation or 'snapping' of an application window into a predefined area that corresponds with the edge. Here, note that unsnapped (e.g., floating) application windows 2524 are partially-occluded before the half-snap operation of application window 2522. In response to the presentation of application window 2522 in the half-snap region, visual representations 2528 that correspond to unsnapped application windows 2524 are presented in application-selection prompt 2528.

At 2404, one of the application windows is presented in the available region. The application window is presented in response to receiving input selecting a corresponding one of the visual representations. In some cases, the input selecting the visual representation is received via other application-selection user interfaces, such as an application management UI, start menu, or key-based application switcher (e.g., ALT+Tab keys).

The application window is sized and positioned to fill or completely occupy the available region. Prior to presenting the application window, a preview of the application window may be presented to visibly indicate the size and position of the application window within the available region. In the context of FIG. 25 and workspace 2500, the user tapping email application tile 2530 would cause a corresponding email application to fill available region 2504. Thus, with a single tap input, the user is able to conveniently optimize a layout of the workspace.

Figure 26:
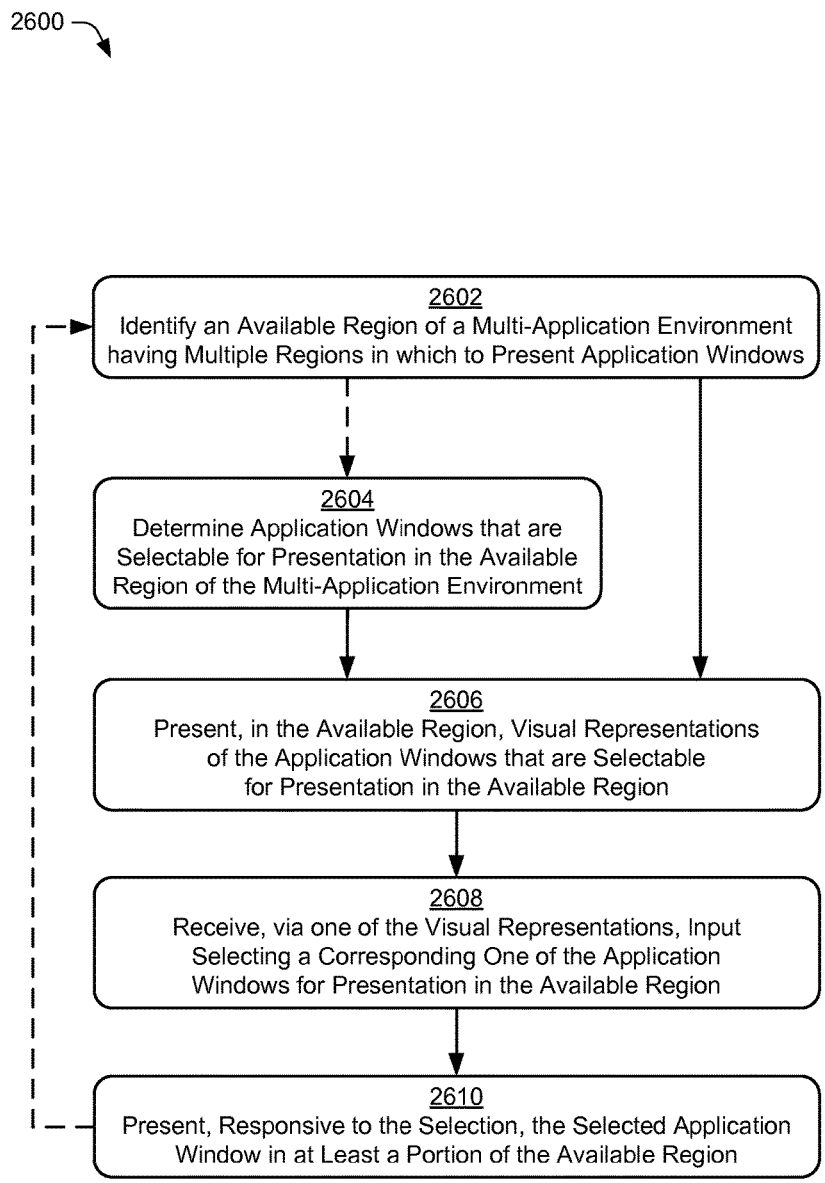
FIG. 26 illustrates a method for presenting a selected application window in an available region.

FIG. 26 depicts a method 2600 for identifying an available region of a multi-application environment in which to present an application window, including operations performed by windows manager 132 or multi-application environment module 118. In portions of the following discussion reference may be made to system 100 of FIG. 1, operating environment 200 of FIG. 2, and other methods and example embodiments described elsewhere herein, reference to which is made for example only.

At 2602, an available region of a multi-application environment is identified. The available region may include any suitable region in which an application interface can be presented, such as a rectangular region of workspace or screen. Identification of the available region may be performed in response to presentation of another application window in another region of the multi-application environment. The other application window may be presented in the other region via any suitable operation, such as a snap operation, sizing via a dynamic joint divider, or region-based sizing. In some cases, the available region is identified as a region that does not include an un-occluded window or a region that can be fully occupied by an application window. Alternately or additionally, the available region is identified for a primary or foremost one layer of the multi-application environment (e.g., top of the z-stack).

Figure 27:
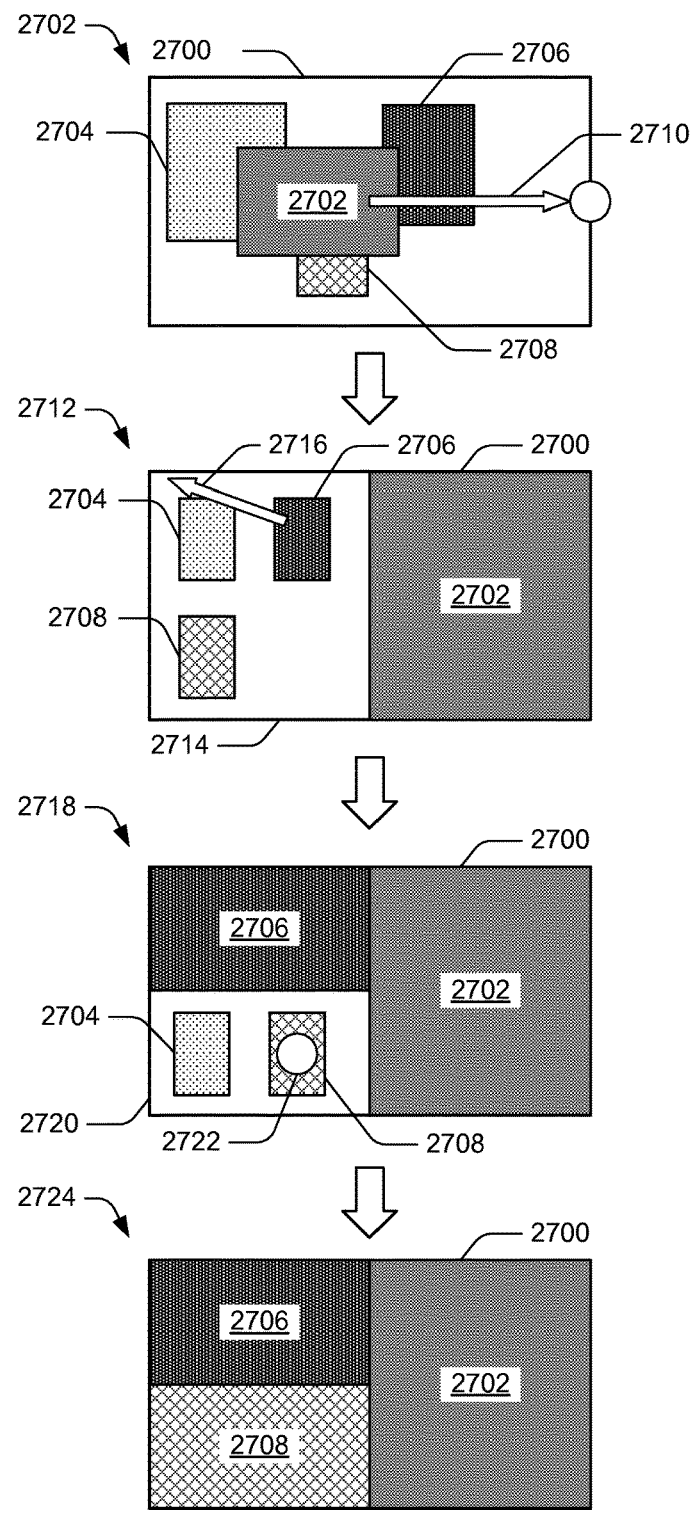
FIG. 27 illustrates example an application window layouts created by selecting application windows.

Consider FIG. 27 in which workspace 2700 is presented generally at 2702 and includes application windows 2702, 2704, 2706, and 2708, the latter three being partially occluded by application window 2702. Here, assume that half-snap edge trigger 2710 is received via application window 2702, which is then snapped to the right half of workspace 2700 as shown at 2712. In response to this snap operation, window manager 132 identifies the left half of workspace 2700 as available area 2714.

Optionally at 2604, application windows that are selectable for presentation in the available region are determined. These application windows may include any suitable application window, such as application windows that are occluded, partially-occluded, minimized, or grouped with another active or open application window. Candidate application windows for selection may also sizable to fill the available region, so fixed-size application windows and application windows snapped to other regions can be excluded.

At, 2606 visual representations of application windows are presented in the available region. These application windows include those application windows that are selectable for presentation in the available region. The visual representations of the application windows may include text, icons, or reduced-sized images of the application windows, such as thumbnail images. These reduced-sized images may visibly indicate a preview of an application windows content or previously-presented content. In the context of the present example and as shown at 2712, window manager 132 presents visual representations, such as reduced-size images, of application windows 2704, 2706, and 2708 in available region 2714 of workspace 2700.

Alternately or additionally, an order or layout for the visual representations of the application windows is determined. This order or layout may be determined based any characteristic or property of the application windows, such as most-frequent-use, most-recent-use, names, titles, sizes, position in the z-stack, or grouping with another active or open application window.

At 2608, input selecting one of the application windows is received via a corresponding one of the visual representations. The input may include any suitable input, such as cursor input, gesture input, or touch input. In some cases, the touch input includes a tap or quadrant-snap or half-snap into the available region. Continuing the ongoing example, quadrant-snap trigger 2716 is received via the visual representation of application window 2706.

At 2610, the selected application window is presented in at least a portion of the available region. The application window is sized and positioned to fill or completely occupy the available region. Prior to presenting the application window, a preview of the application window may be presented to visibly indicate the size and position of the application window within the available region. Optionally, operations of method 2600 may be performed repeatedly to fill other available regions of the multi-application environment. By so doing, an optimized layout of application windows can be provided with minimal user interaction.

In some embodiments, an application window may be selected for the user and presented in the available region without user input. For example, if an application window is paired with another application window in another region, the paired application window can be presented in response to presentation other application window in the other region. The application window may also be selected automatically based on criteria used to determine which applications are selectable for presentation, such as a most-recently user or most-frequently used application window.

Concluding the present example, window manager 132 sizes and positions application window 2706 to fill a quadrant of workspace 2700 as shown at 2718. Further, window manager 132 may then identify available region 2720 of workspace 2700 in which to present the visual representations of application windows 2704 and 2708. Here, assume that tap input 2722 is received via the visual representation of application window 2708. In response, window manager 132 sizes and positions application window 2708 to fill a quadrant region of workspace 2700 as shown at 2724. Thus, with just three instances of input, a layout of application windows have been provided in workspace 2700.

Aspects of these methods may be implemented in hardware (e.g., fixed logic circuitry), firmware, a System-on-Chip (SoC), software, manual processing, or any combination thereof. A software implementation represents program code that performs specified tasks when executed by a computer processor, such as software, applications, routines, programs, objects, components, data structures, procedures, modules, functions, and the like. The program code can be stored in one or more computer-readable memory devices, both local and/or remote to a computer processor. The methods may also be practiced in a distributed computing environment by multiple computing devices.

Example Device

Figure 28:
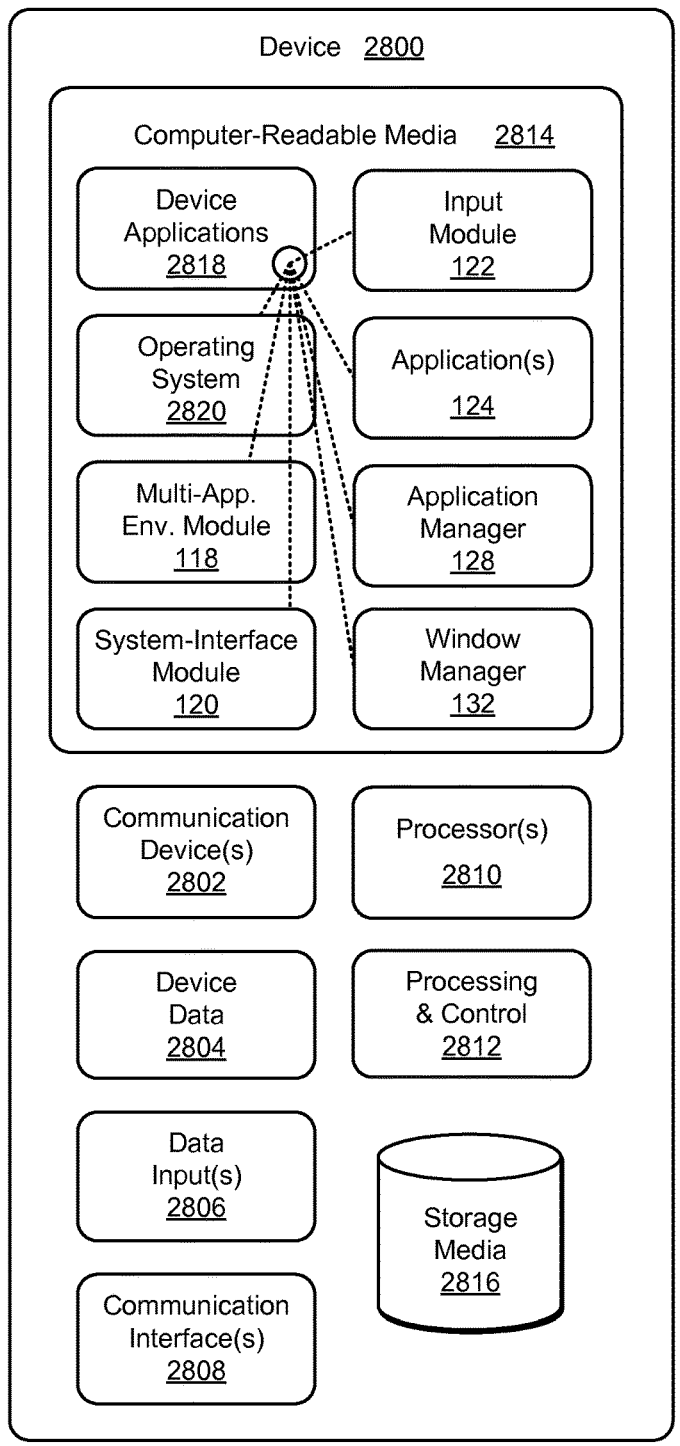
FIG. 28 illustrates an example device in which techniques enabling a multi-application environment can be implemented.

FIG. 28 illustrates various components of example device 2800 that can be implemented as any type of client, server, and/or computing device as described with reference to the previous FIGS. 1-28 to implement techniques enabling adaptive sizing and positioning of application windows. In embodiments, device 2800 can be implemented as one or a combination of a wired and/or wireless device, as a form of television client device (e.g., television set-top box, digital video recorder (DVR), etc.), consumer device, computer device, server device, portable computer device, user device, communication device, video processing and/or rendering device, appliance device, gaming device, electronic device, and/or as another type of device. Device 2800 may also be associated with a user (e.g., a person) and/or an entity that operates the device such that a device describes logical devices that include users, software, firmware, and/or a combination of devices.

Device 2800 includes communication devices 2802 that enable wired and/or wireless communication of device data 2804 (e.g., received data, data that is being received, data scheduled for broadcast, data packets of the data, etc.). Device data 2804 or other device content can include configuration settings of the device, media content stored on the device, and/or information associated with a user of the device. Media content stored on device 2800 can include any type of audio, video, and/or image data. Device 2800 includes one or more data inputs 2806 via which any type of data, media content, and/or inputs can be received, such as user-selectable inputs, messages, music, television media content, recorded video content, and any other type of audio, video, and/or image data received from any content and/or data source.

Device 2800 also includes communication interfaces 2808, which can be implemented as any one or more of a serial and/or parallel interface, a wireless interface, any type of network interface, a modem, and as any other type of communication interface. Communication interfaces 2808 provide a connection and/or communication links between device 2800 and a communication network by which other electronic, computing, and communication devices communicate data with device 2800.

Device 2800 includes one or more processors 2810 (e.g., any of microprocessors, controllers, and the like), which process various computer-executable instructions to control the operation of device 2800 and to enable techniques enabling a multi-application environment. Alternatively or in addition, device 2800 can be implemented with any one or combination of hardware, firmware, or fixed logic circuitry that is implemented in connection with processing and control circuits which are generally identified at 2812. Although not shown, device 2800 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 2800 also includes computer-readable storage media 2814, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 2800 can also include a mass storage media device 2816.

Computer-readable storage media 2814 provides data storage mechanisms to store device data 2804, as well as various device applications 2818 and any other types of information and/or data related to operational aspects of device 2800. For example, an operating system 2820 can be maintained as a computer application with the computer-readable storage media 2814 and executed on processors 2810. Device applications 2818 may include a device manager, such as any form of a control application, software application, signal-processing and control module, code that is native to a particular device, a hardware abstraction layer for a particular device, and so on.

Device applications 2818 also include any system components or modules to implement the techniques, such as device applications 2818 including multi-application environment module 118, system-interface module 120, input module 122, application(s) 124, application manager 128, and window manager 132.

CONCLUSION

Although embodiments of techniques and apparatuses enabling adaptive sizing and positioning of application windows have been described in language specific to features and/or methods, it is to be understood that the subject of the appended claims is not necessarily limited to the specific features or methods described. Rather, the specific features and methods are disclosed as example implementations enabling adaptive sizing and positioning of application windows.

What is claimed is:

1. A computer-implemented method comprising:
receiving a user input to move a floating application window, the user input effective to snap the floating application window into a region of a multi-application environment;
identifying one or more edges of one or more additional application windows of one or more respective additional applications;
determining, based on the one or more edges of the one or more additional application windows, a size for the floating application window or a position for the floating application window such that the floating application window fills the region of the multi-application environment to at least one of the one or more edges of the one or more additional application windows, the determining comprising:
determining whether the one or more additional application windows include a vertically adjacent application window that is vertically adjacent to the region or a horizontally adjacent application window that is horizontally adjacent to the region;
responsive to determining that the one or more additional application windows include the vertically adjacent application window, determining the size or position for the floating application window based on one or more edges of the vertically adjacent application window;

responsive to determining that the one or more additional application windows include both the vertically adjacent application window and the horizontally adjacent application window, determining the size or the position for the floating application window based on the one or more edges of the vertically adjacent application window while disregarding edges of the horizontally adjacent application window; and responsive to determining that the one or more additional application windows include the horizontally adjacent application window and that the one or more additional application windows do not include the vertically adjacent application window, determining the size or the position for the floating application window based on one or more edges of the horizontally adjacent application window; and presenting, based on the size determined for the floating application window or the position determined for the floating application window, the floating application window in the region of the multi-application environment to enable user interaction.

2. The computer-implemented method as described in claim 1, wherein the region of the multi-application environment corresponds with a predefined area of the multi-application environment having a predefined size or a predefined position and the method further comprises:

determining, based on the predefined area, a size for the one or more additional application windows or a position for the one or more additional application windows such that the identified edge of one or more additional application windows aligns with an edge of the predefined area and the floating application window fills the predefined area; and altering, based on the determined size for the one or more additional application windows or the determined position for the one or more additional application windows, a current size or a current position for the one or more additional application windows.

3. The computer-implemented method as described in claim 2, wherein the multi-application environment is presented via a display having edges and the predefined area of the multi-application environment includes one of:

a first predefined area of the multi-application environment having two edges in contact with two of the edges of the display;

a second predefined area of the multi-application environment having three edges in contact with three of the edges of the display; or a third predefined area of the multi-application environment having four edges in contact with four of the edges of the display.

4. The computer-implemented method as described in claim 1, wherein the size of the floating application window or the position of the floating application window are determined such that a combined height of the floating application window and the vertically adjacent application window is approximately equal to a height of a display through which the multi-application environment is presented, or a combined width of the floating application window and the horizontally adjacent application window is approximately equal to a width of the display through which the multi-application environment is presented.

5. The computer-implemented method as described in claim 1, wherein two or more other edges of at least one of the one or more additional application windows align with respective edges of the multi-application environment.

6. The computer-implemented method as described in claim 1, wherein the user input is received via touch input, mouse input, touchpad input, keyboard input, voice input, or stylus input.

7. A system comprising:

one or more processors;

one or more computer-readable storage media storing processor-executable instructions that, responsive to execution by the one or more processors, perform operations comprising:

receiving an input initiating placement of a floating application window into a region of a multi-application environment;

identifying one or more edges of one or more additional application windows of one or more respective additional applications;

determining, based on the one or more edges of the one or more additional application windows, a size for the floating application window or a position for the floating application window such that the floating application window fills the region of the multi-application environment to at least one of the one or more edges of the one or more additional application windows, the determining comprising:

determining whether the one or more additional application windows include a vertically adjacent application window that is vertically adjacent to the region or a horizontally adjacent application window that is horizontally adjacent to the region;

responsive to determining that the one or more additional application windows include the vertically adjacent application window, determining the size or position for the floating application window based on one or more edges of the vertically adjacent application window;

responsive to determining that the one or more additional application windows include both the vertically adjacent application window and the horizontally adjacent application window, determining the size or the position for the floating application window based on the one or more edges of the vertically adjacent application window while disregarding edges of the horizontally adjacent application window; or responsive to determining that the one or more additional application windows include the horizontally adjacent application window and that the one or more additional application windows do not include the vertically adjacent application window, determining the size or the position for the floating application window based on one or more edges of the horizontally adjacent application window; and presenting, based on the size determined for the floating application window or the position determined for the floating application window, the floating application window in the region of the multi-application environment to enable user interaction.

8. The system as described in claim 7, wherein the region of the multi-application environment corresponds with a predefined area of the multi-application environment having a predefined size or a predefined position, and wherein the operations further comprise:

determining, based on the predefined area, a size for the one or more additional application windows or a position for the one or more additional application windows such that the identified edge of one or more additional application windows aligns with an edge of the predefined area and the floating application window fills the predefined area; and altering, based on the determined size for the one or more additional application windows or the determined position for the one or more additional application windows, a current size or a current position for the one or more additional application windows.

9. The system as described in claim 8, wherein the multi-application environment is presented via a display and the predefined area of the multi-application environment includes one of:
- a first predefined area of the multi-application environment having two edges in contact with two of the edges of the display;
- a second predefined area of the multi-application environment having three edges in contact with three of the edges of the display; or
- a third predefined area of the multi-application environment having four edges in contact with four of the edges of the display.

10. The system as described in claim 7, wherein at least one of the one or more additional application windows occupies the region of the multi-application environment and the operations further comprise moving, prior to presenting the floating application window in the region, the at least one of the one or more additional application windows to another region of the multi-application environment.

11. The system as described in claim 10, wherein the operations further comprise determining a size for the at least one of the one or more additional application windows such that the at least one of the one or more additional application windows fills a predefined area of the multi-application environment that corresponds to the another region of the multi-application environment.

12. The system as described in claim 11, wherein the size for the at least one of the one or more additional application windows is determined based on a preference of an application user interface associated with the at least one of the one or more additional application windows.

13. The system as described in claim 7, wherein the operations further comprise presenting, prior to presenting the floating application window in the region of the multi-application environment, a preview of the floating application window that visibly indicates the determined size or the determined position for the floating application window.

14. The system as described in claim 13, wherein the region of the multi-application environment includes an area along an edge of the multi-application environment or an area at a corner of the multi-application environment.

15. A computing device comprising:
at least a memory and a processor to perform operations comprising:
- receiving a user input to move an application window, the user input effective to snap the application window into a region of a multi-application environment;
- identifying one or more edges of one or more additional application windows of one or more respective additional applications;
- determining, based on the one or more edges of the one or more additional application windows, a size for the application window or a position for the application window such that the application window fills the region of the multi-application environment to at least one of the one or more edges of the one or more additional application windows, the determining comprising:
  - determining whether the one or more additional application windows include a vertically adjacent application window that is vertically adjacent to the region or a horizontally adjacent application window that is horizontally adjacent to the region;
  - responsive to determining that the one or more additional application windows include the vertically adjacent application window, determining the size or position for the application window based on one or more edges of the vertically adjacent application window;
  - responsive to determining that the one or more additional application windows include both the vertically adjacent application window and the horizontally adjacent application window, determining the size or the position for the application window based on the one or more edges of the vertically adjacent application window while disregarding edges of the horizontally adjacent application window; or
  - responsive to determining that the one or more additional application windows include the horizontally adjacent application window and that the one or more additional application windows do not include the vertically adjacent application window, determining the size or the position for the application window based on one or more edges of the horizontally adjacent application window; and
- presenting, based on the determined size or position for the application window, the application window in the region of the multi-application environment to enable user interaction.

16. The computing device as described in claim 15, wherein the operations further comprise presenting the multi-application environment via multiple displays and wherein one of the edges of the multi-application environment aligns with an edge of one of the multiple displays.

17. The computing device as described in claim 15, wherein the size for the application window and the position for the application window are further determined based on a preference of an application user interface associated with the application window or one of the additional application windows.

18. The computer-implemented method as described in claim 1, wherein at least one of the one or more additional application windows occupies the region of the multi-application environment and the operations further comprise relegating the at least one of the one or more additional application windows to another primacy layer of the multi-application environment.

19. The computer-implemented method as described in claim 1, wherein, prior to receiving the user input, the floating application window overlaps at least one of the one or more additional application windows in the multi-application environment.

* * * * *